US009195957B2

(12) United States Patent
Ifferte et al.

(10) Patent No.: US 9,195,957 B2
(45) **Date of Patent: *Nov. 24, 2015**

(54) COMPUTER SYSTEMS AND COMPUTER METHODS FOR AUTOMATED ON-DEMAND CUSTOMIZABLE ASSEMBLING AND HIGH THROUGHPUT PRINTING OF DOCUMENTS

(71) Applicant: Broadridge Investor Communication Solutions, Inc., Edgewood, NY (US)

(72) Inventors: Ronald Ifferte, Coram, NY (US); Delroy Lewis, Elmont, NY (US); Anna Babitsky, Merrick, NY (US); Diana Baker, Nissequogue, NY (US); Thomas Ruggiero, Bayshore, NY (US); William Jacoutot, Holbrook, NY (US); William Gaddy, Holbrook, NY (US); Steven Kelly, Hauppauge, NY (US); Thomas Bickerton, Baldwin, NY (US); David Olshever, Commack, NY (US); William Bondi, Islip, NY (US); Michael Shults, Flower Mound, TX (US); David Brown, Sudbury, MA (US); Mark Asdoorian, Lynn, MA (US)

(73) Assignee: Broadridge Investor Communication Solutions, Inc., Edgewood, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/614,919

(22) Filed: Feb. 5, 2015

(65) Prior Publication Data

US 2015/0154558 A1 Jun. 4, 2015

Related U.S. Application Data

(63) Continuation of application No. 14/500,305, filed on Sep. 29, 2014, which is a continuation of application No. 14/084,480, filed on Nov. 19, 2013, now Pat. No. 8,856,046.

(60) Provisional application No. 61/895,328, filed on Oct. 24, 2013, provisional application No. 61/832,590, filed on Jun. 7, 2013.

(51) Int. Cl.

| | |
|---|---|
| ***G06Q 30/00*** | (2012.01) |
| ***G06Q 10/08*** | (2012.01) |
| ***G06Q 40/06*** | (2012.01) |
| ***G07B 17/00*** | (2006.01) |
| ***G06Q 40/04*** | (2012.01) |
| ***G06Q 10/10*** | (2012.01) |
| ***G06K 15/02*** | (2006.01) |
| *G06Q 10/00* | (2012.01) |

(52) U.S. Cl.

CPC ........ *G06Q 10/0835* (2013.01); *G06K 15/1814* (2013.01); *G06K 15/1868* (2013.01); *G06Q10/0833* (2013.01); *G06Q 10/10* (2013.01); *G06Q 40/04* (2013.01); *G06Q 40/06* (2013.01); *G07B 17/00024* (2013.01); *G07B 2017/0004* (2013.01); *G07B 2017/00072* (2013.01)

(58) Field of Classification Search

CPC . G06Q 10/0833; G06Q 10/08; G06Q 10/083; G06Q 10/087; G06Q 10/08355; G06Q 10/0832; G06Q 10/0838; G06Q 10/00; G06Q 30/04; G06Q 50/28; G06Q 10/06316; G06Q 10/0835; G06Q 30/02; G06Q 40/00

See application file for complete search history.

(56) References Cited

U.S. PATENT DOCUMENTS

| | | | |
|---|---|---|---|
| 8,856,046 | B1 | 10/2014 | Ifferte et al. |
| 2006/0131378 | A1 | 6/2006 | Baker et al. |
| 2008/0052230 | A1 | 2/2008 | Crane et al. |
| 2008/0259380 | A1 | 10/2008 | Nuggehalli |
| 2008/0267510 | A1 | 10/2008 | Paul et al. |
| 2011/0125637 | A1 | 5/2011 | Kalra et al. |
| 2013/0128302 | A1 | 5/2013 | Rai et al. |
| 2015/0019396 | A1 | 1/2015 | Ifferte et al, |

FOREIGN PATENT DOCUMENTS

| | | | |
|---|---|---|---|
| EP | 1 833 012 | A2 | 9/2007 |

*Primary Examiner* — George Chen

(74) *Attorney, Agent, or Firm* — Greenberg Traurig, LLP

(57) ABSTRACT

In some embodiments, the instant invention provides for a computer-implemented method that includes at least the following steps of: periodically receiving investment transactional data identifying investment transactions of a plurality of investors; automatically determining, based on the investment transactional data, a document to be mailed to each investor of the plurality of investors; automatically generating a delivery data for each mailing to be mailed to each investor of the plurality of investors, where the delivery data includes: bucslip data or trade confirmation data, assembling data, and unique production control bar code data generated based on the assembling data and an investment transaction identifier from the investment transactional data; and printing a unique production control bar code based on the unique production control bar code data, where the unique production control bar code is configured to be used for: assembling each mailing envelope, and tracking such mailing envelope.

22 Claims, 75 Drawing Sheets

| A | B | C | D | E | F | G | H | I | J | K | L |
|---|---|---|---|---|---|---|---|---|---|---|---|
| Client Provided Cusip | CUSIP | Catalog # | Catalog Description | Activity Type | Order # | Document Type | Quantity Ordered | Receipt Quantity | Receipt Date | Receipt Notes | Status D |
| 424686YF4 | 424686YF4 | MUNI08127190 | | WMS Map | | | | | | | 9/17/2012 |
| 432146HZ4 | 432146HZ4 | MUNI08126285 | TEMP CATALOG NUMBER | ST Change | | | | | | | 8/23/201 |
| | | | | Order | 373791 | Prospectus | 6 | | | | 8/23/2012 |
| | | | | Follow-up | 373791 | Prospectus | 6 | | | | 9/17/2012 |
| | | | | WMS Map | | | | | | | 9/17/2012 |
| 432146JH2 | 432146JH2 | MUNI08126285 | TEMP CATALOG NUMBER | Order | 375352 | Prospectus | 6 | | | | 9/6/2012 |
| | | | | WMS Map | | | | | | | 9/17/2012 |

FIG. 35

| | A | B | C | D | E | F | G | H | I | J | K | L |
|---|---|---|---|---|---|---|---|---|---|---|---|---|
| 1 | Name | Date | # Cusips BKO's Start | # Cusips BKO's 12:00 | # Cusips BKO's 5:30 | # Cusips Mapped | Iss Codes | Sec Codes | New Orders | Cusips on New Orders | F/U Orders Sch. | F/U Orders Open EOD |
| 2 | | 10/15/2012 | 54 | 54 | 26 | 0 | 0 | 0 | 0 | 0 | 2 | 0 |
| 3 | | 10/15/2012 | 41 | 41 | 27 | 0 | 0 | 0 | 0 | 0 | 0 | 0 |
| 4 | | 10/15/2012 | 10 | 10 | 9 | 0 | 0 | 0 | 0 | 0 | 0 | 0 |
| 5 | | 10/15/2012 | 130 | 121 | 114 | 0 | 0 | 0 | 0 | 0 | 0 | 0 |
| 6 | | 10/15/2012 | 210 | 159 | 35 | 0 | 0 | 0 | 0 | 0 | 0 | 0 |
| 7 | | 10/15/2012 | 74 | 39 | 15 | 0 | 0 | 0 | 0 | 0 | 0 | 0 |
| 8 | | 10/15/2012 | 37 | 34 | 28 | 0 | 0 | 0 | 0 | 0 | 0 | 0 |
| 9 | | 10/15/2012 | 8 | 7 | 6 | 0 | 0 | 0 | 0 | 0 | 0 | 0 |
| 10 | | 10/15/2012 | 3 | 3 | 3 | 0 | 0 | 0 | 0 | 0 | 0 | 0 |
| 11 | | 10/15/2012 | 136 | 120 | 20 | 9 | 12 | 15 | 10 | 55 | 9 | 2 |
| 12 | | 10/15/2012 | 56 | 6 | 5 | 0 | 0 | 0 | 0 | 0 | 0 | 0 |
| 13 | | 10/15/2012 | 9 | 6 | 5 | 1 | 0 | 0 | 1 | 2 | 0 | 0 |
| 14 | | | | | | | | | | | | |

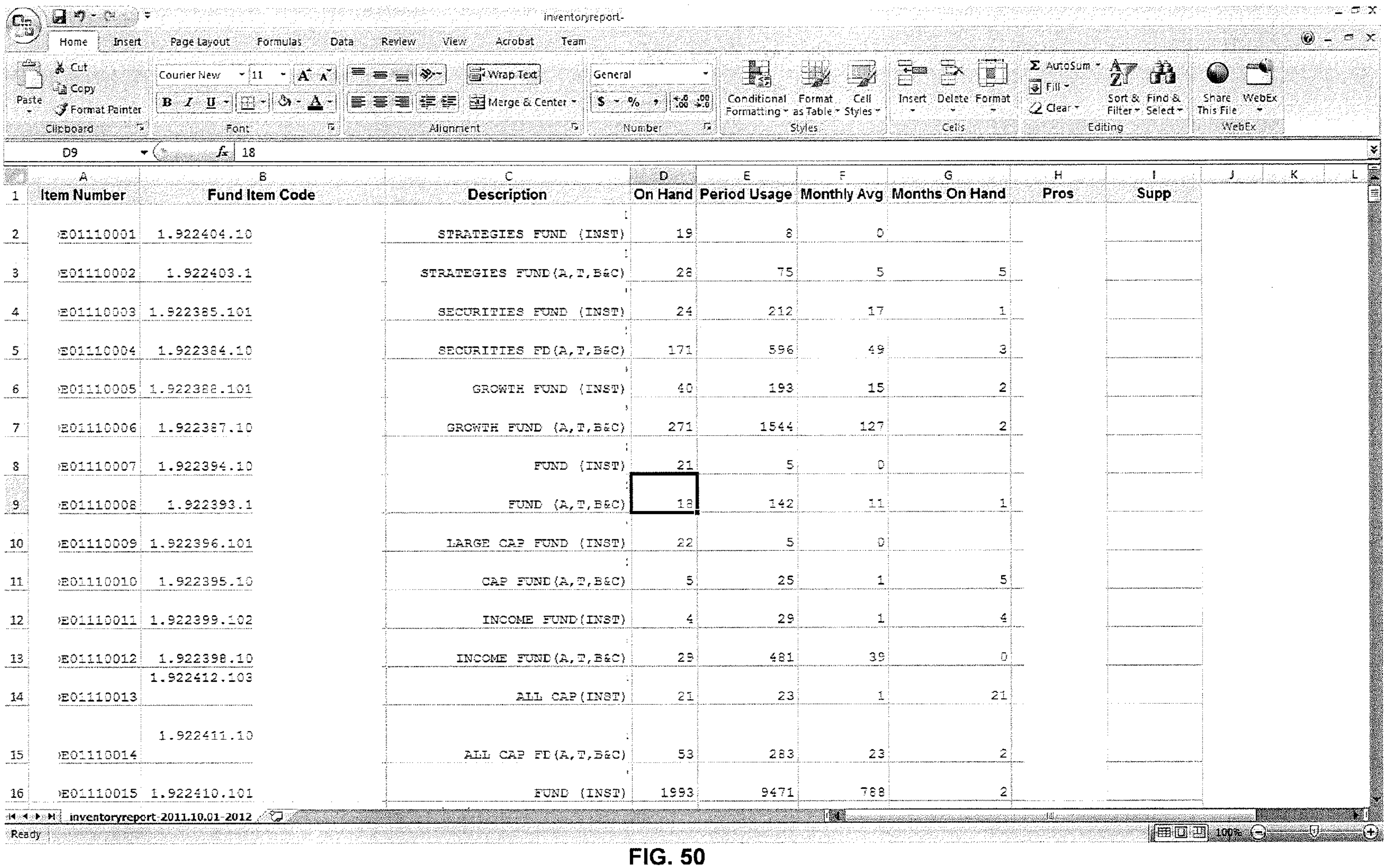

| | A | B | C | D | E | F | G | H | I | J | K | L |
|---|---|---|---|---|---|---|---|---|---|---|---|---|
| 1 | Item Number | Fund Item Code | Description | On Hand | Period Usage | Monthly Avg | Months On Hand | Pros | Supp | | | |
| 2 | E01110001 | 1.922404.10 | STRATEGIES FUND (INST) | 19 | 8 | 0 | | | | | | |
| 3 | E01110002 | 1.922403.1 | STRATEGIES FUND(A,T,B&C) | 28 | 75 | 5 | 5 | | | | | |
| 4 | E01110003 | 1.922385.101 | SECURITIES FUND (INST) | 24 | 212 | 17 | 1 | | | | | |
| 5 | E01110004 | 1.922384.10 | SECURITIES FD(A,T,B&C) | 171 | 596 | 49 | 3 | | | | | |
| 6 | E01110005 | 1.922388.101 | GROWTH FUND (INST) | 40 | 193 | 15 | 2 | | | | | |
| 7 | E01110006 | 1.922387.10 | GROWTH FUND (A,T,B&C) | 271 | 1544 | 127 | 2 | | | | | |
| 8 | E01110007 | 1.922394.10 | FUND (INST) | 21 | 5 | 0 | | | | | | |
| 9 | E01110008 | 1.922393.1 | FUND (A,T,B&C) | 18 | 142 | 11 | 1 | | | | | |
| 10 | E01110009 | 1.922396.101 | LARGE CAP FUND (INST) | 22 | 5 | 0 | | | | | | |
| 11 | E01110010 | 1.922395.10 | CAP FUND(A,T,B&C) | 5 | 25 | 1 | 5 | | | | | |
| 12 | E01110011 | 1.922399.102 | INCOME FUND(INST) | 4 | 29 | 1 | 4 | | | | | |
| 13 | E01110012 | 1.922398.10 | INCOME FUND(A,T,B&C) | 29 | 481 | 39 | 0 | | | | | |
| 14 | E01110013 | 1.922412.103 | ALL CAP(INST) | 21 | 23 | 1 | 21 | | | | | |
| 15 | E01110014 | 1.922411.10 | ALL CAP FD(A,T,B&C) | 53 | 283 | 23 | 2 | | | | | |
| 16 | E01110015 | 1.922410.101 | FUND (INST) | 1993 | 9471 | 788 | 2 | | | | | |

FIG. 50

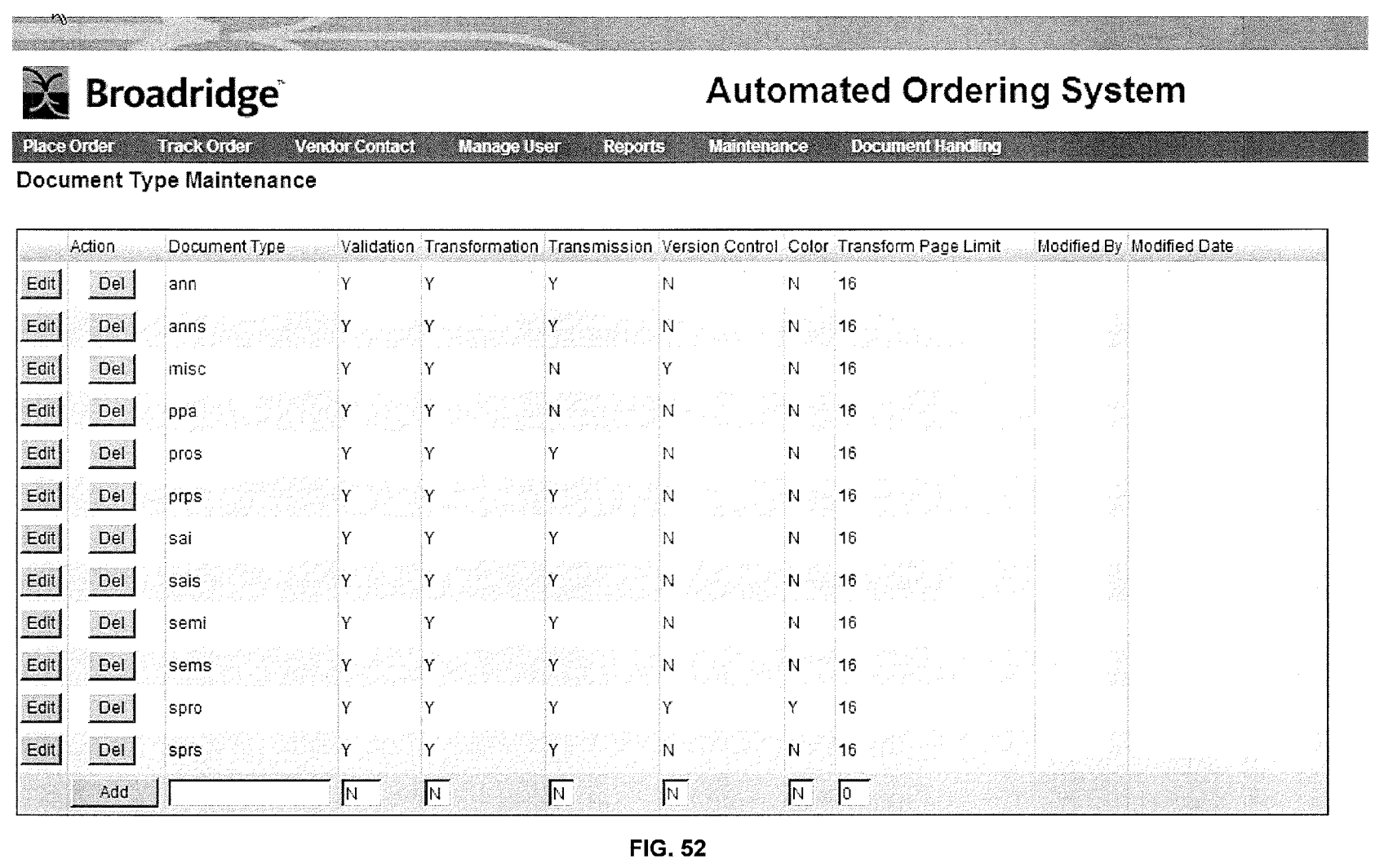

Broadridge™ Automated Ordering System

Place Order | Track Order | Vendor Contact | Manage User | Reports | Maintenance | Document Handling

Document Type Maintenance

| | Action | Document Type | Validation | Transformation | Transmission | Version Control | Color | Transform Page Limit | Modified By | Modified Date |
|---|---|---|---|---|---|---|---|---|---|---|
| Edit | Del | ann | Y | Y | Y | N | N | 16 | | |
| Edit | Del | anns | Y | Y | Y | N | N | 16 | | |
| Edit | Del | misc | Y | Y | N | Y | N | 16 | | |
| Edit | Del | ppa | Y | Y | N | N | N | 16 | | |
| Edit | Del | pros | Y | Y | Y | N | N | 16 | | |
| Edit | Del | prps | Y | Y | Y | N | N | 16 | | |
| Edit | Del | sai | Y | Y | Y | N | N | 16 | | |
| Edit | Del | sais | Y | Y | Y | N | N | 16 | | |
| Edit | Del | semi | Y | Y | Y | N | N | 16 | | |
| Edit | Del | sems | Y | Y | Y | N | N | 16 | | |
| Edit | Del | spro | Y | Y | Y | Y | Y | 16 | | |
| Edit | Del | sprs | Y | Y | Y | N | N | 16 | | |
| | Add | | N | N | N | N | N | 0 | | |

FIG. 52

| Deleted | NrDocId | SubmitterDocId | OriginatingFileName | ProcessName | ProcessStatus | ProcessStatusDesc | NewRiverReceipt |
|---|---|---|---|---|---|---|---|
| 0 | 50367156 | 0000116305 | IMPOSEDVANG02104872.pdf | EdgePrinterQC | Processing | Processing has not started yet | 0000116305 |
| 0 | 50367156 | 0000116305 | IMPOSEDVANG02104872.pdf | EdgeDocTrackerStatusUpdate | Succeeded | Edgewood has not indicated document should be discontinued | 0000116305 |
| 0 | 50367156 | 0000116305 | IMPOSEDVANG02104872.pdf | EdgeFilingDateCheck | Succeeded | Edgewood Edgar Filing Date Check Passed | 0000116305 |
| 0 | 50367156 | 0000116305 | IMPOSEDVANG02104872.pdf | EdgeDocExpiration | Succeeded | Default state of not expired | 0000116305 |
| 0 | 50367156 | 0000116305 | IMPOSEDVANG02104872.pdf | IngestCheck | Succeeded | Pre-processing completed successfully | 0000116305 |
| 0 | 50367156 | 0000116305 | IMPOSEDVANG02104872.pdf | DocAssociation | Succeeded | Associate CUSIP and Supplements completed successfully | 0000116305 |
| 0 | 50367156 | 0000116305 | IMPOSEDVANG02104872.pdf | EdgarCheck | Processing | Processing has not started yet | 0000116305 |

FIG. 59

COMPUTER SYSTEMS AND COMPUTER METHODS FOR AUTOMATED ON-DEMAND CUSTOMIZABLE ASSEMBLING AND HIGH THROUGHPUT PRINTING OF DOCUMENTS

RELATED APPLICATIONS

This application is a continuation of U.S. patent application Ser. No. 14/500,305, filed Sep. 29, 2014, which is a continuation of U.S. Pat. No. 8,856,046, filed Nov. 19, 2013 which claims the priority of U.S. provisional application Ser. No. 61/832,590, entitled "COMPUTER SYSTEMS AND COMPUTER METHODS FOR AUTOMATED ON-DEMAND CUSTOMIZABLE ASSEMBLING AND HIGH THROUGHPUT PRINTING OF DOCUMENTS," filed Jun. 7, 2013, and U.S. provisional application Ser. No. 61/895,328, entitled "COMPUTER SYSTEMS AND COMPUTER METHODS FOR AUTOMATED HANDLING OF EXCEPTIONS IN PROCESSING PRINTING/MAILING REQUESTS," filed Oct. 24, 2013, which are incorporated herein by reference in their entirety for all purposes.

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

TECHNICAL FIELD

In some embodiments, the instant invention is related to computer-implemented methods and computer systems for automated on-demand customizable assembling and high throughput printing of documents.

BACKGROUND OF INVENTION

Generally, many industries experience requirements associated with mass mailings of printed material which are, typically, required a relatively short turnaround from a time when a request for mass mailing is received by a printer to a time when the requested mass mailing is accomplished.

BRIEF SUMMARY OF INVENTION

In some embodiments, the instant invention provides for a computer-implemented method that includes at least the following steps of: periodically receiving, by at least one specifically programmed computer system, investment transactional data identifying investment transactions of a plurality of investors, where the investment transactional data is received during a first time period and where the investment transactional data, for each investor of the plurality of the inventors, includes: i) at least one investment identifier of at least one investment that is, directly or indirectly, owned or managed by such investor, and ii) at least one investment transaction identifier of each investment transaction of such investor that involves the at least one investment; where the plurality of investor comprises at least a thousand investors; automatically determining, by the at least one specifically programmed computer system, based, at least in part, on the investment transactional data, at least one first document, at least one second document, or both, to be mailed to each investor of the plurality of investors, where the at least one first document, the at least one second document, or both, are associated with the at least one investment of such investor;

automatically generating, by the at least one specifically programmed computer system, a delivery data for each mailing to be mailed to each investor of the plurality of investors, where the delivery data includes: bucslip data or trade confirmation data, where the bucslip data includes: a mailing address of such investor and a listing of the at least one first document, the at least one second document, or both, to be mailed to such investor, and where the trade confirmation data includes: at least one trade confirmation for at least one investment transaction of such investor, and at least one of the following: a) the listing of the at least one first document, the at least one second document, or both, to be mailed to such investor, b) at least one communication targeted to such investor, ii) assembling data that identifies assembling instructions for assembling each mailing to be mailed to each investor of the plurality of investors, where the assembling instructions comprise a plurality of instructions selected from the group consisting of: a first instruction identifying a quantity of documents to be included in such mailing, a second instruction identifying a quantity of pages of documents to be included in such mailing, a third instruction identifying a type of each document to be included in such mailing, a fourth instruction identifying, for each document to be included in such mailing, that such document is to be packed in a folded condition or an unfolded condition, a fifth instruction identifying a finishing to be applied to each document to be included in such mailing, a sixth instruction identifying a type of a mailing envelope to be used for such mailing, a seventh instruction classifying such mailing by weight based, at least in part, on postal weight categories, an eight instruction identifying a postage data based, at least in part, on the classifying such mailing in accordance with the seventh instruction, and a ninth instruction identifying a predetermined number of the investment transactions to which such mailing corresponds, based, at least in part, on: a first size and a first thickness of the at least one first document, and a second size and a second thickness of the at least one second document; iii) unique production control bar code data, generated based, at least in part, on the assembling data and the at least one investment transaction identifier; and printing at least one unique production control bar code based, at least in part, on the unique production control bar code data, where the unique production control bar code is configured to be used for: i) assembling each mailing envelope, and ii) tracking such mailing envelope before such mailing envelope is deposited with a postal service.

In some embodiments, the above exemplary method further includes: automatically determining, by the at least one specifically programmed computer system, a printing allocation among a plurality of printers to print documents for mailings to the plurality of investors based, at least in part, on the delivery data.

In some embodiments, the bucslip data further comprises the at least one communication targeted to such investor.

In some embodiments, the above exemplary method further includes: periodically obtaining, by the at least one specifically programmed computer system, the at least one first document, the at least one second document, or both, from at least one electronic depository; automatically converting, by the at least one specifically programmed computer system, the at least one first document, the at least one second document, or both, into at least one print-ready formatted file; periodically receiving, by the at least one specifically programmed computer system, change data, identifying changes in the at least one first document, the at least one second document, or both; automatically updating, by the at least one specifically programmed computer system, the at least one first document, the at least one second document, or both, based, at least in part, on the change data; and automatically updating, by the at least one specifically programmed computer system, the at least one print-ready formatted file based, at least in part, on the change data.

In some embodiments, the above exemplary method further includes: automatically assembling, in a machine automated mode, based at least in part on reading the at least one unique production control bar code, each mailing envelope, by: i) selecting, by the at least one specifically programmed computer system, a plurality of printed materials from a plurality of feeders of at least one assembling mechanism, where the plurality of printed materials are selected from the group consisting of: 1) the at least one first document, 2) the at least one second document, 3) at least one first bucslip document, printed based, at least in part, on the bucslip data, 4) at least one first trade confirmation document, printed based, at least in part, on the trade confirmation data, and ii) packaging the plurality of printed materials into such mailing envelope.

In some embodiments, the above exemplary method further includes: utilizing, by the at least one specifically programmed computer system, at least one camera to read an image of the at least one unique production control bar code.

In some embodiments, the above exemplary method further includes: automatically generating, by the at least one specifically programmed computer system, based on at least in part on the delivery data, at least one tracking log, at least one manifest document for a postal service, or both; and automatically tracking, by the at least one specifically programmed computer system, the mailings to the plurality of investors, based at least in part on the at least one unique production control bar code and at least one of the following: the at least one tracking log and the at least one manifest document.

In some embodiments, the above exemplary tracking the mailings includes: utilizing, by the at least one specifically programmed computer system, at least one camera to read an image of the at least one unique production control bar code, and automatically entering, by the at least one specifically programmed computer system, tracking data into the at least one tracking log.

In some embodiments, the above exemplary method further includes: applying a postage, by the at least one specifically programmed computer system, to such mailing envelope, based at least in part on the at least one unique production control bar code; or associating a postage, by the at least one specifically programmed computer system, to such mailing envelope, based at least in part on the at least one unique production control bar code.

In some embodiments, the above exemplary investment transactional data of each investor further includes account identifying data for at least one investment account of such investor with at least one financial institution.

In some embodiments, the above exemplary automatically assembling each mailing envelope further includes: automatically inserting at least one third document received from a financial institution associated with the investment transactional data of such investor.

In some embodiments, the above exemplary at least one first document, the at least one second document, or both, are: i) financial compliance documents and ii) represent branded documents or documents obtained from Edgar.

In some embodiments, the above exemplary determining includes: automatically confirming a first printed inventory of the at least one first document, a second printed inventory of the at least one second document, or both; and automatically suppressing a duplicate delivery, to each investor, of the at least one first document, the at least one second document, or both.

In some embodiments, the above exemplary at least one communication targeted to such investor includes at least one of the following: i) information related to the at least one investment that is, directly or indirectly, owned or managed by such investor, and ii) information related to at least one investment account of such investor.

In some embodiments, the above exemplary assembling of the mailings to the plurality of investors occurs before a second time period, and where a difference between the first time period and the second time period is twenty-four hours or less.

In some embodiments, the instant invention provides for a specially programmed computer system that includes at least the following components: at least one specialized computer machine that includes: a non-transient memory having at least one region for storing particular computer executable program code; and at least one processor for executing the particular program code stored in the memory, where the particular program code is configured so that the at least one specialize computer machine is configured to at least perform the following operations: periodically receiving, by at least one specifically programmed computer system, investment transactional data identifying investment transactions of a plurality of investors, where the investment transactional data is received during a first time period and where the investment transactional data, for each investor of the plurality of the inventors, includes: i) at least one investment identifier of at least one investment that is, directly or indirectly, owned or managed by such investor, and ii) at least one investment transaction identifier of each investment transaction of such investor that involves the at least one investment; where the plurality of investor comprises at least a thousand investors; automatically determining, by the at least one specifically programmed computer system, based, at least in part, on the investment transactional data, at least one first document, at least one second document, or both, to be mailed to each investor of the plurality of investors, where the at least one first document, the at least one second document, or both, are associated with the at least one investment of such investor; automatically generating, by the at least one specifically programmed computer system, a delivery data for each mailing to be mailed to each investor of the plurality of investors, where the delivery data includes: bucslip data or trade confirmation data, where the bucslip data includes: a mailing address of such investor and a listing of the at least one first document, the at least one second document, or both, to be mailed to such investor, and where the trade confirmation data includes: at least one trade confirmation for at least one investment transaction of such investor, and at least one of the following: a) the listing of the at least one first document, the at least one second document, or both, to be mailed to such investor, b) at least one communication targeted to such investor, ii) assembling data that identifies assembling instructions for assembling each mailing to be mailed to each investor of the plurality of investors, where the assembling instructions comprise a plurality of instructions selected from the group consisting of: a first instruction identifying a quantity of documents to be included in such mailing, a second instruction identifying a quantity of pages of documents to be included in such mailing, a third instruction identifying a type of each document to be included in such mailing, a fourth instruction identifying, for each document to be included in such mailing, that such document is to be packed in a folded condition or an unfolded condition, a fifth instruction identifying a finishing to be applied to each document to be included in such mailing, a sixth instruction identifying a type of a mailing envelope to be used for such mailing, a seventh instruction classifying such mailing by weight based, at least in part, on postal weight categories, an eight instruction identifying a postage data based, at least in part, on the classifying such mailing in accordance with the seventh instruction, and a ninth instruction identifying a predetermined number of the investment transactions to which such mailing corresponds, based, at least in part, on: a first size and a first thickness of the at least one first document, and a second size and a second thickness of the at least one second document; iii) unique production control bar code data, generated based, at least in part, on the assembling data and the at least one investment transaction identifier; and printing at least one unique production control bar code based, at least in part, on the unique production control bar code data, where the unique production control bar code is configured to be used for: i) assembling each mailing envelope, and ii) tracking such mailing envelope before such mailing envelope is deposited with a postal service.

BRIEF DESCRIPTION OF THE FIGURES

The present invention can be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

Figure 1:
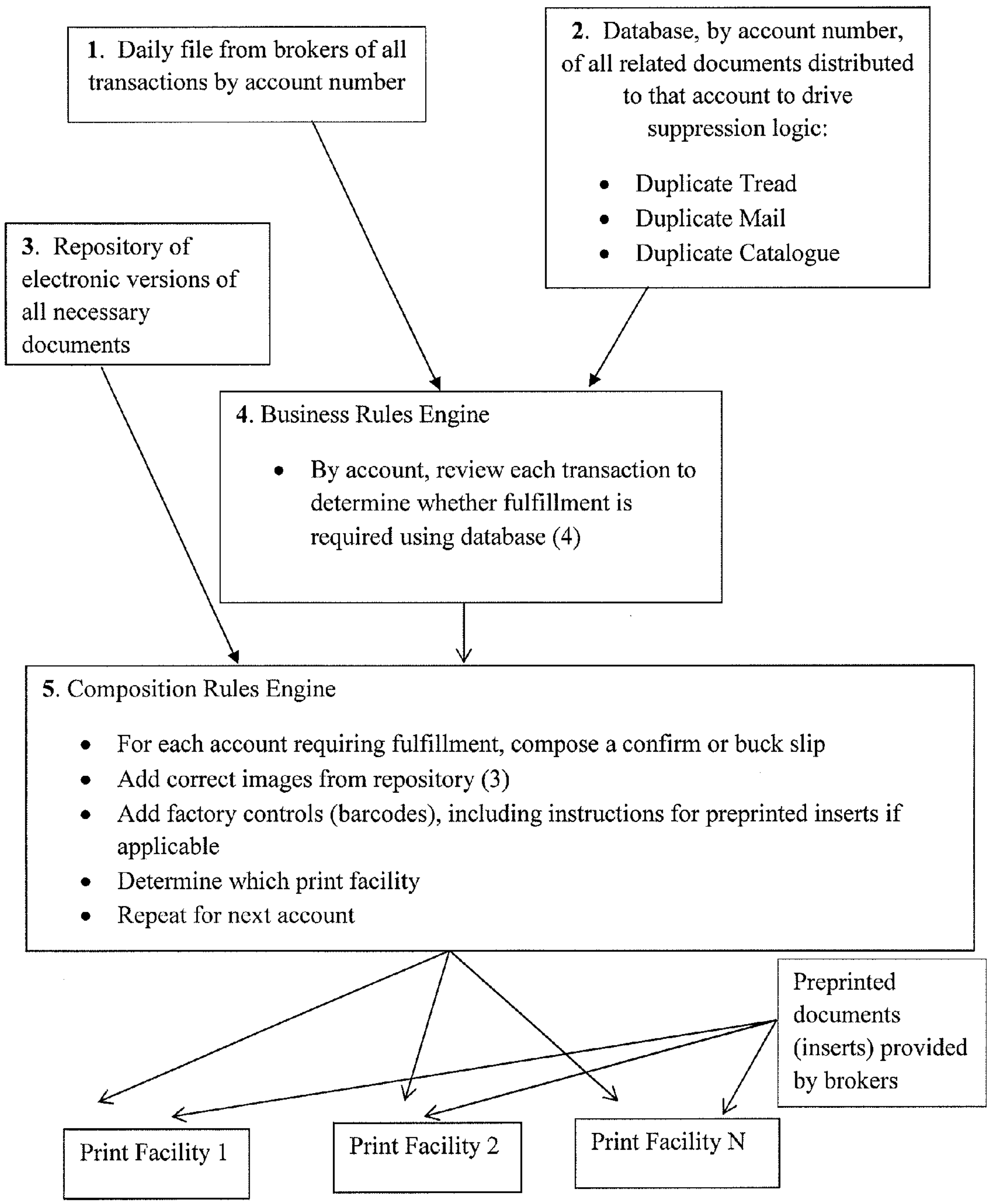
FIG. 1 is a flowchart representative of some embodiments of the present invention.

In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

DETAILED DESCRIPTION OF INVENTION

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive. Any alterations and further modifications of the inventive feature illustrated herein, and any additional applications of the principles of the invention as illustrated herein, which can normally occur to one skilled in the relevant art and having possession of this disclosure, are to be considered within the scope of the invention.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of"a," "an," and "the" include plural references. The meaning of "in" includes "in" and "on."

In some embodiments, the instant computer-implemented methods and computer systems are directed to automated on-demand customizable assembling and high throughput printing (identified, for example, in some specific instances in Figures and this description by the term "AOS") of documents such as, but not limited to, prospectuses of mutual funds and/or materials of issuers that mutual funds and/or issuers want and/or require to provide to their own investors/shareholders. In some embodiments, the terms "post-sale," "post-sale fulfillment," and similar are referred herein to the provision of particular documents after, for example, an investment purchase transaction has occurred.

As used herein, a "financial instrument" refers to a contract/interest representing equity ownership, debt or credit, typically in relation to a corporate or governmental entity, where the contract is typically saleable at one or more financial trading venues. Some examples of "financial instruments" can include, but are not limited to, stocks, bonds, commodities, swaps, futures, and currency traded on currency exchanges.

As used herein, the terms "automated" and "dynamic(ly)" identify an event/action that can occur without any human intervention. In some embodiments, the automated/dynamic event/action might occur in real-time or periodically such as, but not limited to, less than hourly, hourly, daily, weekly, and/or monthly.

In some embodiments, the inventive computer systems/machines of the instant invention allow to customizable assembling and high throughput printing of at least two distinct documents for each of at least 1,000 recipients. In some embodiments, the inventive computer systems/machines of the instant invention allow to customizable assembling and high throughput printing of at least five distinct documents for each of at least 1,000 recipients. In some embodiments, the inventive computer systems/machines of the instant invention allow to customizable assembling and high throughput printing of at least ten distinct documents for each of at least 1,000 recipients. In some embodiments, the inventive computer systems/machines of the instant invention allow to customizable assembling and high throughput printing of at least fifteen distinct documents for each of at least 1,000 recipients. In some embodiments, the inventive computer systems/machines of the instant invention allow to customizable assembling and high throughput printing of at least twenty distinct documents for each of at least 1,000 recipients. In some embodiments, the inventive computer systems/machines of the instant invention allow to customizable assembling and high throughput printing of at least fifty distinct documents for each of at least 1,000 recipients.

In some embodiments, the inventive computer systems/machines of the instant invention allow to customizable assembling and high throughput printing of at least two distinct documents for each of at least 1,000 recipients. In some embodiments, the inventive computer systems/machines of the instant invention allow to customizable assembling and high throughput printing of at least two distinct documents for each of at least 10,000 recipients. In some embodiments, the inventive computer systems/machines of the instant invention allow to customizable assembling and high throughput printing of at least two distinct documents for each of at least 1,000 recipients. In some embodiments, the inventive computer systems/machines of the instant invention allow to customizable assembling and high throughput printing of at least two distinct documents for each of at least 100,000 recipients. In some embodiments, the inventive computer systems/machines of the instant invention allow to customizable assembling and high throughput printing of at least two distinct documents for each of at least 1,000,000 recipients.

In some embodiments, the inventive computer systems/machines of the instant invention allow to customizable assembling and high throughput printing of at least two distinct documents for each of at least 25 recipients within a period of few minutes from the receipt of information associated with a triggering action/event (e.g., purchase of a security). In some embodiments, the inventive computer systems/machines of the instant invention allow to customizable assembling and high throughput printing of at least two distinct documents for each of at least 50 recipients within a period of time that is less than an hour from the receipt of information associated with a triggering action/event (e.g., purchase of a security). In some embodiments, the inventive computer systems/machines of the instant invention allow to customizable assembling and high throughput printing of at least two distinct documents for each of at least 1,000 recipients within a period of time that is less than 24 hours from the receipt of information associated with a triggering action/event (e.g., purchase of a security). In some embodiments, the inventive computer systems/machines of the instant invention allow to customizable assembling and high throughput printing of at least two distinct documents for each of at least 5,000 recipients within a period of time that is less than 36 hours from the receipt of information associated with a triggering action/event (e.g., purchase of a security). In some embodiments, the inventive computer systems/machines of the instant invention allow to customizable assembling and high throughput printing of at least two distinct documents for each of at least 10,000 recipients within a period of time that is less than 48 hours from the receipt of information associated with a triggering action/event (e.g., purchase of a security). In some embodiments, the inventive computer systems/machines of the instant invention allow to customizable assembling and high throughput printing of at least two distinct documents for each of at least 100,000 recipients within a period of time that is less than 72 hours from the receipt of information associated with a triggering action/event (e.g., purchase of a security). In some embodiments, the inventive computer systems/machines of the instant invention allow to customizable assembling and high throughput printing of at least two distinct documents for each of at least 1,000,000 recipients within a period of time that is less than 7 days from the receipt of information associated with a triggering action/event (e.g., purchase of a security). In some embodiments, the inventive computer systems/machines of the instant invention allow to customizable assembling and high throughput printing of documents within a period of time that is less than 10 days from the receipt of information associated with a triggering action/event (e.g., purchase of a security).

In some embodiments, the customizable assembling of the instant invention includes automatic compiling at least two distinct documents into at least one delivery packaging (e.g., a mailing envelop). In some embodiments, the customizable assembling of the instant invention includes automatic compiling at least two distinct documents into at least one delivery packaging (e.g., a mailing envelop) that has been further automatically prepared with a metered postage based on the packaging characteristics such as, but not limited to, weight and size.

In some embodiments, the inventive computer systems/machines of the instant invention are utilized to automatically manage document inventory levels (e.g., prospectuses). In some embodiments, the inventive computer systems/machines of the instant invention allow to automatically create queues when at least one of the following conditions occurs:

When a backorder condition occurs and the inventory is not sufficient to fulfill current trade requirements;

When the inventory level falls below a minimum threshold;

When the projected demand exceeds the quantity on hand; and

When a document (e.g., prospectuses) is due to expire and/or no longer valid.

In some embodiments, the inventive computer systems/machines of the instant invention allows to satisfy compliance for the Post Sale deliveries by ensuring that the latest version of the Prospectus filed with the SEC via Edgar, is the version that is delivered to the investor.

In some embodiments, the inventive computer systems/machines of the instant invention automatically calculate a recommended order quantity based on the security type and/or other business rules. In some embodiments, the quantity can be manually overridden prior to placing the order. In some embodiments, Individual or bulk orders can be submitted to the vendors or issuers automatically, as the queues are worked.

In some embodiments, the inventive computer systems/machines of the instant invention offer the ability to view and report on ordering history to satisfy inquiries. In some embodiments, the inventive computer systems/machines of the instant invention allow users to manage electronic versions of documents with print on demand (e.g., on-depand printing of Summary prospectuses).

In some embodiments, the inventive computer systems/machines of the instant invention are described in accidence with term definitions given in Table 1.1.

TABLE 1.1

| Term | Definition |
|---|---|
| PSEG | AFP Page Segment Resource file. |
| PDF | Adobe Portable Data Format document file |
| Receipt ID | A numerical identifier that uniquely identifies the PDF for Broadridge Systems |
| AFP ID | The Receipt Id represented as num-36 (digits 0-9A-Z) |
| Transform | The process that converts PDF or postscript data into AFP |
| WMS | Warehouse Management System |
| AFP | Advanced Function Printing (AFP) is a document format originally defined by IBM to drive its printers and support the typical form printing on laser printers. |
| EDGAR | Electronic Data Gathering, Analysis and Retrieval. System that performs automated collection, validation, indexing, acceptance, and forwarding of submissions by companies and others who are required by law to file forms with the SEC. |
| AOS | Automated Ordering System |
| DPS | Digital Print Solution |
| DTE | Document Transformation Engine |

In some embodiments, the inventive computer systems/machines of the instant invention can offer the following illustrative functionalities, detailed in Table 1.2.

TABLE 1.2

| Interface Name | Incoming/ Outgoing | Platform | Purpose |
|---|---|---|---|
| Prospectus Plus | In/Out | Mainframe | Prospectus Plus:<br>1. Processes incoming data from Banks/Brokers.<br>2. Feeds the WMS (warehouse management system) system with order data.<br>3. Feeds the DPS system with print requests.<br>4. Accepts feeds from the WMS system.<br>5. Transmits data back to the Banks/Brokers.<br>6. Transmits data to Document processing repository(ies) and receives data/PDF documents from Document processing repository(ies).<br>7. Receives data/PDF documents from Mutual Fund companies.<br>8. Feeds WMS with Document IDs from EDIT/LOAD feeds. |
| WMS | In/Out | Distributed | WMS:<br>1. Processes order data and feeds Prospectus Plus.<br>2. Feeds Prospectus Plus the High Speed data elements.<br>3. Communicates to AOS/DHS directly.<br>4. Feeds Prospectus Plus with the High Speed data for the Document processing repository(ies) process. |
| AOS/DTE | In/Out | Distributed | AOS/DTE:<br>1. Uploads PDF documents and pass them on to the document transformation engine.<br>2. Passes PDF documents and XML sidecar to Document processing repository(ies).<br>3. Receives PDF documents and mapping from Document processing repository(ies).<br>4. Accesses PDF documents stored in Electronic Document Delivery and Archival system. |
| Document processing repository(ies) VDW | In/Out | Distributed | VDW:<br>1. Mines the EDGAR database and produces PDF documents based on the EDGAR filings.<br>2. Stores and make available PDF documents. |
| Electronic Document Delivery and Archival system | In/Out | Distributed | Electronic Document Delivery and Archival system:<br>1. Document archive that communicates to other systems using the Electronic Document Delivery and Archival system's APIs and direct network connectivity. |
| DPS | In/Out | Distributed | DPS:<br>1. Receives print requests and produces finished documents. |

Exemplary Step-by-Step Flow Processes

In some embodiments, the inventive computer methods and the computer systems/machines of the instant invention operate in accordance with an exemplary flow process of FIG. 1.

Figure 2:
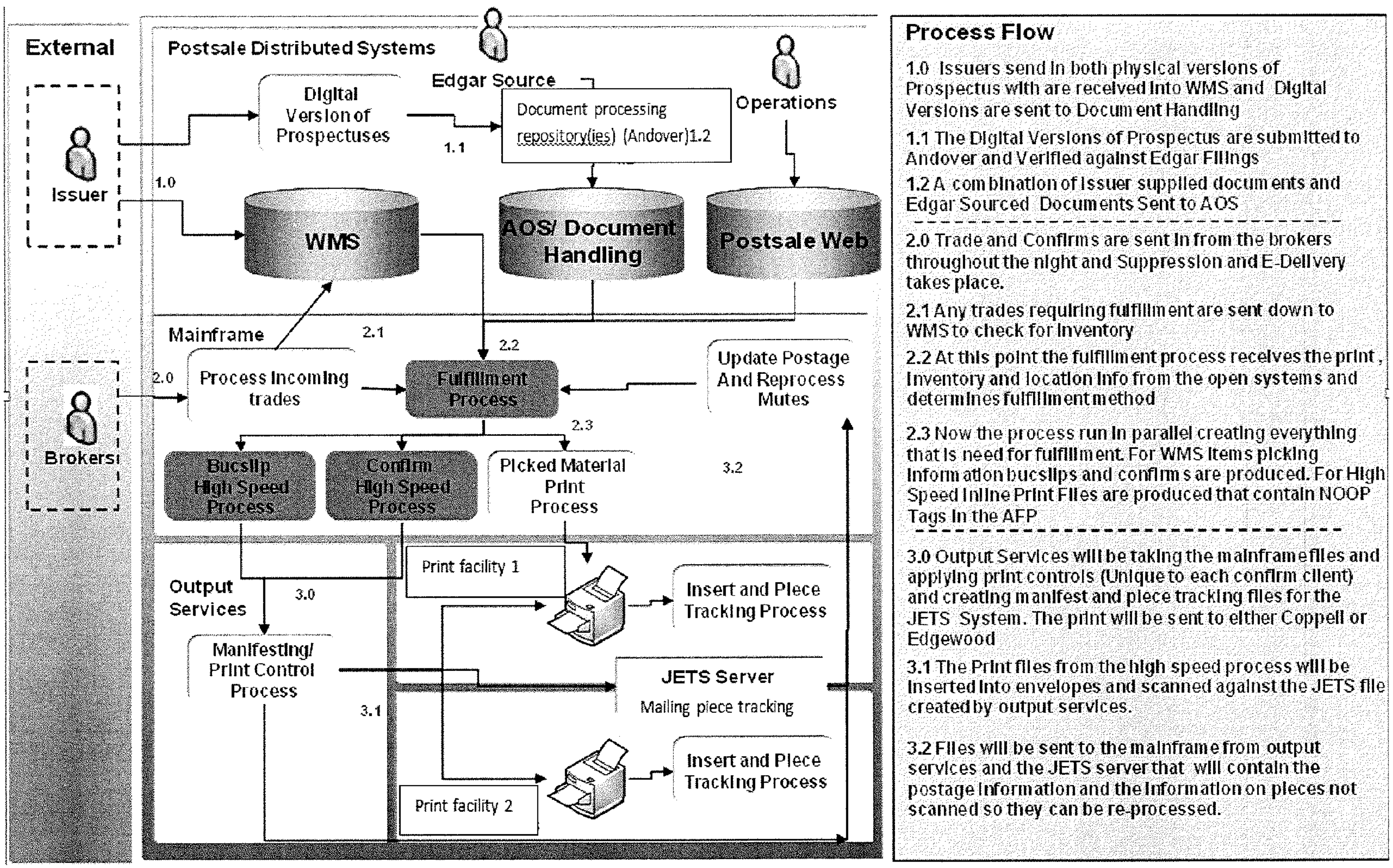
FIG. 2 is a screenshot representative of some embodiments of the present invention.

In some embodiments, the inventive computer methods and the computer systems/machines of the instant invention operate in accordance with an exemplary flow process of FIG. 2.

Figure 3:
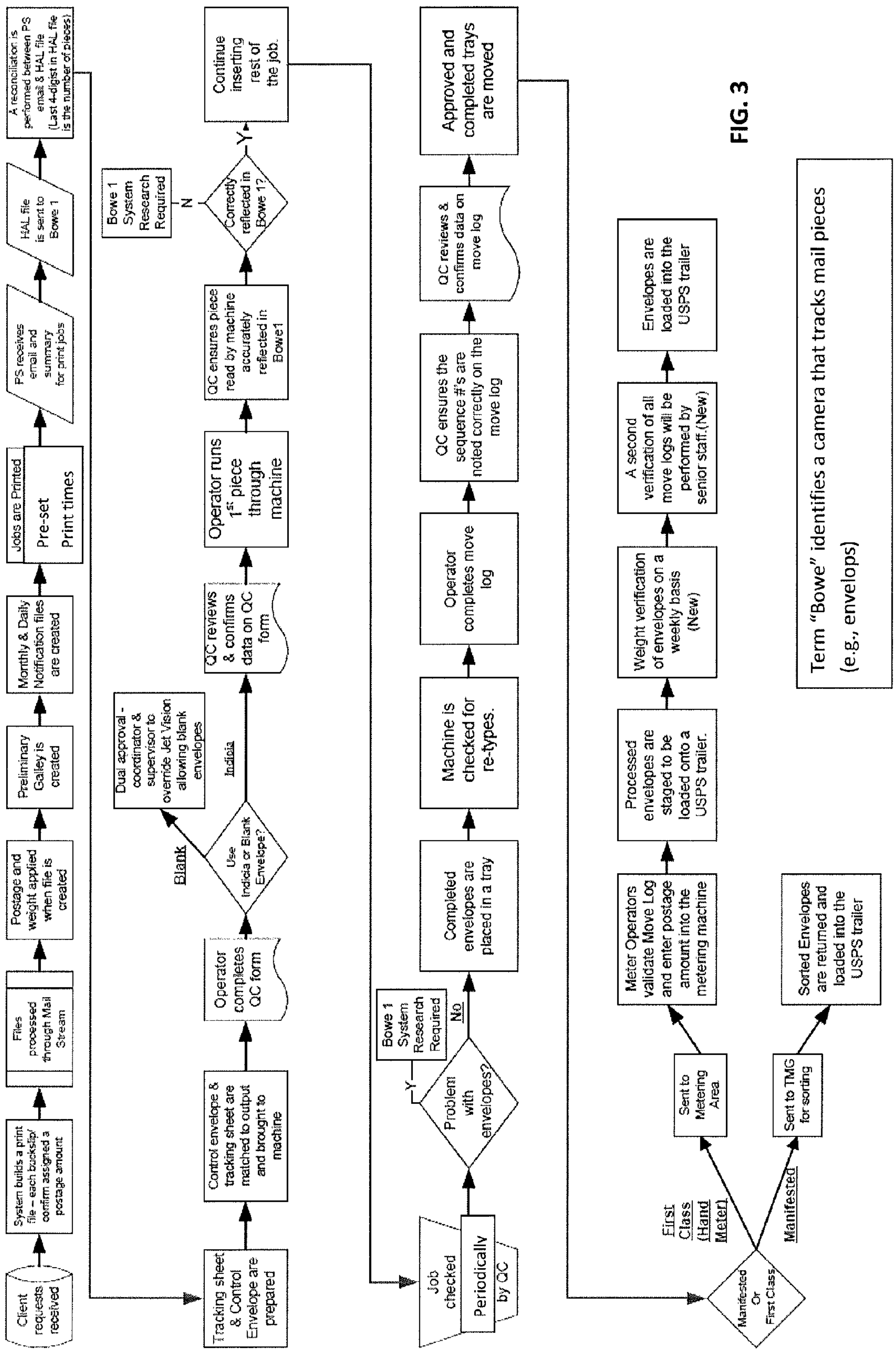
FIG. 3 is a screenshot representative of some embodiments of the present invention.
Figure 4A:
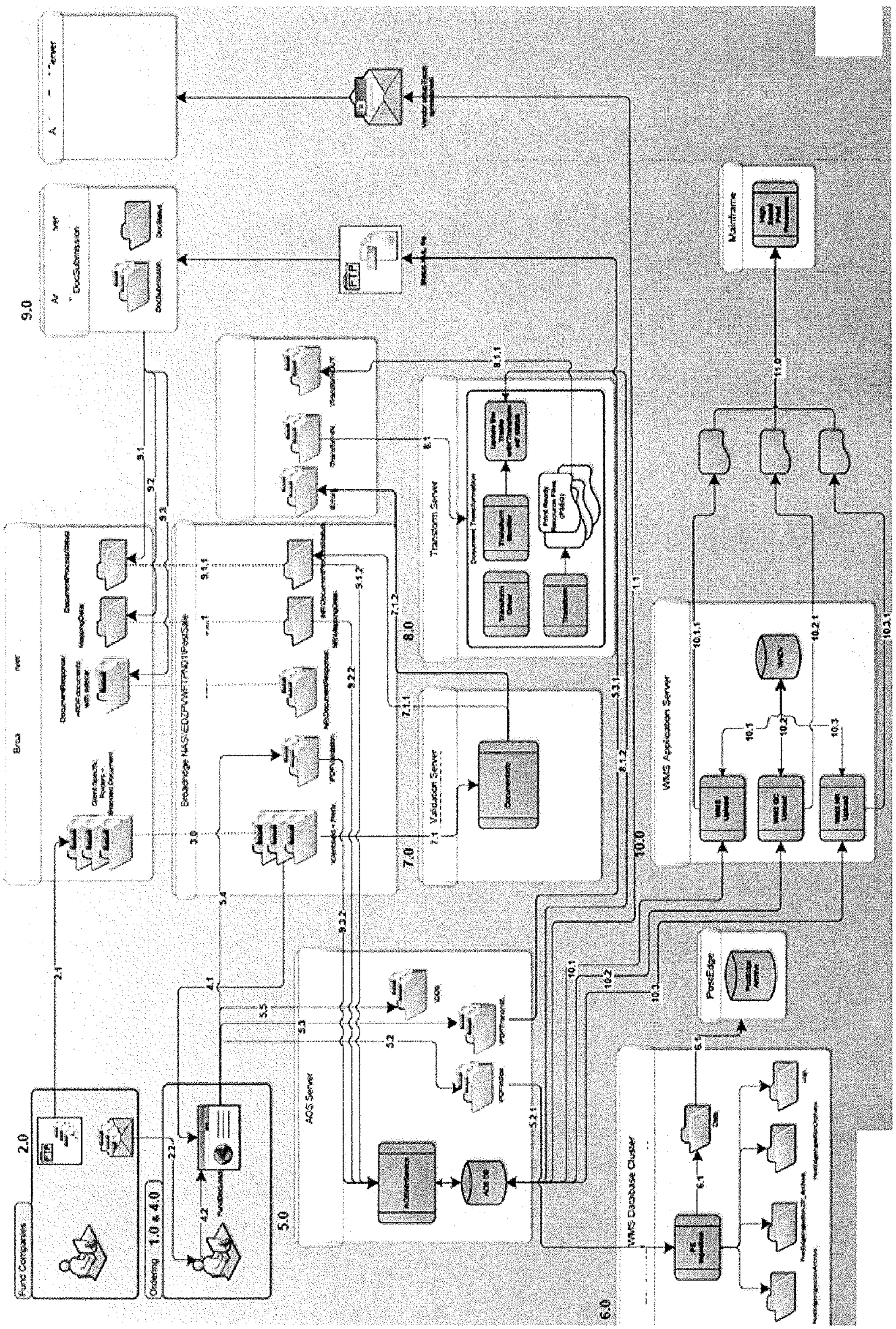
FIGS. 4A-4G are screenshots representative of some embodiments of the present invention.
Figure 4B:
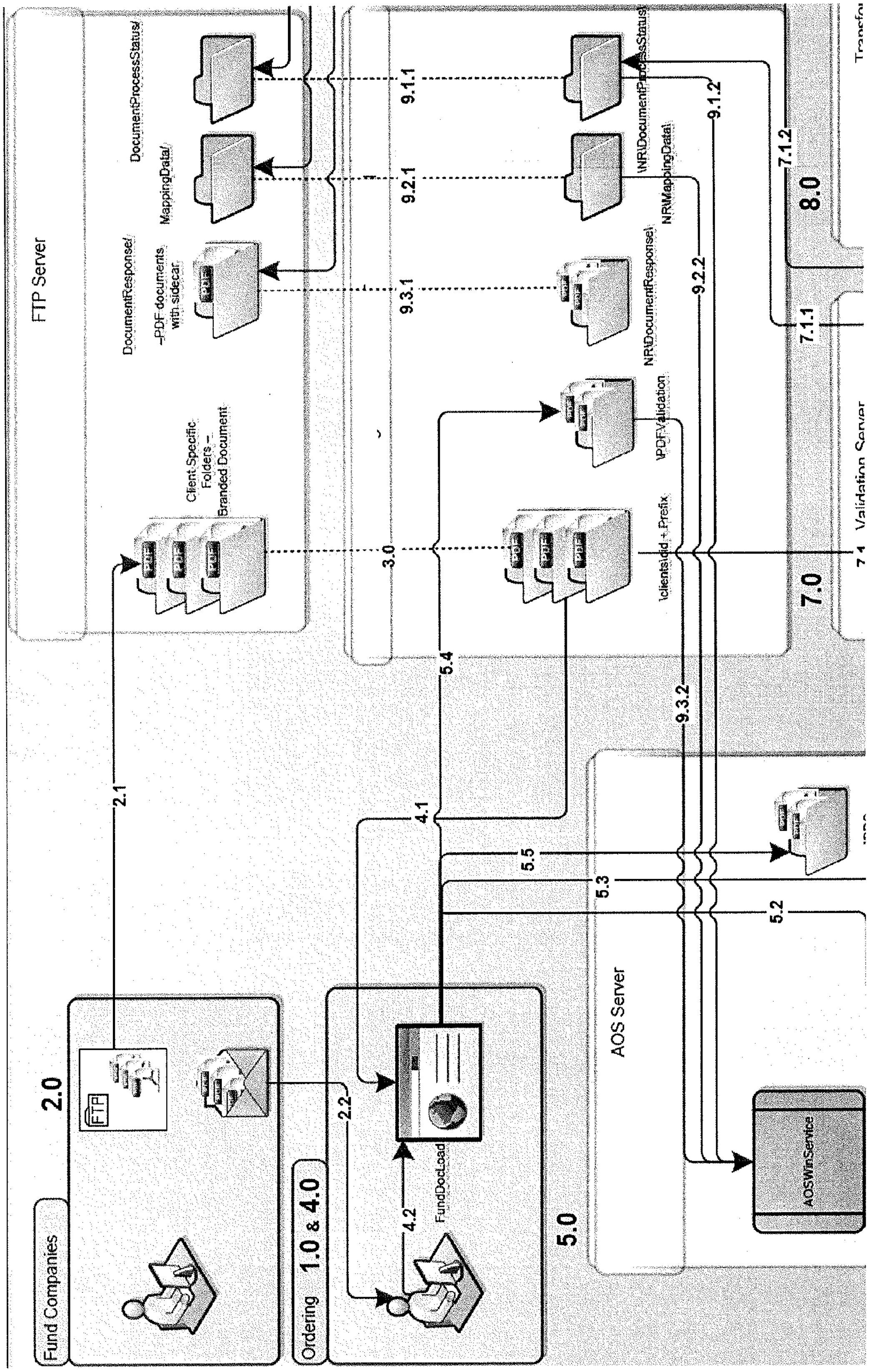
Figure 4C:
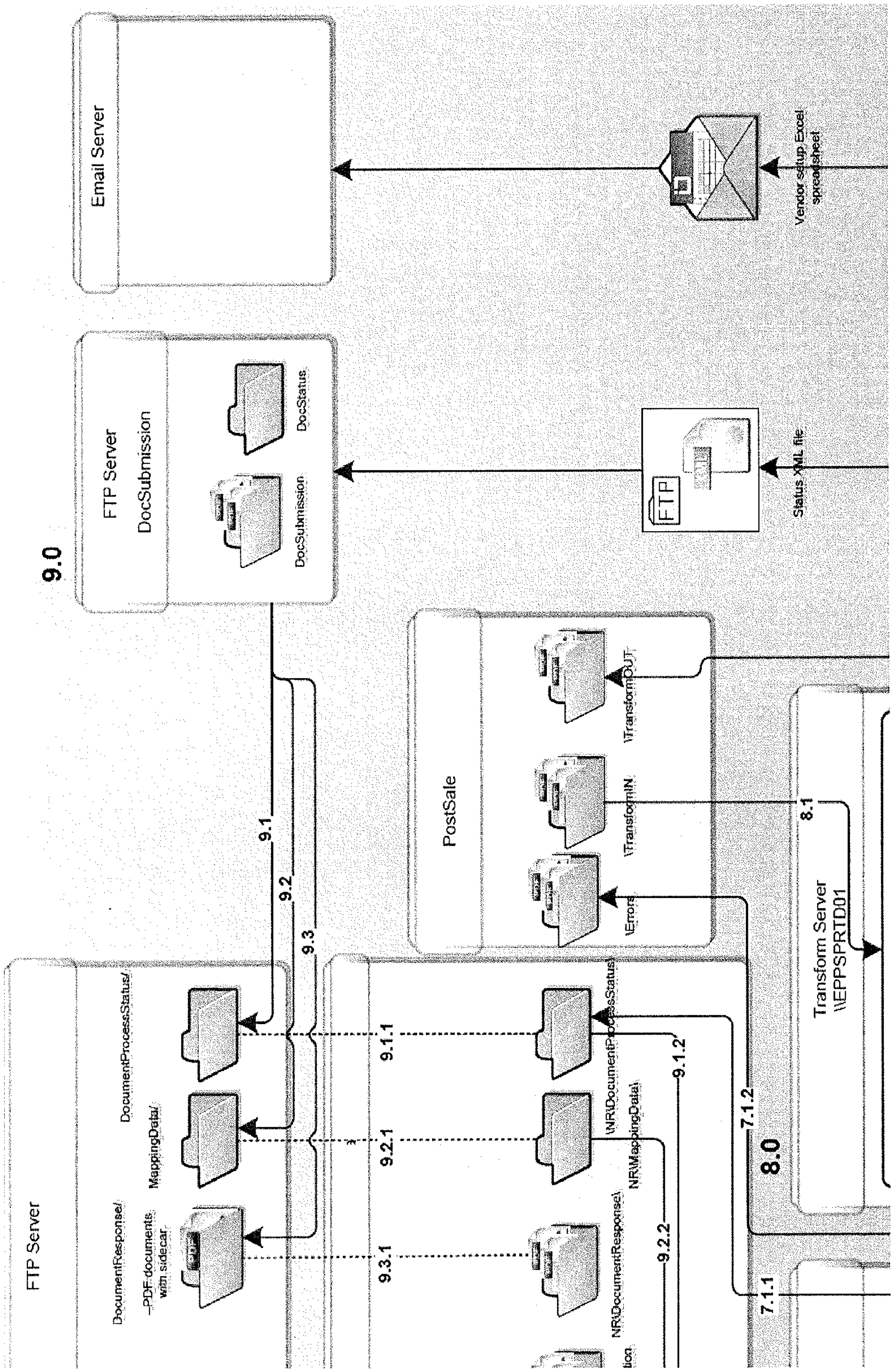
Figure 4D:
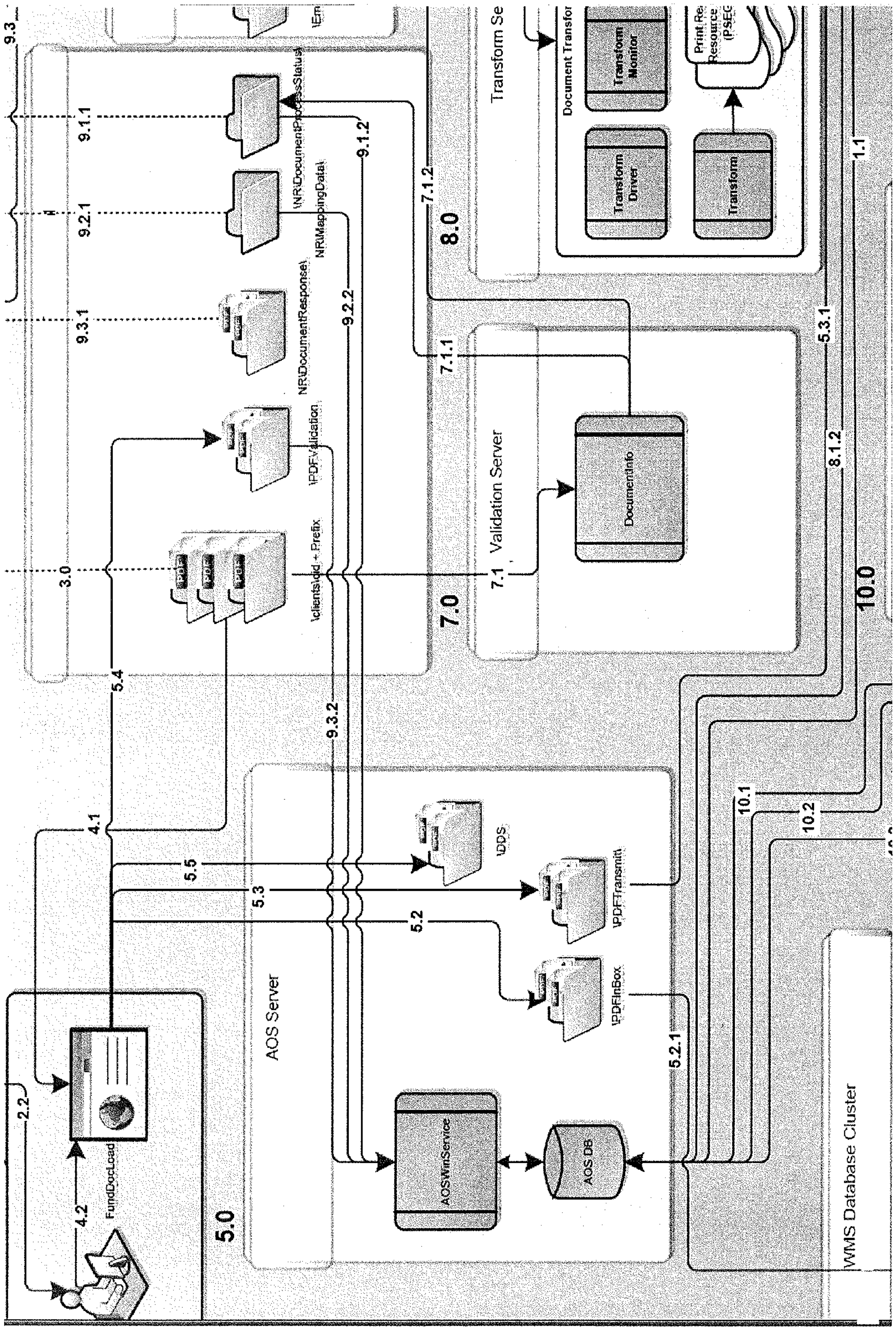
Figure 4E:
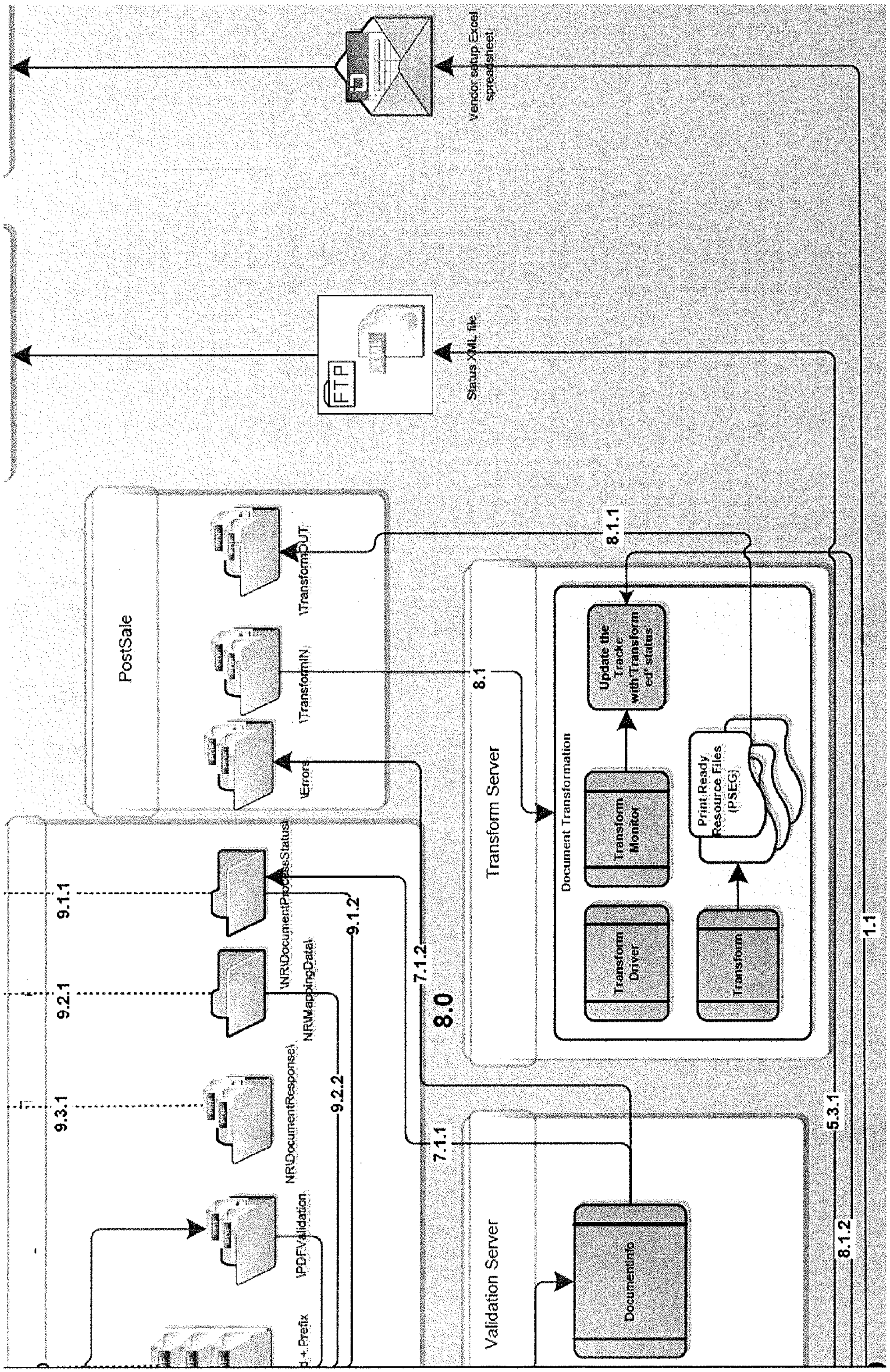
Figure 4F:
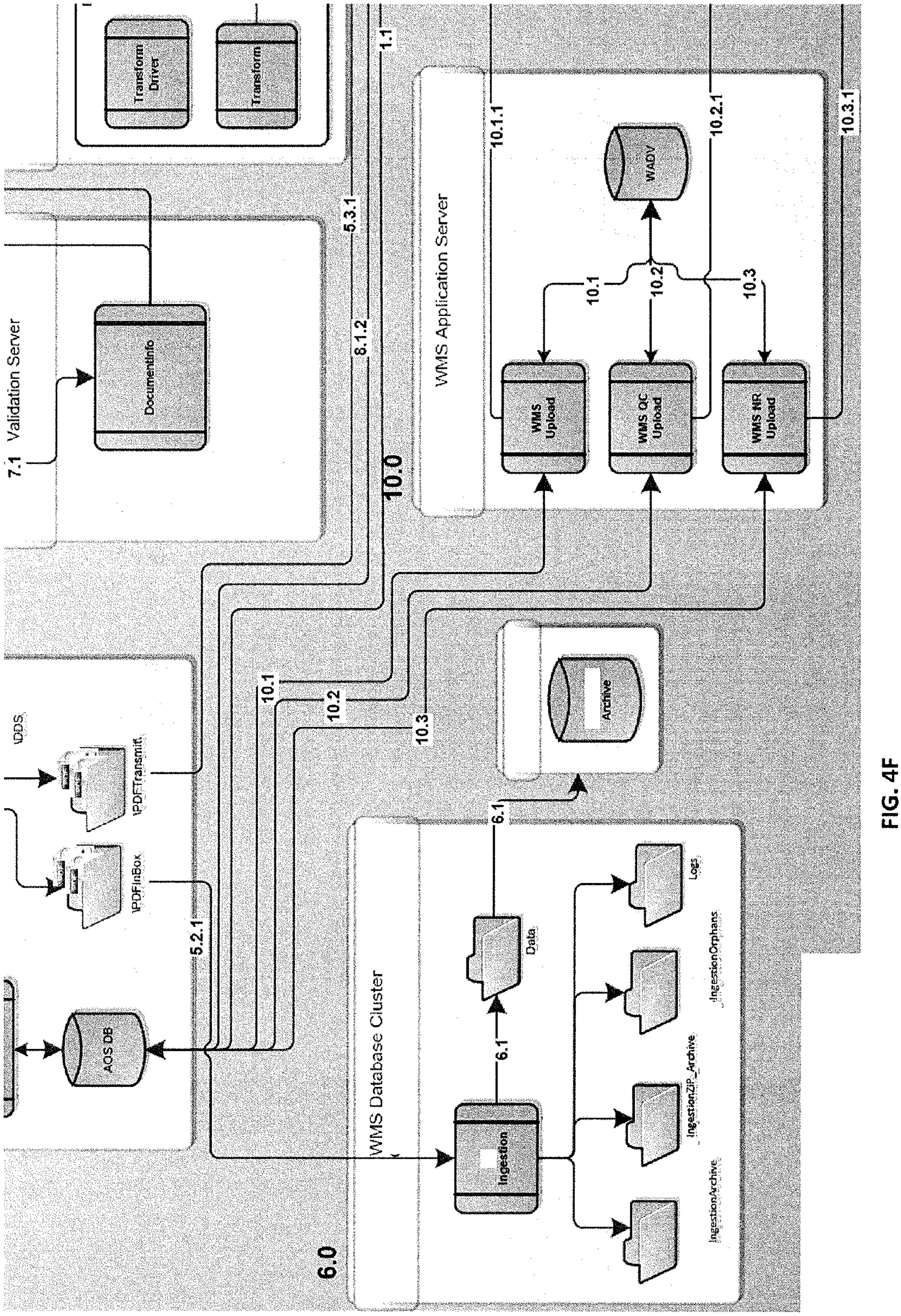
Figure 4G:
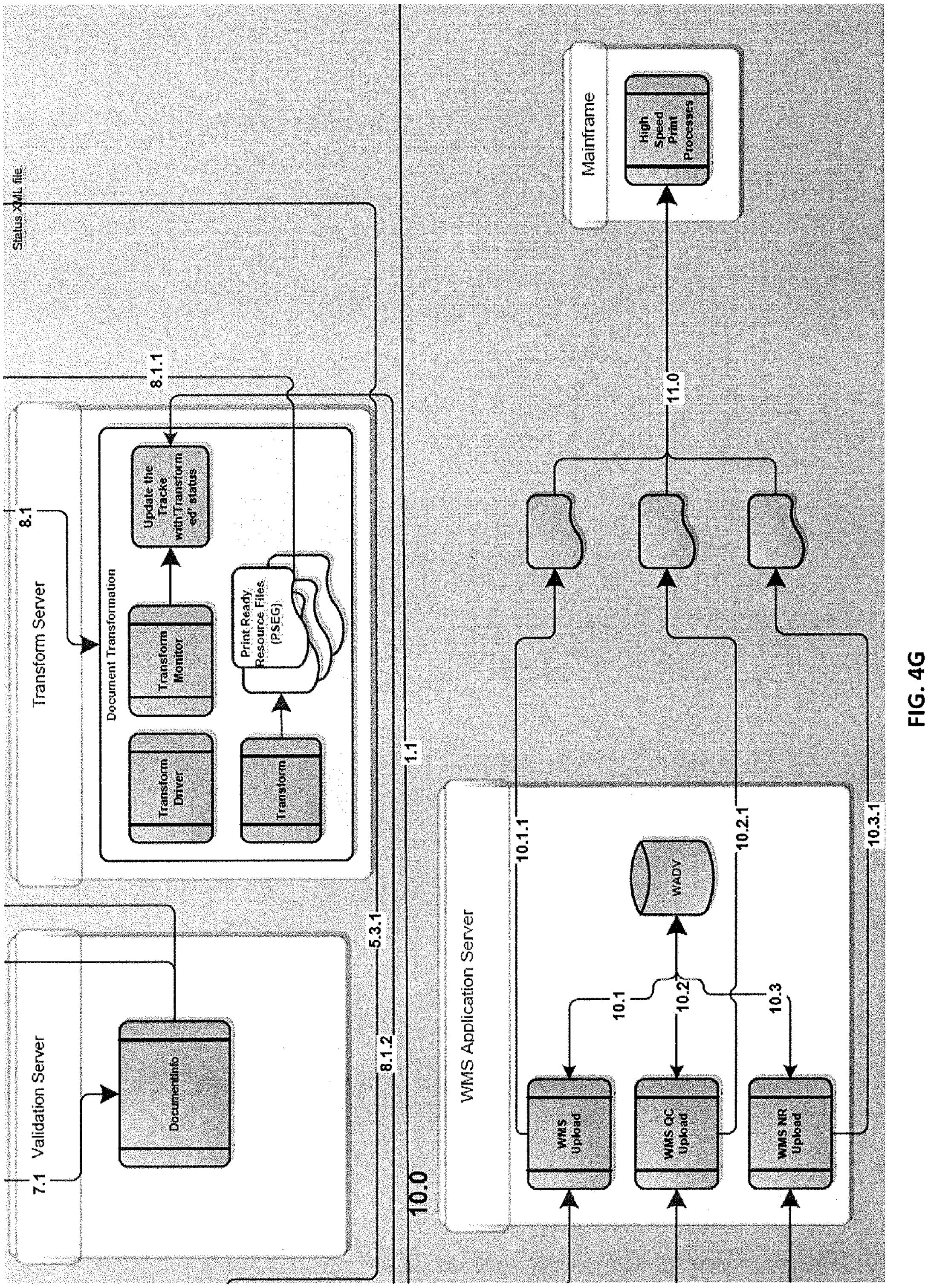

In some embodiments, the inventive computer methods and the computer systems/machines of the instant invention operate in accordance with an exemplary flow process of FIG. 3.

In some embodiments, the inventive computer methods and the computer systems/machines of the instant invention operate in accordance with an exemplary flow process of FIGS. 4A-4G.

Figure 5:
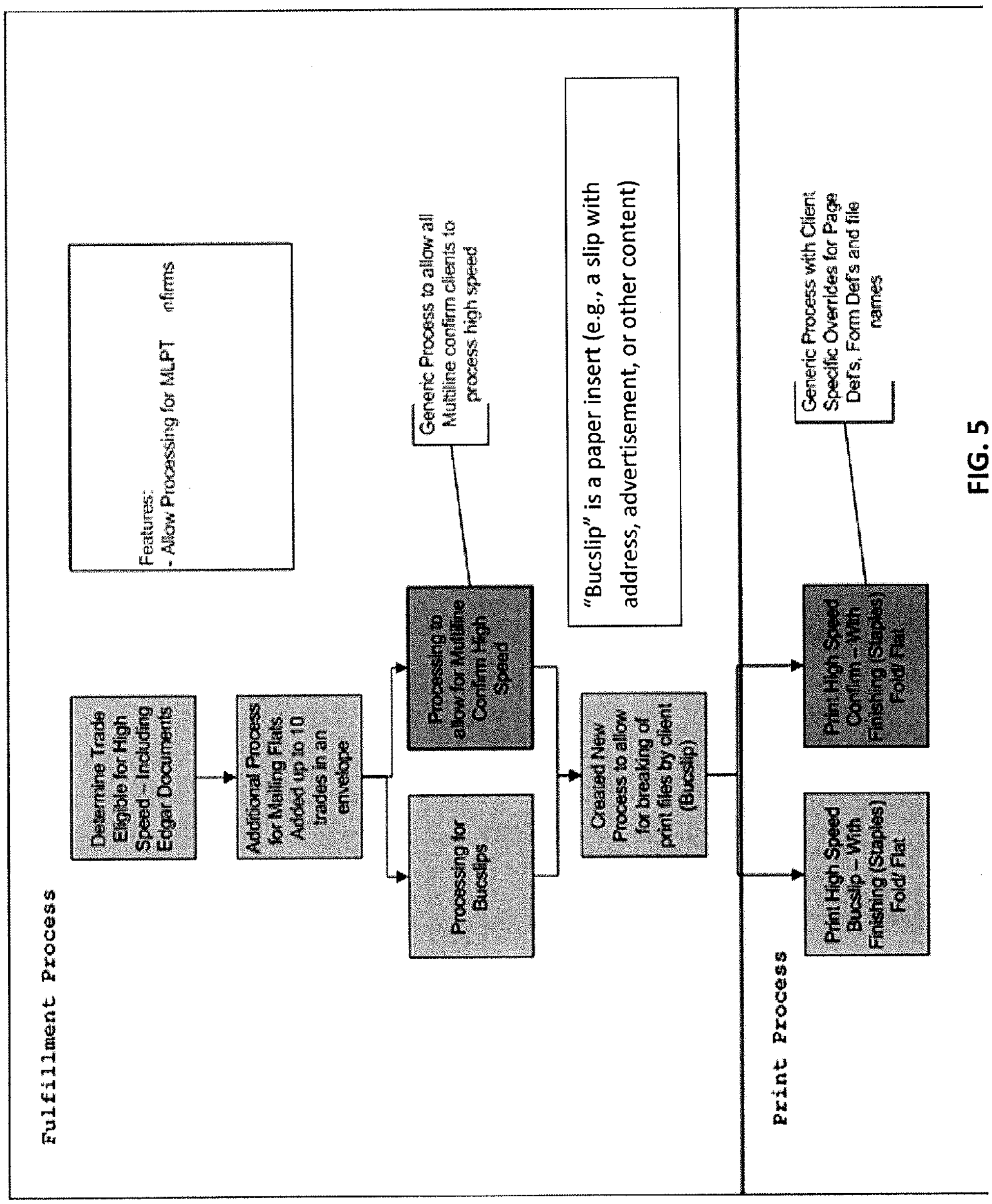
FIGS. 5-61 are screenshots representative of some embodiments of the present invention.

In some embodiments, the inventive computer methods and the computer systems/machines of the instant invention operate in accordance with an exemplary flow process of FIG. 5.

Figure 6:
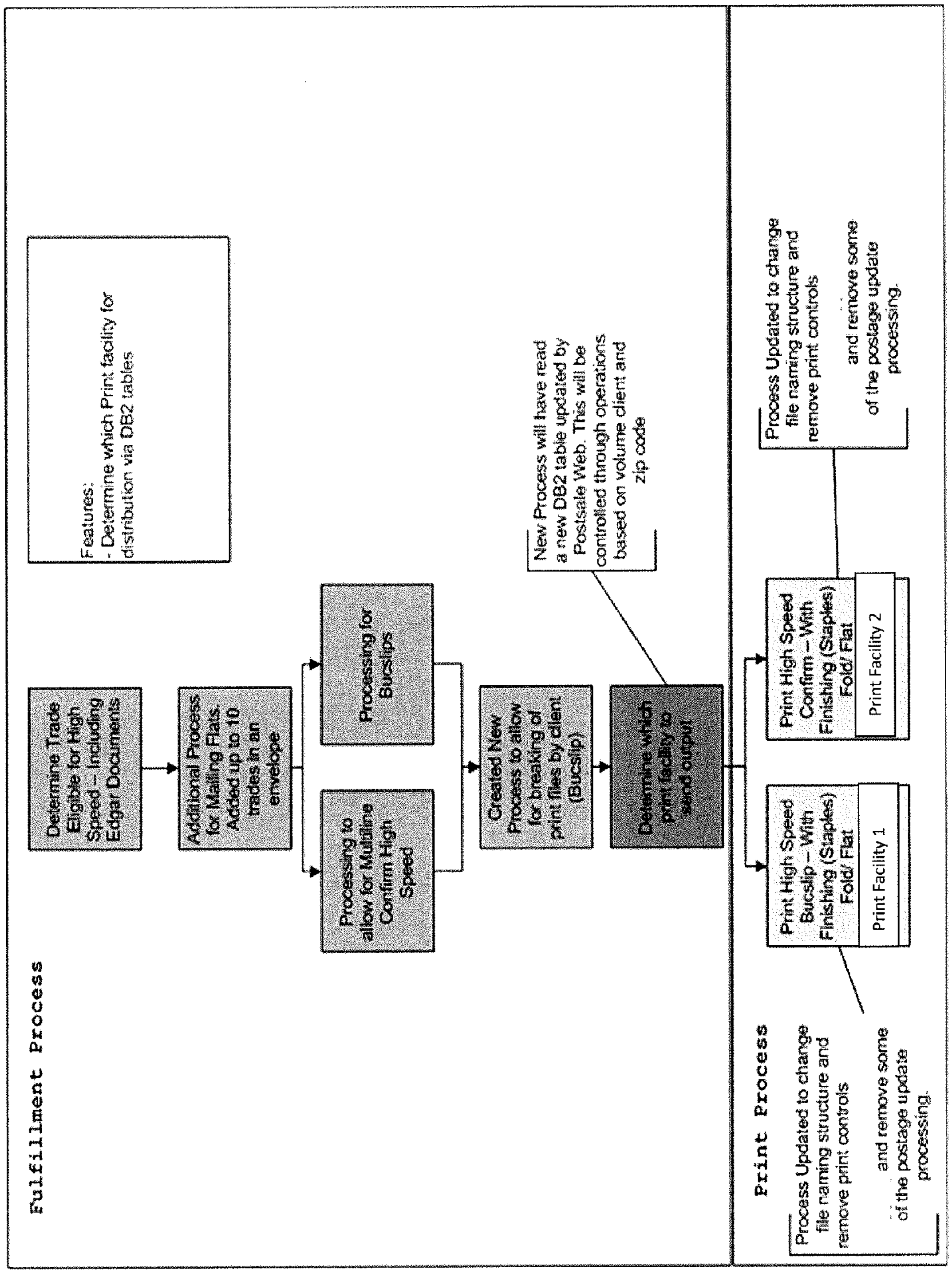

In some embodiments, the inventive computer methods and the computer systems/machines of the instant invention operate in accordance with an exemplary flow process of FIG. 6.

Figure 7:
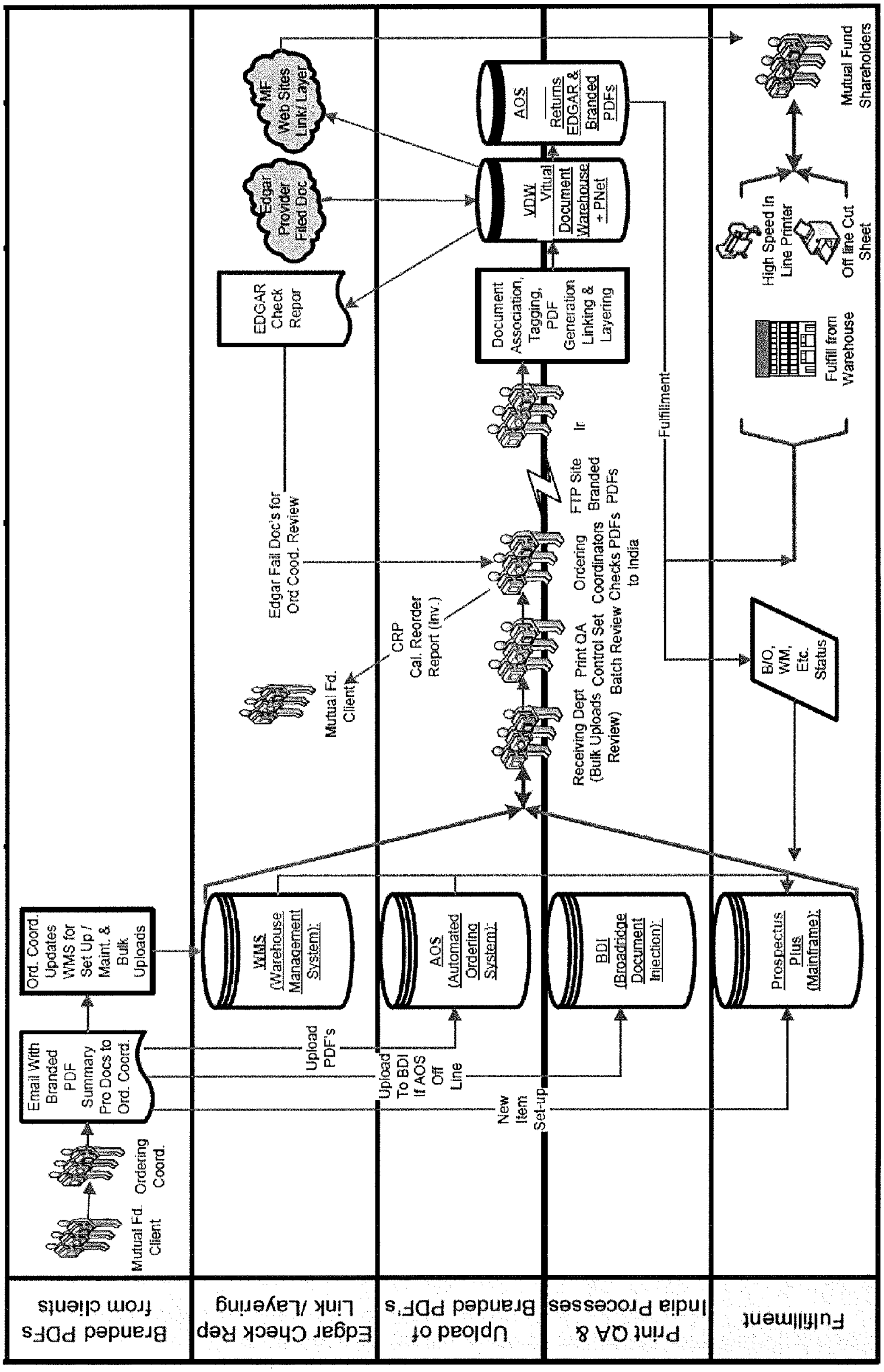

In some embodiments, the inventive computer methods and the computer systems/machines of the instant invention operate in accordance with an exemplary flow process of FIG. 7.

Figure 8:
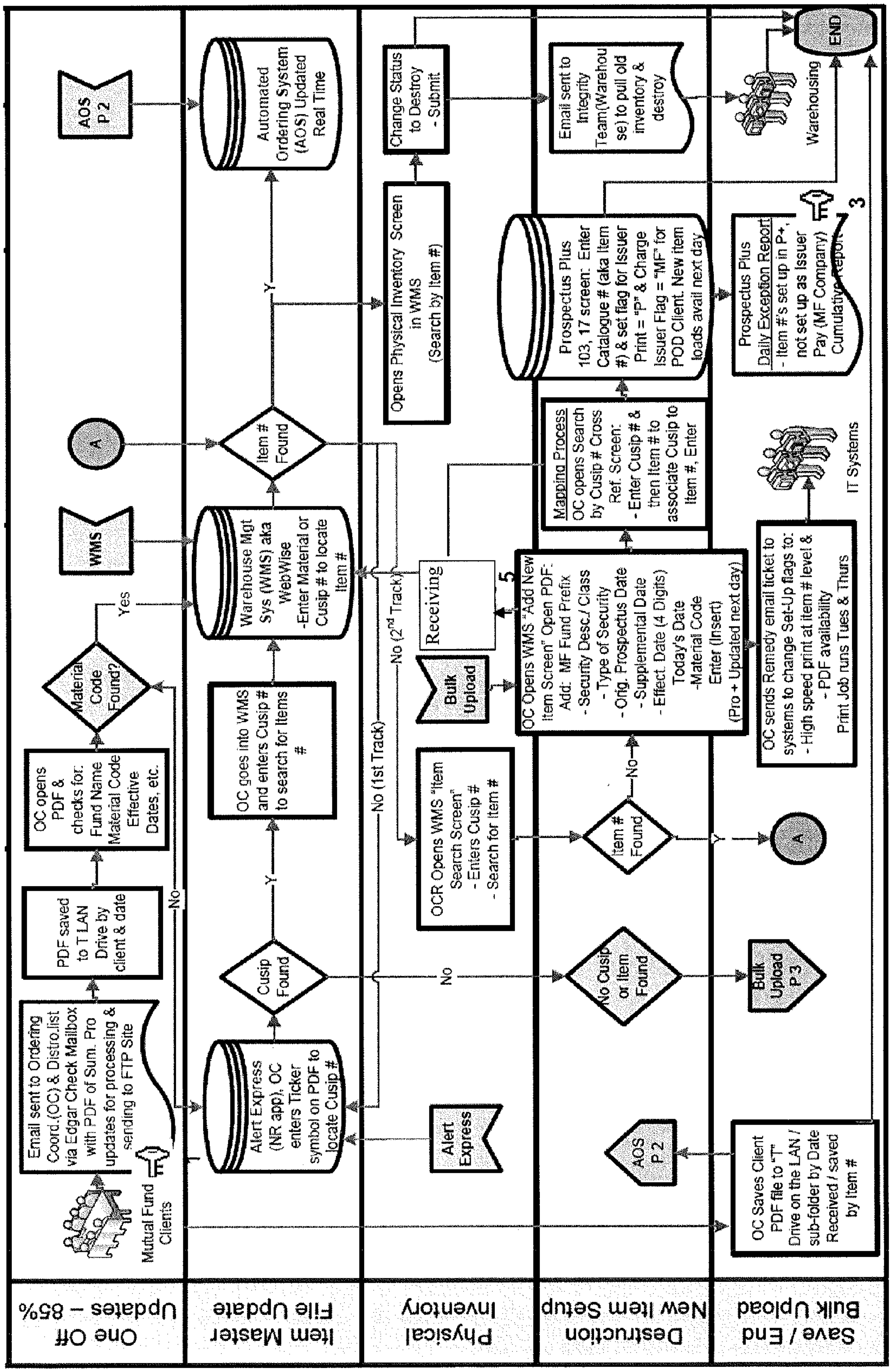

In some embodiments, the inventive computer methods and the computer systems/machines of the instant invention operate in accordance with an exemplary flow process of FIG. 8.

Figure 9:
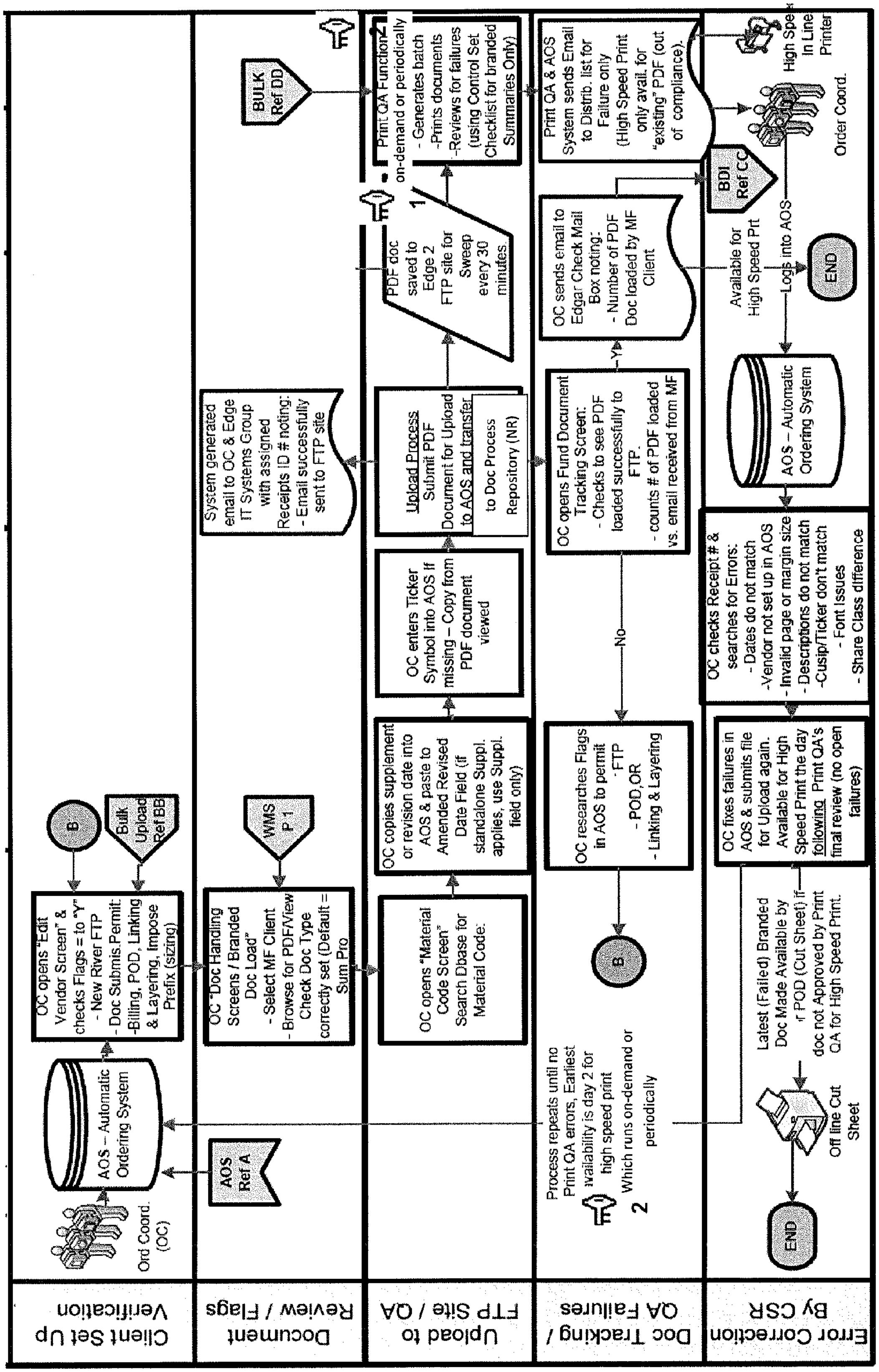

In some embodiments, the inventive computer methods and the computer systems/machines of the instant invention operate in accordance with an exemplary flow process of FIG. 9.

Figure 10:
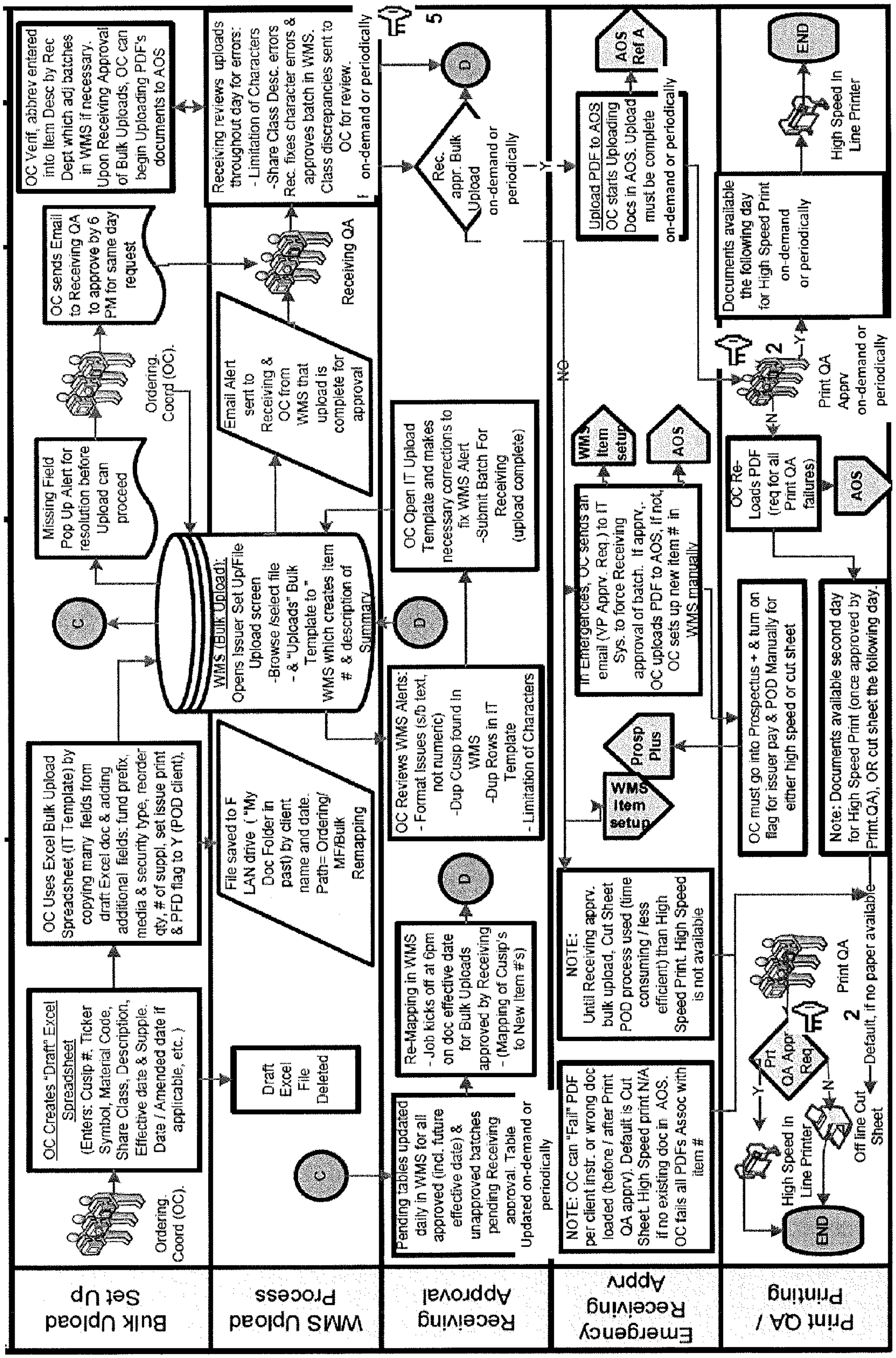
Figure 11:
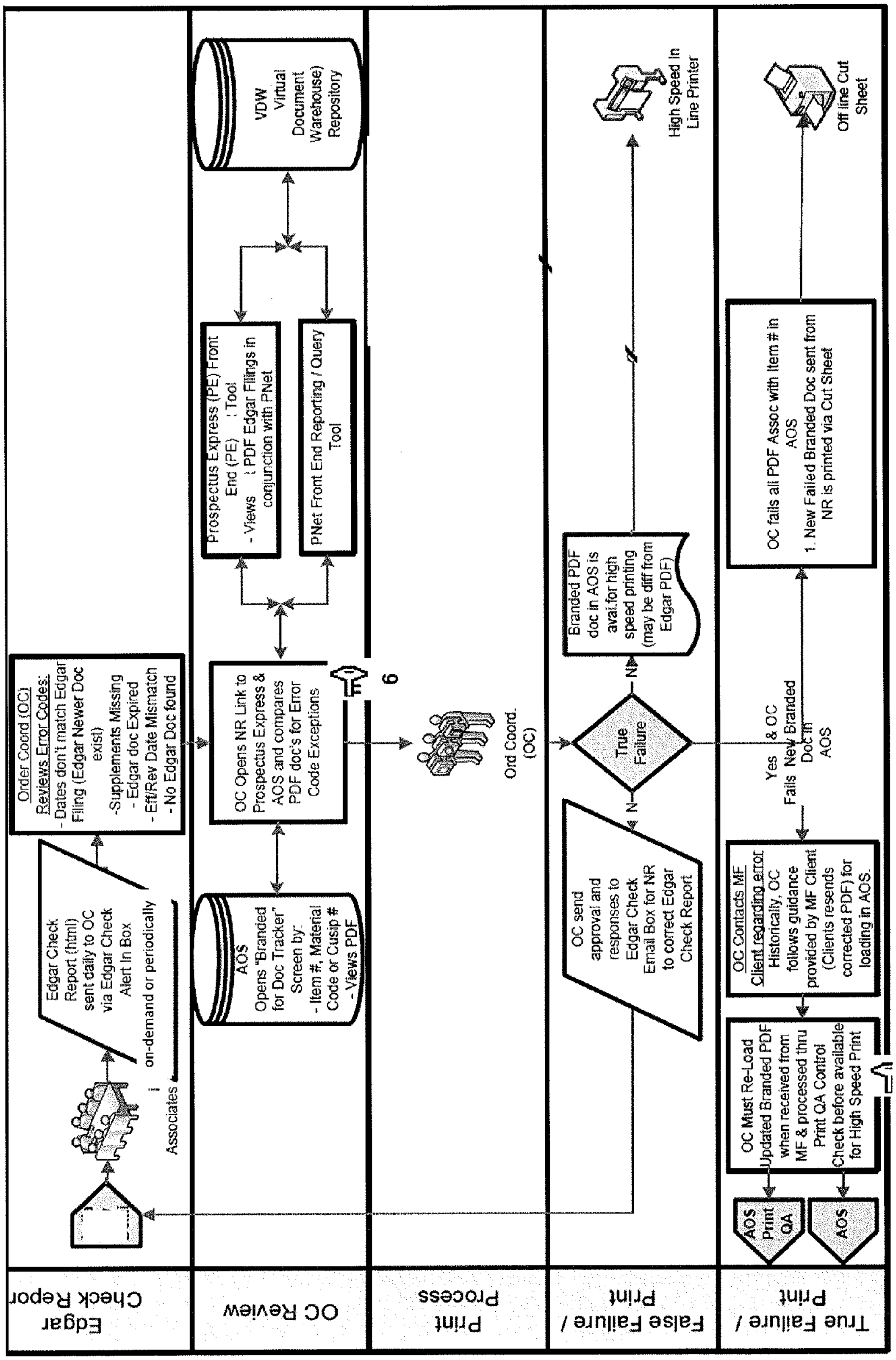

In some embodiments, the inventive computer methods and the computer systems/machines of the instant invention operate in accordance with an exemplary flow process of FIG. 10.

Figure 12:
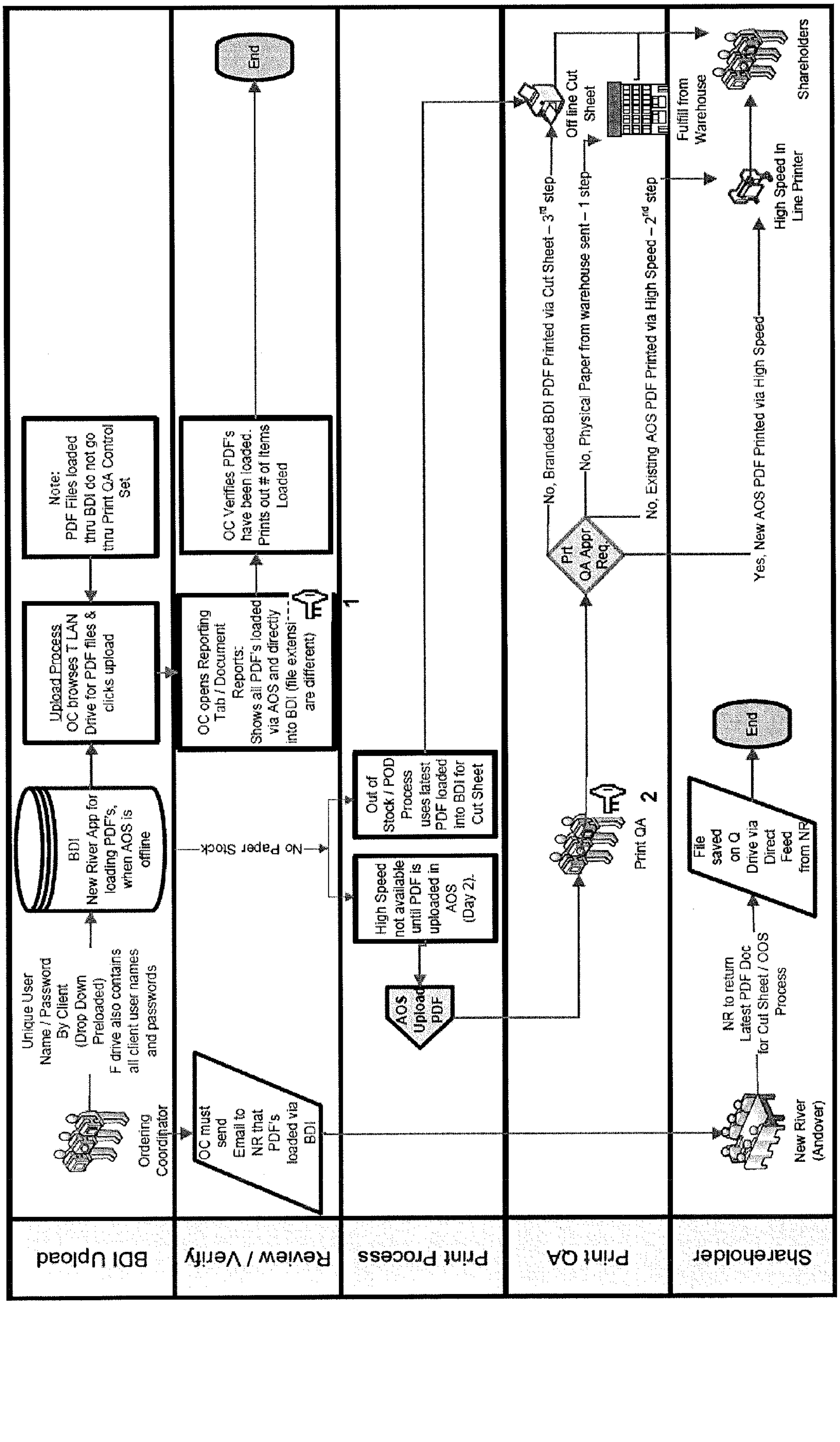

In some embodiments, the inventive computer methods and the computer systems/machines of the instant invention operate in accordance with an exemplary flow process of FIG. 12.

Figure 13:
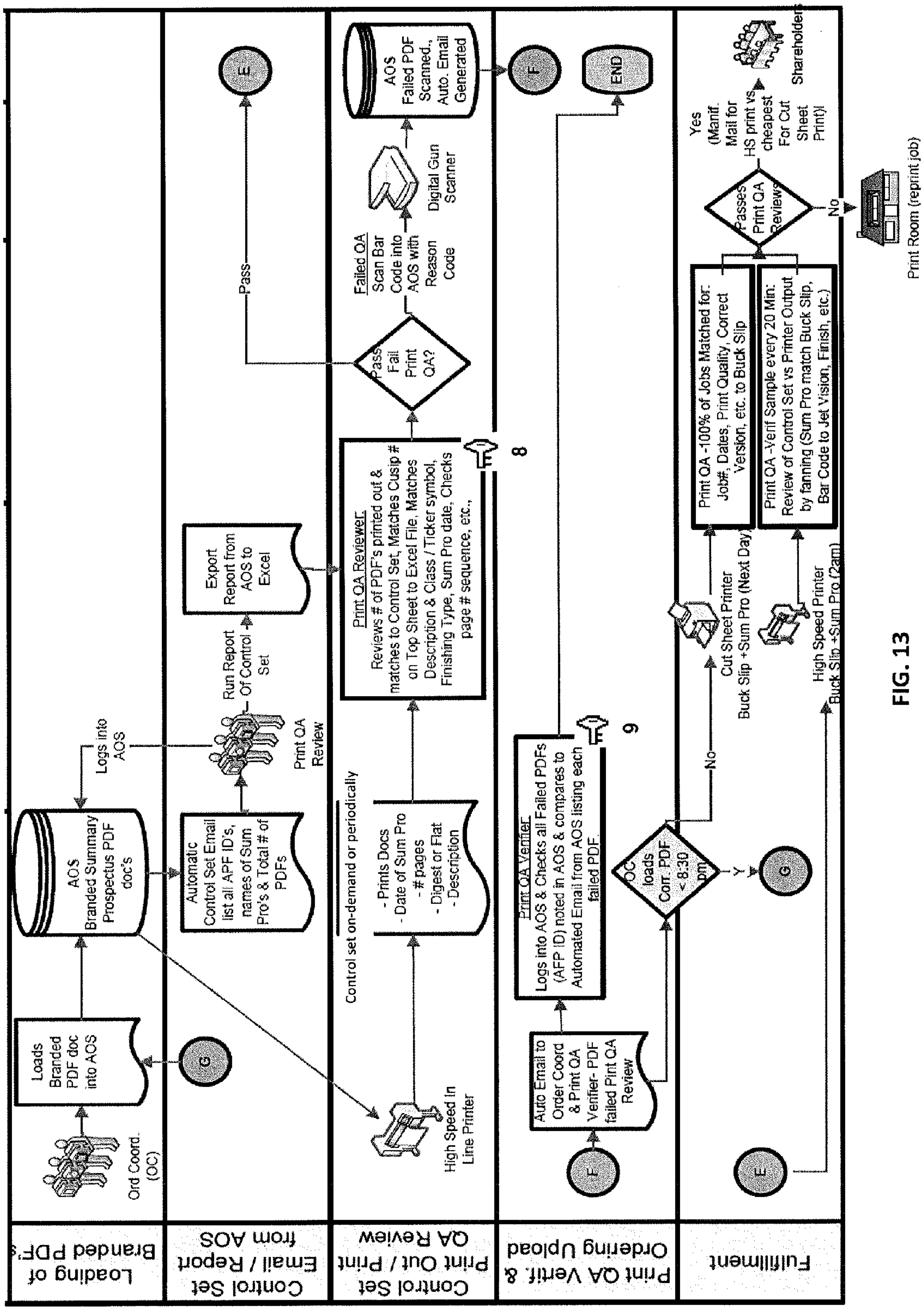

In some embodiments, the inventive computer methods and the computer systems/machines of the instant invention operate in accordance with an exemplary flow process of FIG. 13.

Figure 14:
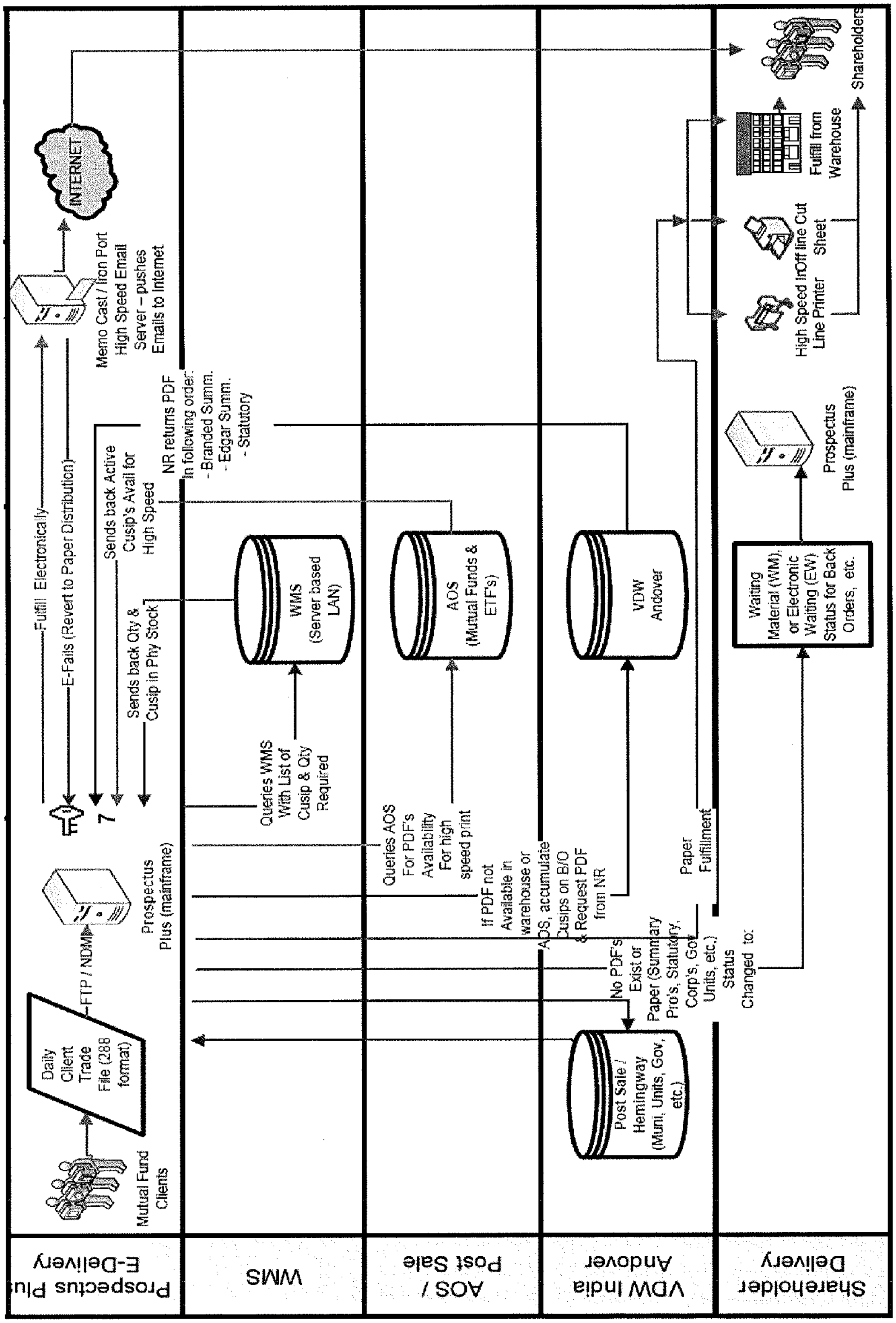

In some embodiments, the inventive computer methods and the computer systems/machines of the instant invention operate in accordance with an exemplary flow process of FIG. 14.

Figure 15:
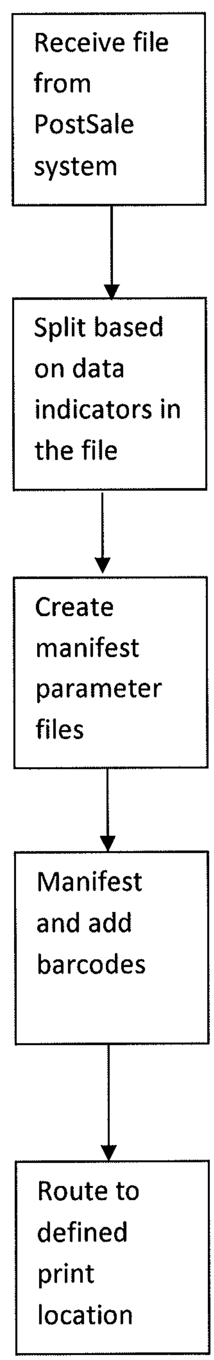

In some embodiments, the inventive computer methods and the computer systems/machines of the instant invention operate in accordance with an exemplary flow process of FIG. 15.

In some embodiments, client(s) send(s) their trades (e.g., Trade Data from Banks/Brokers sources) in records (edit/load job) which contains their clients' trade information, Cusip numbers, customers' names & addresses, broker client numbers and/or various other information. The edit/loads come in various formats such as, but are not limited to, Connect Direct Enterprise, which is really a server version of mainframe format, FTP, Dial Up, etc. In some embodiments, the data is loaded into a DB2 table which is ready for fulfillment. In some embodiments, trades can be fulfilled via three types of avenues:

The first avenue and first step can be physical material which is located in the warehouse in a printing facility.

Mainframe sends fulfillment requirements to WMS

WMS responds with availability & backorder info

The second avenue and second step can be through the High Speed Summary Prospectus Process. There are certain Cusips numbers which are flagged in the Catalog File as summary prospectus and with an associated PDF (PCLS File). This file can be interrogated by the mainframe to find out if the document is available through High Speed Summary Prospectus.

The third avenue can be to send the Cusip numbers to Document processing repository(ies). If Document processing repository(ies) does not have an associated document available, the trade is flagged as WM, waiting material. Trades that are flagged as WM (waiting material) are sent to the Automated Ordering System AOS.

Mainframe (MF) extracts Cusip level backorder requirements and sends to AOS once a day.

MF extracts Cusip level backorder requirements and sends to WMS multiple times a day.

The AOS Ordering group uses the transactions that were downloaded to procure material to fulfill the trades that are in waiting material status. In some embodiments, periodically (e.g., at the end of the day) AOS sends a file that contains security type and issue code that were modified throughout the day to the mainframe which is then processed by a job that runs in the Post Sale End of Day. In some embodiments, the uploaded files update the Post Sale Cusips Number VSAM file, PCLS. The PCLS file is used in the Post Sale Fulfillment process to determine if material is available in the warehouse, high speed or Document processing repository(ies).

Figure 16:
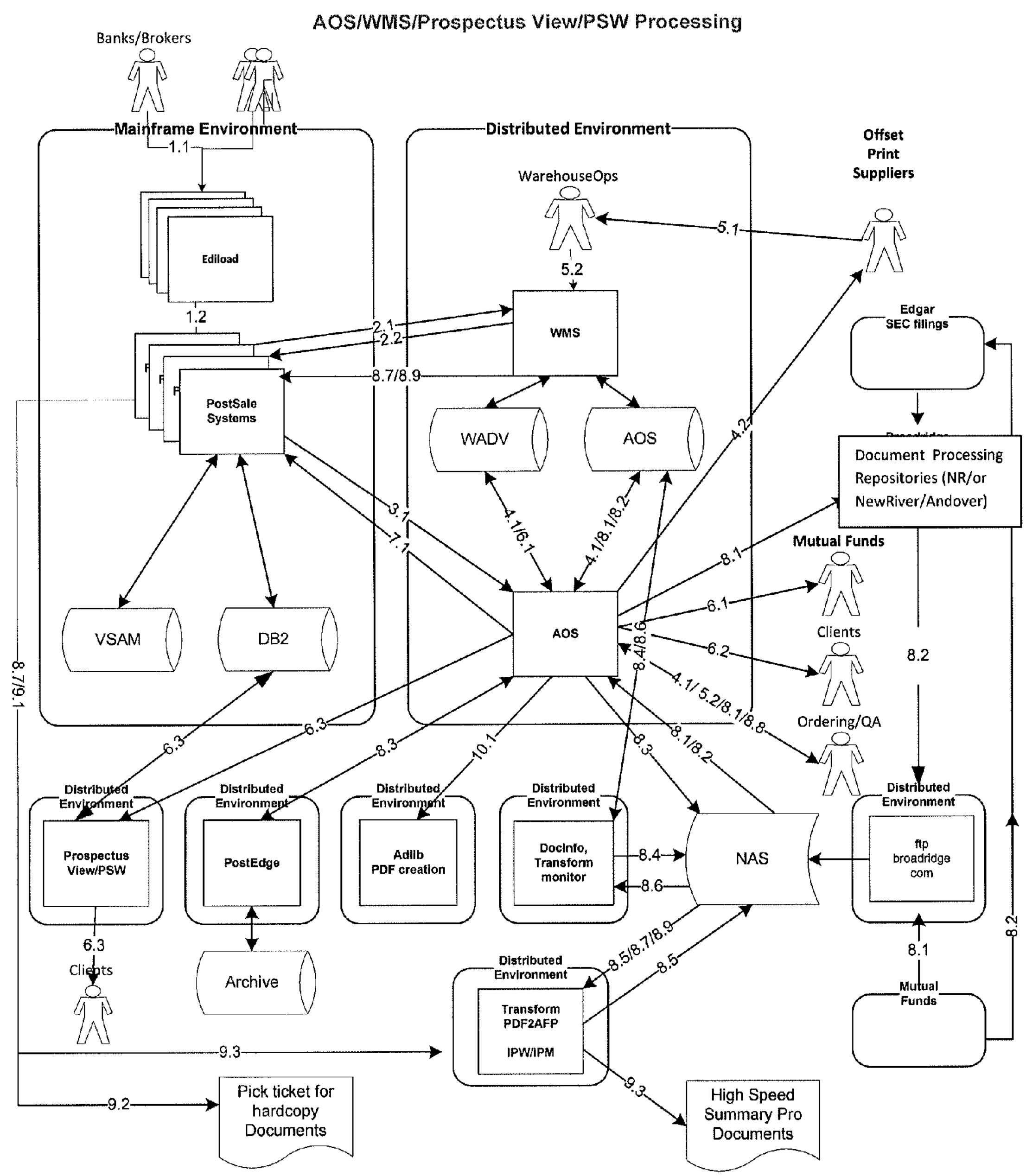

In some embodiments, the inventive computer methods and the computer systems/machines of the instant invention operate in accordance with an exemplary flow process of FIG. 16. FIG. 16 identifies the following steps:

1—Trade Data from Banks/Brokers 1.1 Event triggered Edit transactions and load files 1.2 Process Trades by copying to DB2 Rec by Rec for processing 1.3 Moves from DB2 to VSAM 2—Determine Inventory Availability 2.1 Scheduled process to determine order totals aggregated by Cusip and MF sends fulfillment requirements to WMS 2.2 WMS responds with what is available by Cusip & backorder info 3—Backorder transactions 3.1 MF extracts Cusip level backorder requirements and sends to AOS once a day 3.2 MF extracts Cusip level backorder requirements and sends to WMS multiple times a day 4—Place Orders 4.1 Ordering team enters orders. Backorders, Replenishment (CRP) & Expiring Pros.

4.2 Orders & Follow-Ups sent to Offset Print Suppliers via email

5—Receive Offset Documents 5.1 Supplier delivers documents 5.2 Warehouse receives inventory, updates WMS, sends paperwork to Ordering.

6—Mutual Fund & Broker access 6.1 Mutual Funds access Inventory status of their documents 6.2 Clients access AOS ordering history 6.3 Clients access ordering history from AOS via web service and trade history from Prospectus View 7—Notification data 7.1 Issue code & Security type updates sent to MF, triggers process to update PCLS, data included in nightly Notification files to clients 8—Electronic Document Handling 8.1 Mutual Funds ftp's or emails "Branded" pdf documents to AOS, pdf's are bounced to NAS. Ordering processes docs via Document Handling page.

Sending pdf/xml does to Document processing repository (ies).

8.2 Funds file forms electronically thru Edgar. Document processing repository(ies) (also referred as NR/New River/Andover) extract(s) the data & loads into ar system, ftp's (Edgar Sourced) pdf's/xml, mapping data & process status to AOS (also referred as Broadridge) (processed by background tasks).

8.3 Pdf's logged in AOS_Document Tracking tables, archived in Electronic Document Delivery and Archival system (accessible from Document Tracking page), written to NAS for processing by Docinfo.

8.4 Docinfo interrogates pdf docs, updates AOS_DocumentTracking, forwards pdf's for AFP transformation.

8.5 Transform proc polls/PDFS on NAS, transforms—PDF2AFP, deposit/PSEGS 8.6 TransformMonitor pots/PSEGS on NAS, marks AOS-_DocumentTracking as "Transformed".

8.7 Control set process identifies "Transformed" does on AOS_DocumentTracking that sends updates to MF, Submits MF Control Set print.

8.8 QA reviews Control Set, "Fails" where appropriate AFP QC screen.

8.9 Upload process interrogates AOS_DocumentTracking to identify all "Active", extracts meta, updates Mainframe files with information on electronic versions 9—Pick Process 9.1 Mainframe determines if trades can be fulfilled with offset or electronic version 9.2 Submits Pick ticket or 9.3 Summary Prospectus print as appropriate.

10—CreatePdf 10.1 Function to ingest/combine multiple document types and create single pdf which is emailed to submitter. (combines pdf, xls, doc, txt, jpg, etc)

2.1 AOS Load Process schedule

In some embodiments, on real-time basis or periodically, the instant invention performs the process to load AOS backorder data by querying at least one or more pre-determined electronic sources based on current and historical data associated with a particular job.

2.2 AOS Export Process schedule

In some embodiments, on real-time basis or periodically, the instant invention performs the process to export AOS processed data by transmitting the processed data (e.g., print instructions, issue file update) to at least one or more pre-determined electronic sources based on current and historical data associated with a particular job.

Exemplary Components/Functions

Some embodiments of the instant invention can have the following are the exemplary components of the AOS application, as detailed in Table 1.3.

TABLE 1.3

| | |
|---|---|
| Vendor/Contact Maintenance | Screens that maintain Vendor, Mutual Fund and Issuer contact information in the AOS database. |
| User Management | Screens that maintain User credentials to determine who is authenticated to use AOS and who is authorized to use specific functions throughout AOS. |
| Backorder processing | Screen to manage and order material for trade transactions that are in backorder status. |
| Replenishment Order Processing | Screen that interacts with the WMS system to proactively place orders for material before it goes into backorder status. |
| Expiring Prospectus Order Processing | Screen that interacts with the WMS system to proactively place orders for expiring material based on an expiration date. |
| Electronic Document Processing | System functionality that allow Broadridge to manage electronic versions of documents as opposed to hard copy. |
| Order Tracking | Screens that allow the Ordering Associates to maintain previously placed orders. |
| Reporting | Menu that allows access to multiple Order related reports |
| Client Access | Issuers and Mutual Funds have restricted access to certain functionallity |
| Maintenance | Screens to maintain control tables that control the logic of AOS |

Vendor/Contact Maintenance

In some embodiments, this component of the application gives the Ordering Associates the ability to add/maintain contact information on the Print Vendors, Issuers, and Mutual Funds that they deal with throughout the course of their dealings in the Prospectus management process. The data maintained here is Name, Address, Phone, Email, CC, Company Name, Types of Security they deal with and Special Instructions related dealing with them and Switches. These tables are leveraged throughout the system to identify the customer & supply the email/contact information required to automatically send them emails.

In some embodiments, the instant invention can utilize the following exemplary switches for the Document Handling:

a. Offset—Identifies vendors sourcing offset inventories b. POD—Indicates vendors sourcing PDF documents c. L&L DocSource—Indicates the source of the document that can be used for Linking and Layering d. POD DocSource—Indicates the source of the document that can be used for printing e. POD Billable—Indicates the entity to bill for the printed material f. EDGAR Check—Indicates that a vendor has contracted for the EDGAR Check product. This can be used for billing g. L&L—Indicates that a vendor has contracted for the Linking and Layering product. This can be used for billing h. XBRL—Indicates that a vendor has contracted for the XBRL product. This can be used for billing i. Imposed—Indicates that a vendor can be sourcing documents that can need to be imposed before they can be consumed j. Color—Indicates that a vendor can be sourcing both colored and gray scale documents to be used for Linking and Layering and POD print, respectively.

Figure 17:
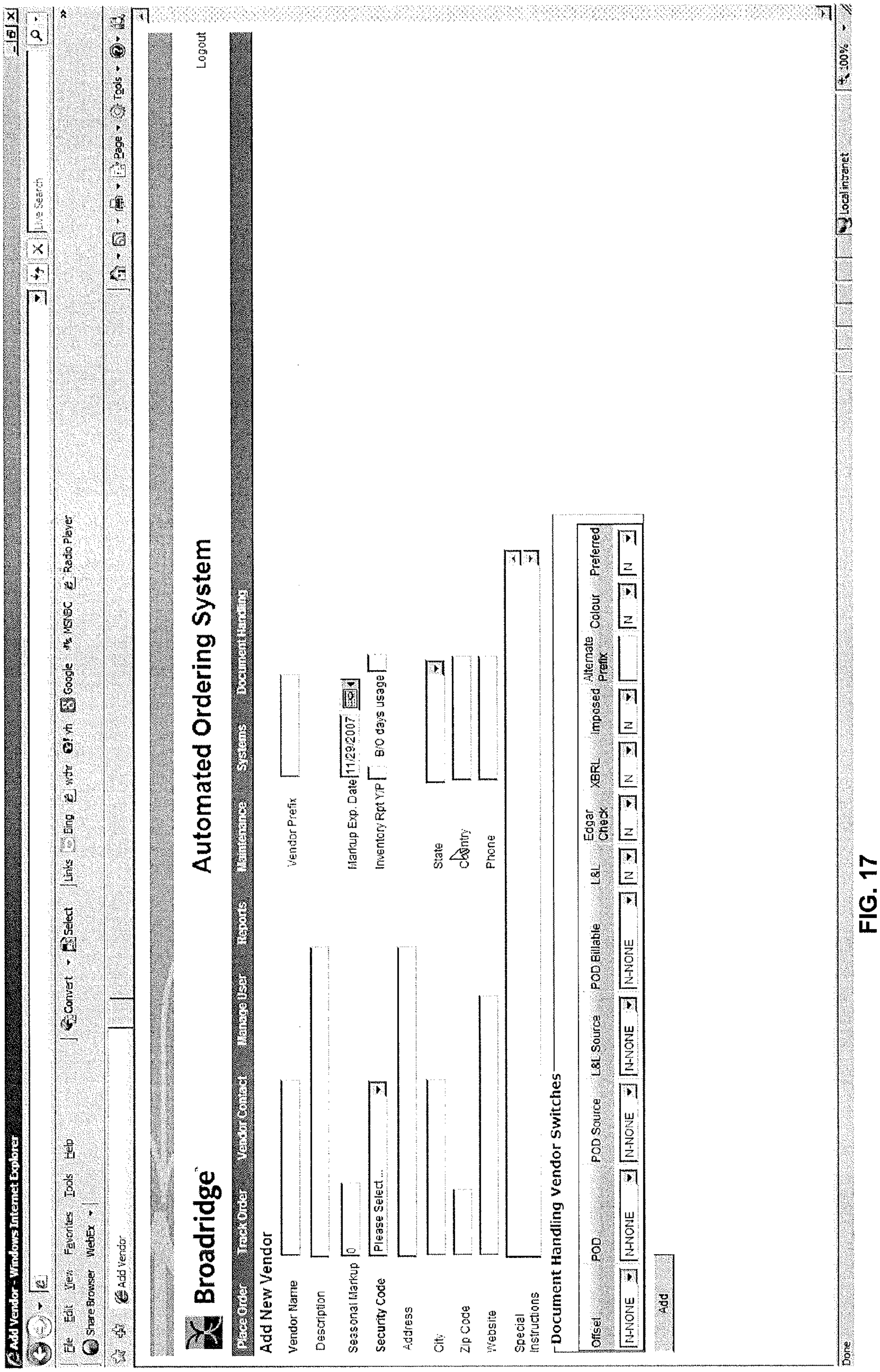
Figure 18:
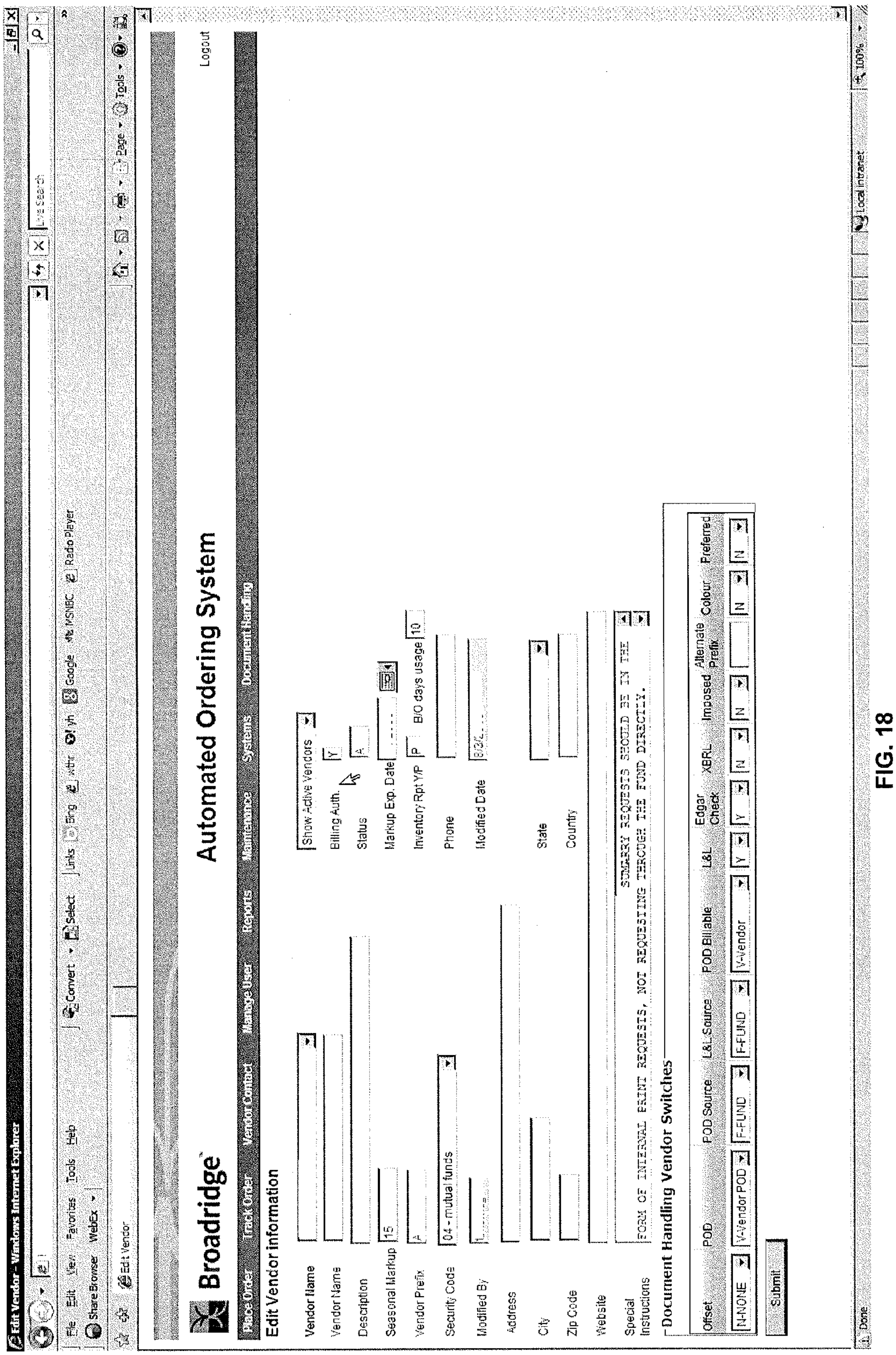

In some embodiments, the inventive computer methods and the computer systems/machines of the instant invention receive vendor information by utilizing exemplary functionality(ies) in accordance with FIGS. 17 and 18.

User Management

In some embodiments, AOS users' information is stored in a user table in the AOS database. These User entries are maintained using the user management screens by Admin role user. In some embodiments, AOS uses user credentials to determine the authorization roles to determine what screens the user can and can't view in AOS. In some embodiments, the user authentication information (password) can be also stored in DB2 table and queried using a Web Service.

Enhanced Security

In some embodiments, the instant invention utilizes a secure authentication service called SDS. For extra security, when logging in, the password is encrypted before it is sent over the web to prevent anyone from capturing your userid/password as the data is being transmitted. This sign on data is routed to the SDS process where it is validated against a separate secure database before it lets you into AOS. External users they login by the https link in the address instead of just http, this means that in addition to encrypting the sign on info it is also using an additional secure communication protocol that can encrypt ALL of the data being sent back & forth between user's machine & the AOS software on servers.

Figure 19:
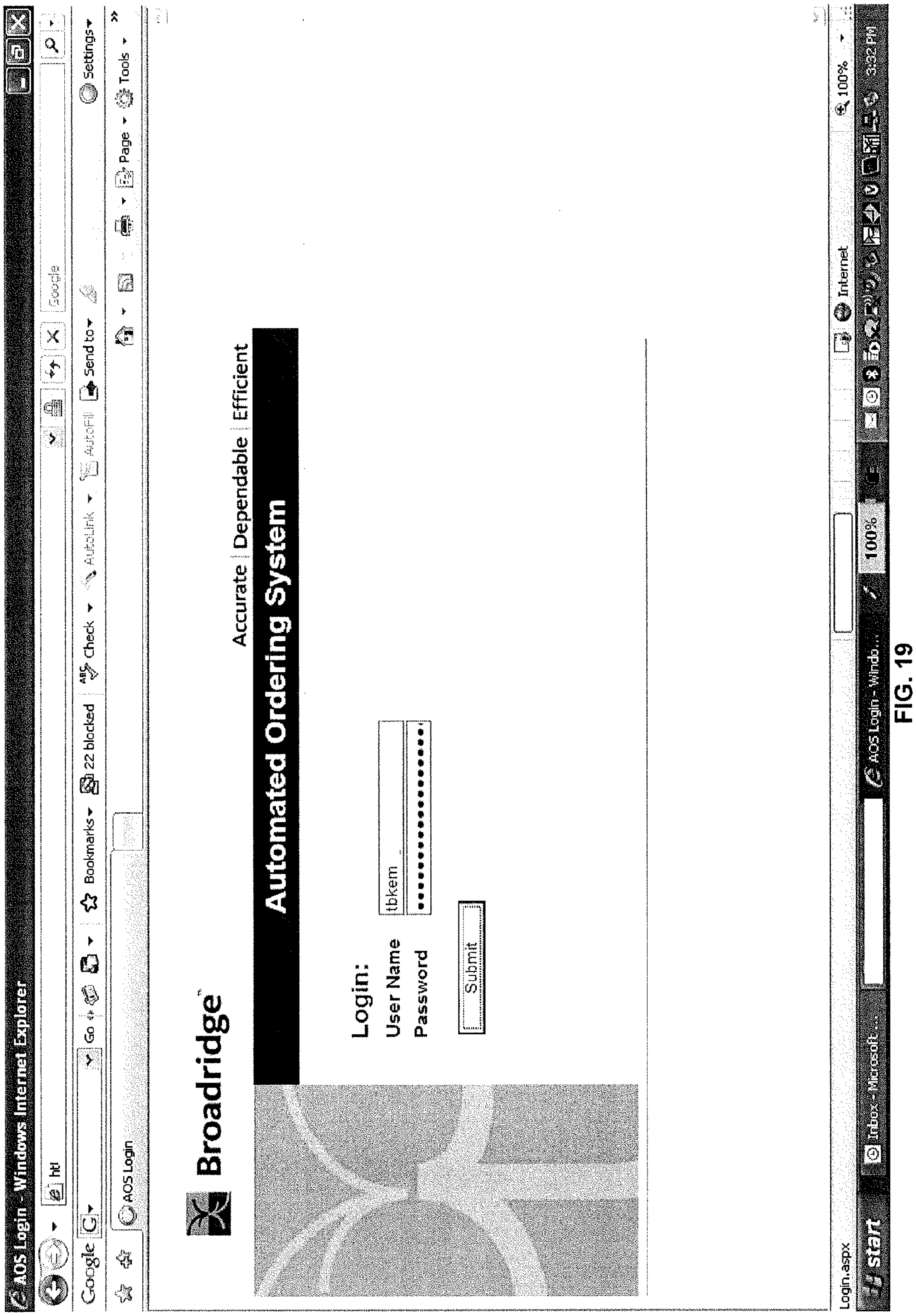

In some embodiments, the inventive computer methods and the computer systems/machines of the instant invention provide enhance security by utilizing exemplary functionality(ies) in accordance with FIG. 19.

Enhanced Role Management

In some embodiments, in addition to the internal roles (admin, manager, order, guest, guestall and systems), the AOS can allow for specific roles for client & fund. By assigning roles to users, the AOS can control the areas of the system that someone is authorized to access and protect or hide controls and data that we don't want them to have. In some embodiments, the AOS has EditMenu screen which is only accessible to the system role that manages the Menu and Roles functionality, this allow o dynamically add (or take away) the access to different roles, screens, menu options, certain fields and controls.

Figure 20:
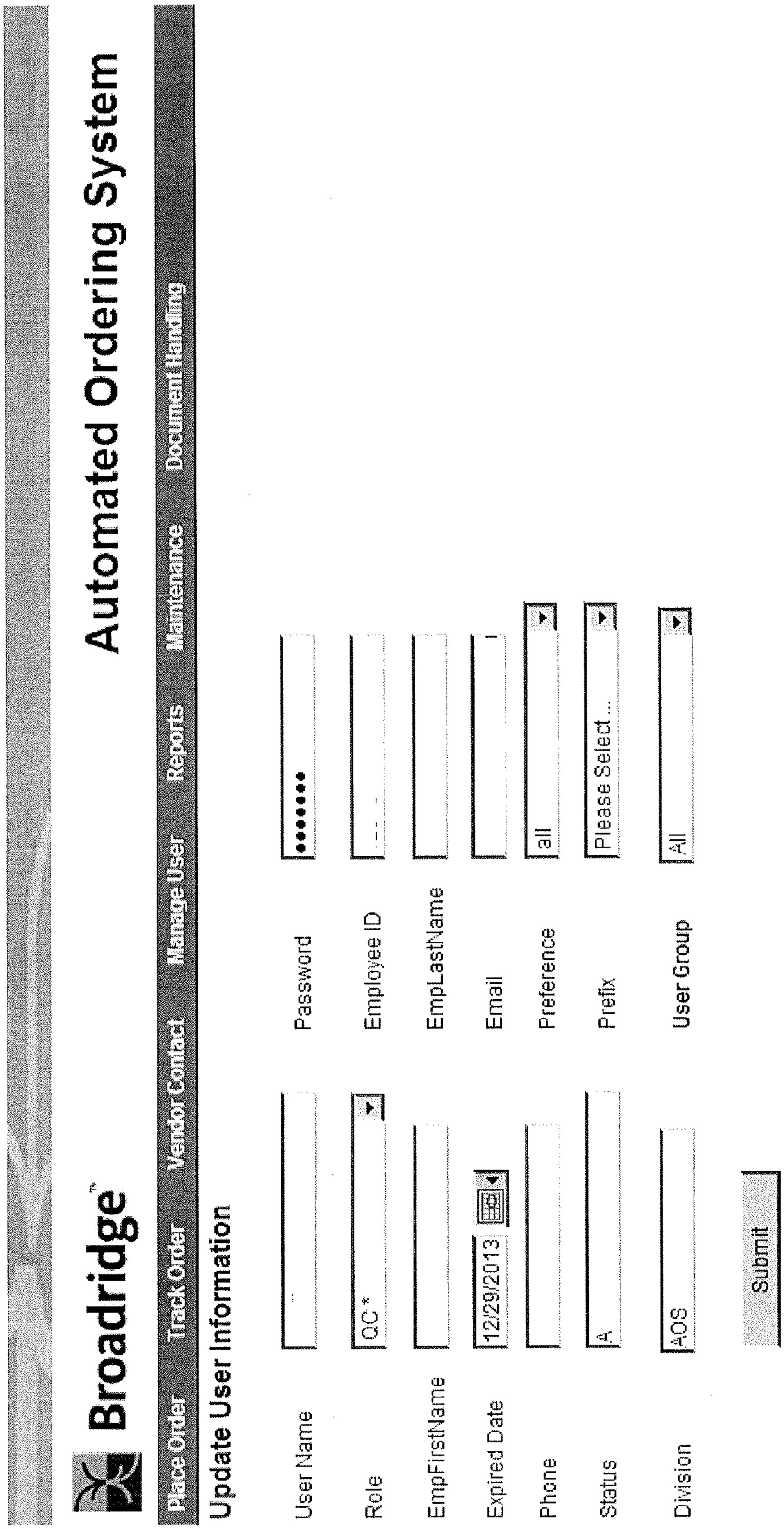
Figure 21:
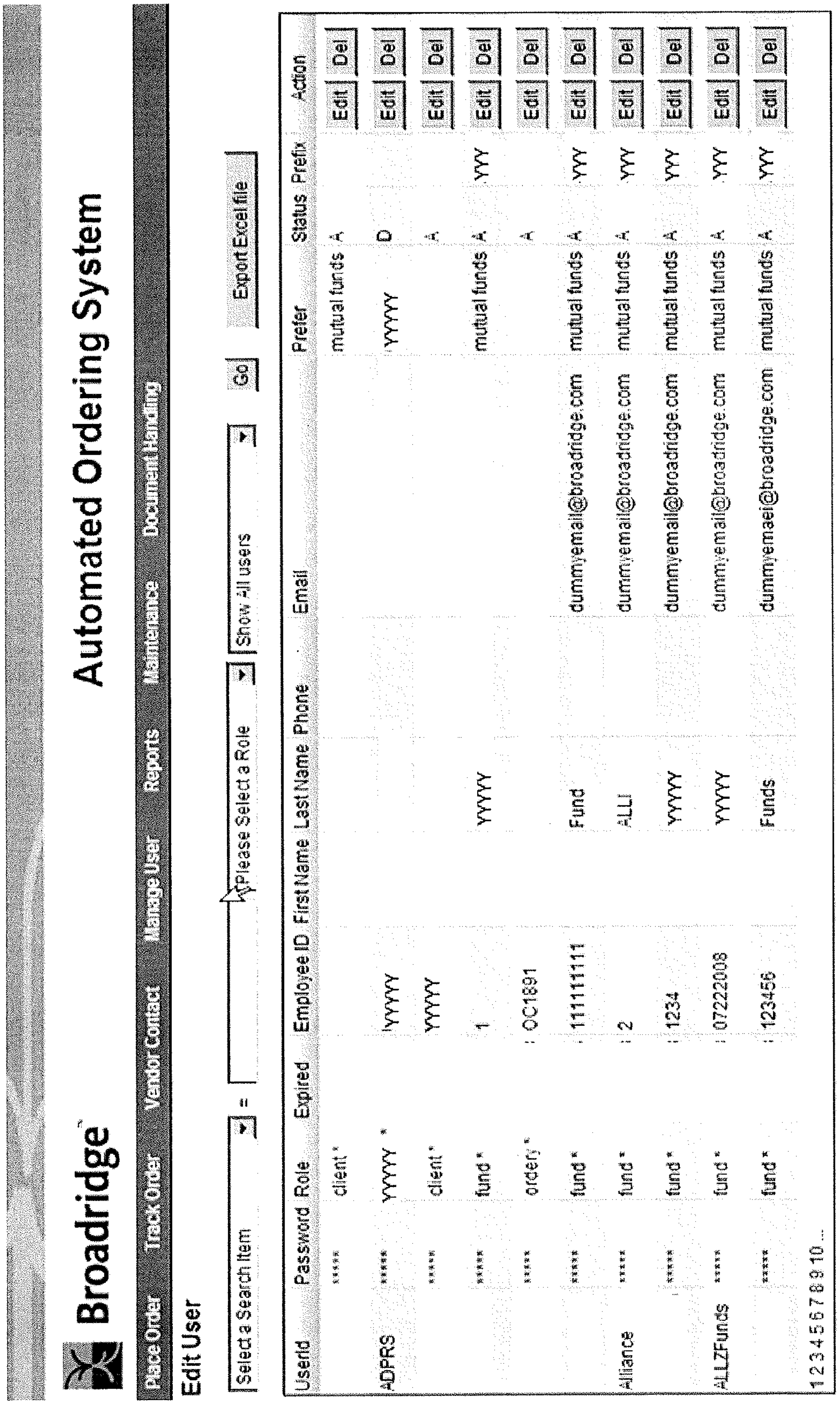
Figure 22:
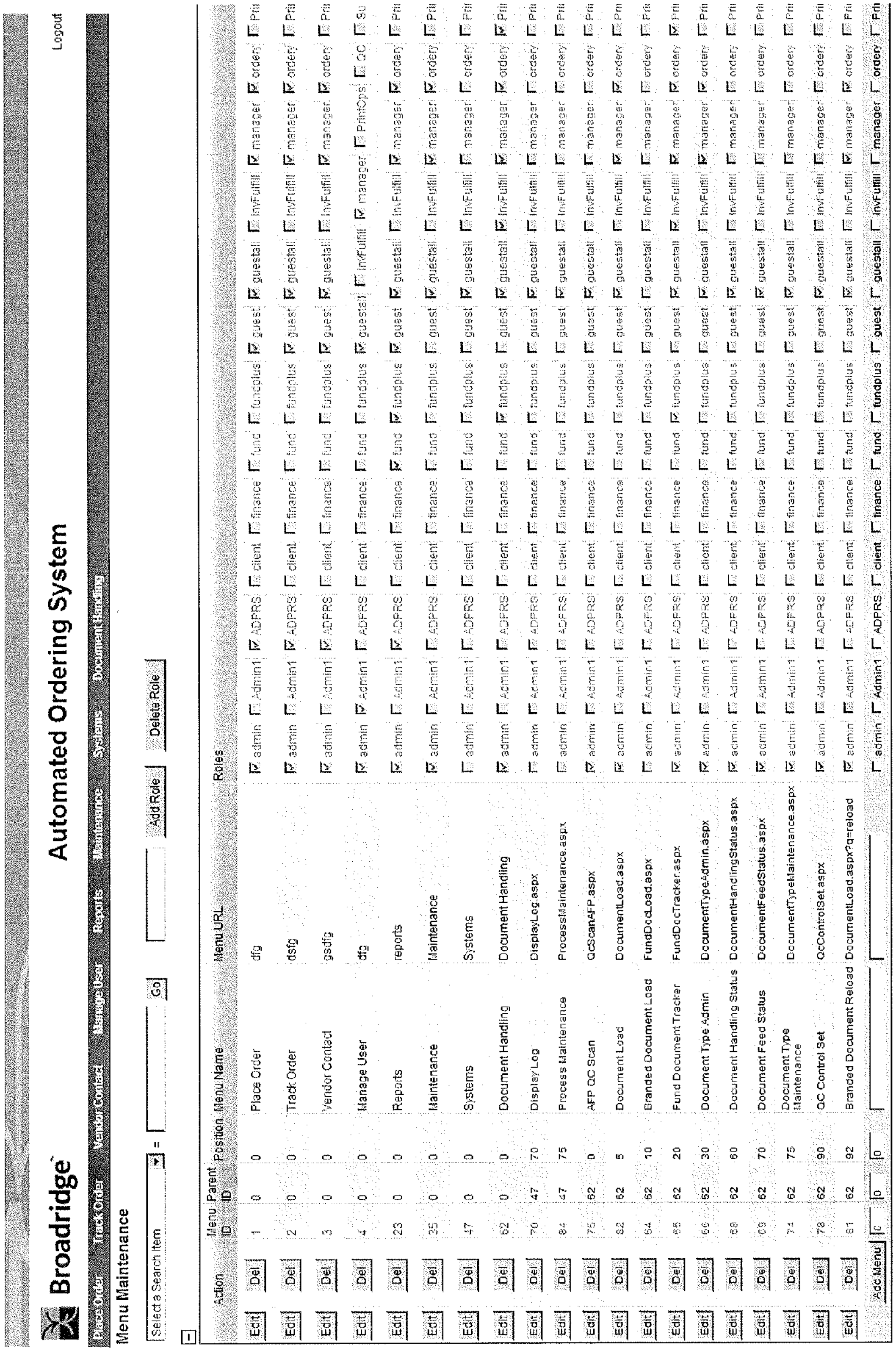

In some embodiments, the inventive computer methods and the computer systems/machines of the instant invention provide role management by utilizing exemplary functionality(ies) in accordance with FIGS. 20-22.

Order Processing

Backorder Processing

In some embodiments, this component of the application gives the Ordering Associates visibility to all the Cusips that are currently in Backorder status because:

1 No inventory available to fulfill the delivery of the Prospectus document related to that security in the warehouse.

2 The file is not available through the High Speed Summary Prospectus Process.

3 Document processing repository(ies) does not have an associated document; the trade is flagged as WM, waiting material.

In some embodiments, the Backorder status is determined by a combination of logic in the WMS system and the Mainframe systems which are then transmitted to the AOS system and loaded into the database every morning. In some embodiments, the Ordering Associates review the Backorder transactions, correct info if needed and flag transactions with Issue Codes if they need help from the Issuers on a given transaction. In some embodiments, if the transaction does not have any errors or issues, the Ordering Associate can select the items they want to order, place the order and in the order screen, select the contact(s) from the Vendor Contact table that should receive the order.

Add Follow up date, delivery method, internal and external notes if needed and attach documents and WMS inventory report if needed then submit the Order. The Order can be automatically emailed to the contact or printed to be faxed or mailed depending on the delivery method maintained in the vendor table and logged in the database.

Figure 23:
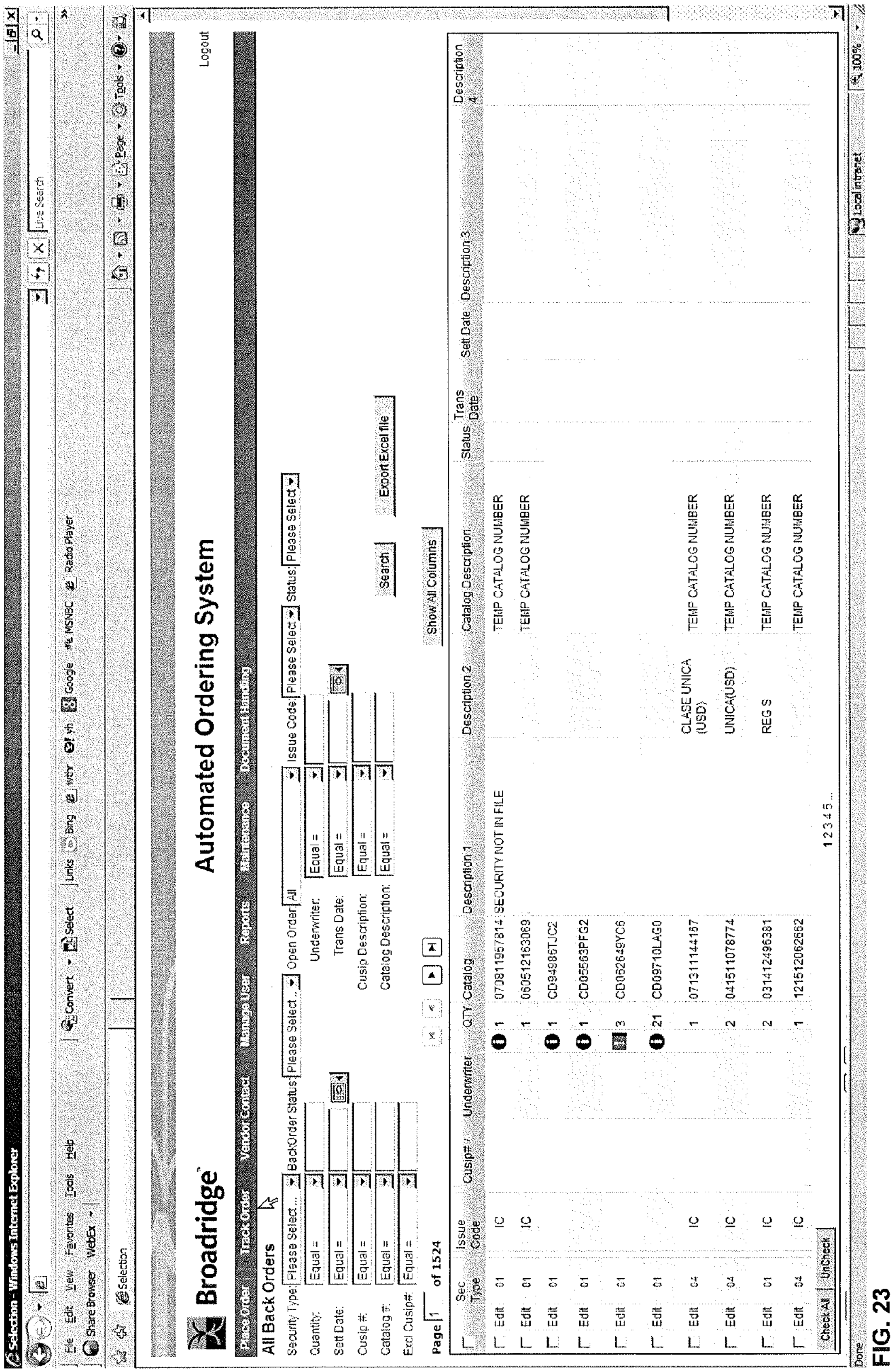

In some embodiments, the inventive computer methods and the computer systems/machines of the instant invention provide order processing by utilizing exemplary functionality (ies) in accordance with FIG. 23.

Replenishment Order Processing

In some embodiments, the instant invention can allow to proactively place orders for material before it goes into backorder status. In some embodiments, the logic calculates a Reorder Point (CRP) to determine what is needed based on past usage and security specific parameters that are extracted from tables in the WMS database. In some embodiments, this logic is only applied to Mutual Fund ordering. In some embodiments, the Ordering Associate can select the vendor, AOS can retrieve the transactions from WMS for that vendor. The Ordering Associate can select the items they want to order, updated Quantities, select the contact(s) from the Vendor Contact table that should receive the order. Add Follow up date, delivery method, internal and external notes if needed and add documents and attach WMS inventory report if needed then submit the Order. The Order can be automatically emailed to the contact or printed to be faxed or mailed depending on the delivery method maintained in the vendor table and logged in the database.

Figure 24:
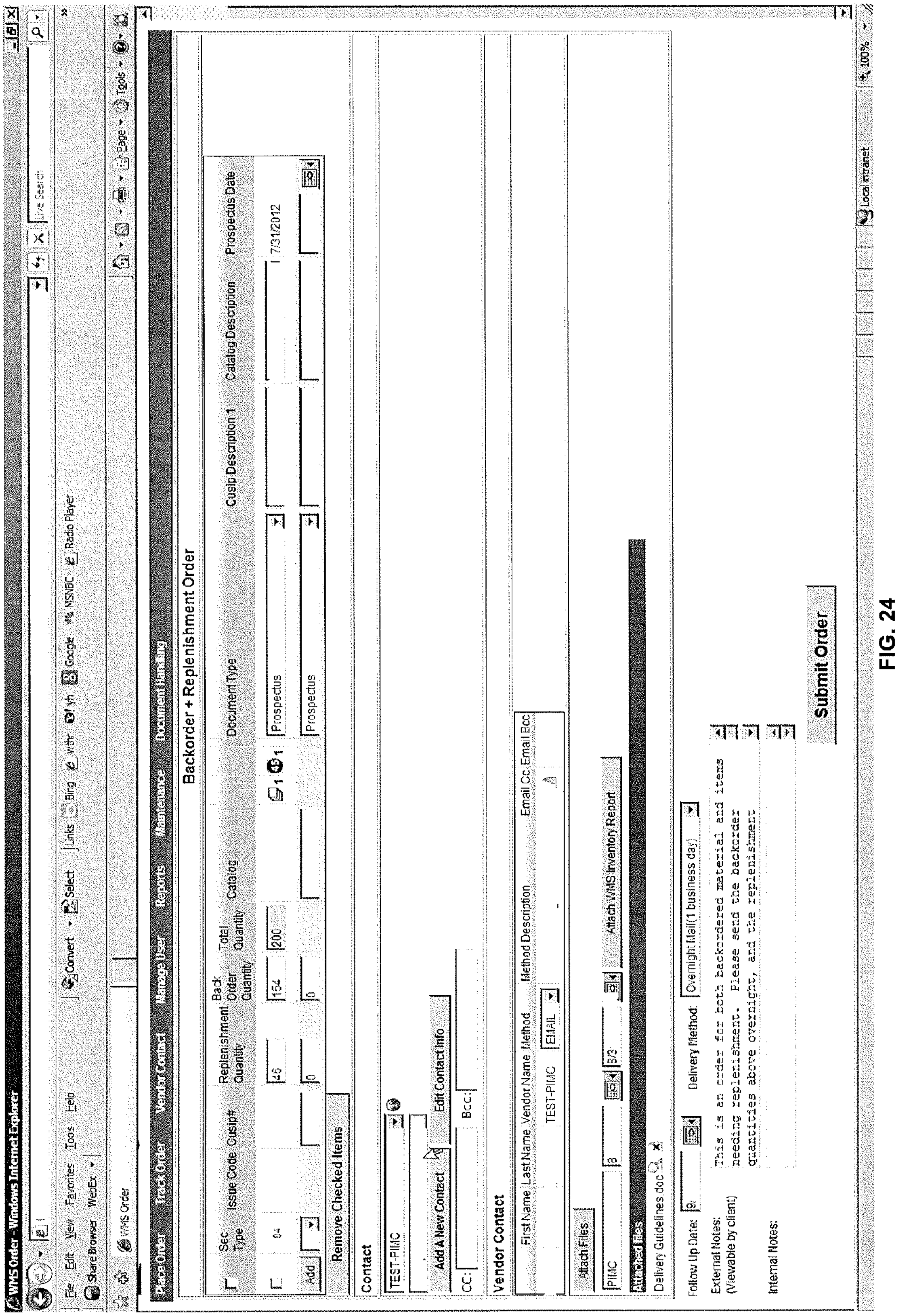

In some embodiments, the inventive computer methods and the computer systems/machines of the instant invention provide order processing by utilizing exemplary functionality (ies) in accordance with FIG. 24.

Expiring Prospectus Order Processing

In some embodiments, the instant invention allows to proactively place orders for updated prospectuses before they expire. Prospectuses are typically dated and typically expire on the respective expiry dates which are generally a year from the effective date but do vary. The expiration date is typically calculated based on security specific parameters that are extracted from tables in the WMS database. In some embodiments, this logic is only applied to Mutual Fund ordering.

In some embodiments, the Ordering Associate can select the vendor; update the date default selection if needed the AOS can retrieve the transactions that expiration date is near from WMS for that vendor. In some embodiments, the Ordering Associate can select the items they want to order, updated Quantities, select the contact(s) from the Vendor Contact table that should receive the order. Add Follow up date, delivery method, internal and external notes if needed and add documents and attach WMS inventory report if needed then submit the Order.

In some embodiments, the Order can be automatically emailed to the contact or printed to be faxed or mailed depending on the delivery method maintained in the vendor table and logged in the database.

Figure 25:
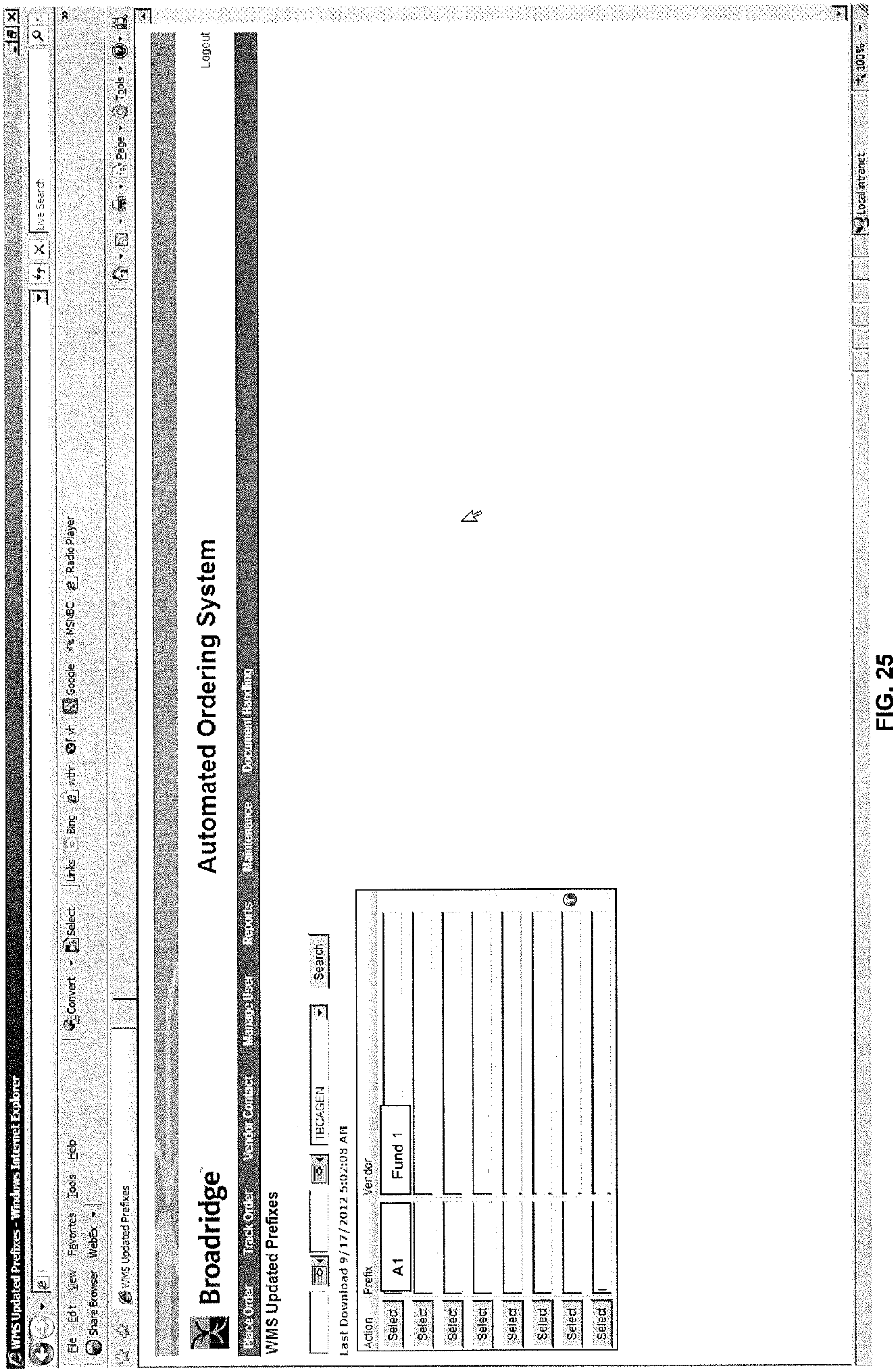
Figure 26:
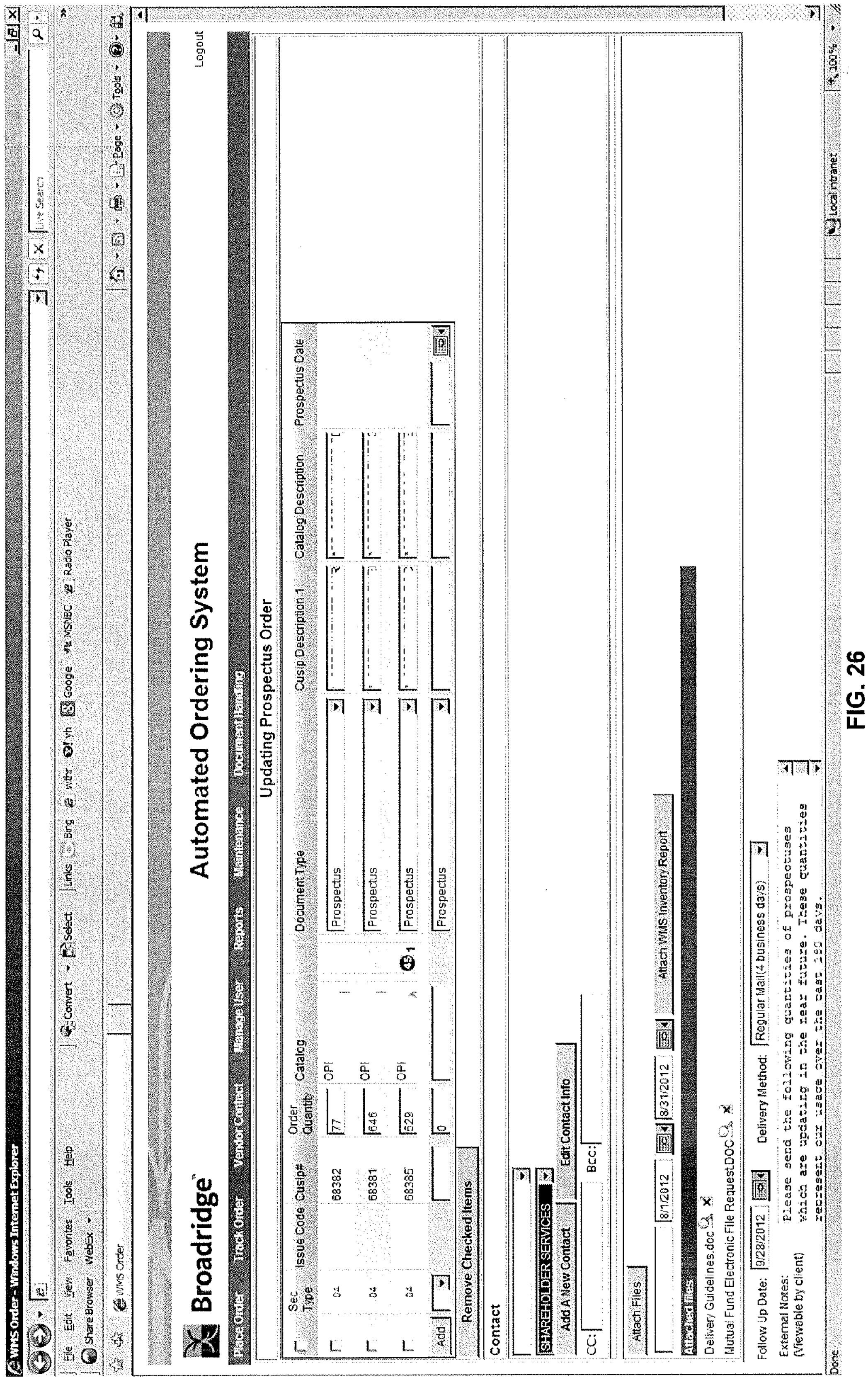

In some embodiments, the inventive computer methods and the computer systems/machines of the instant invention provide order processing by utilizing exemplary functionality (ies) in accordance with FIGS. 25-26.

Order Tracking

In some embodiments, this is where the orders are tracked by the ordering group from start to completion. In some embodiments, the user could use this section to either:

Follow-up an order

Close an order

Cancel an order

Figure 27:
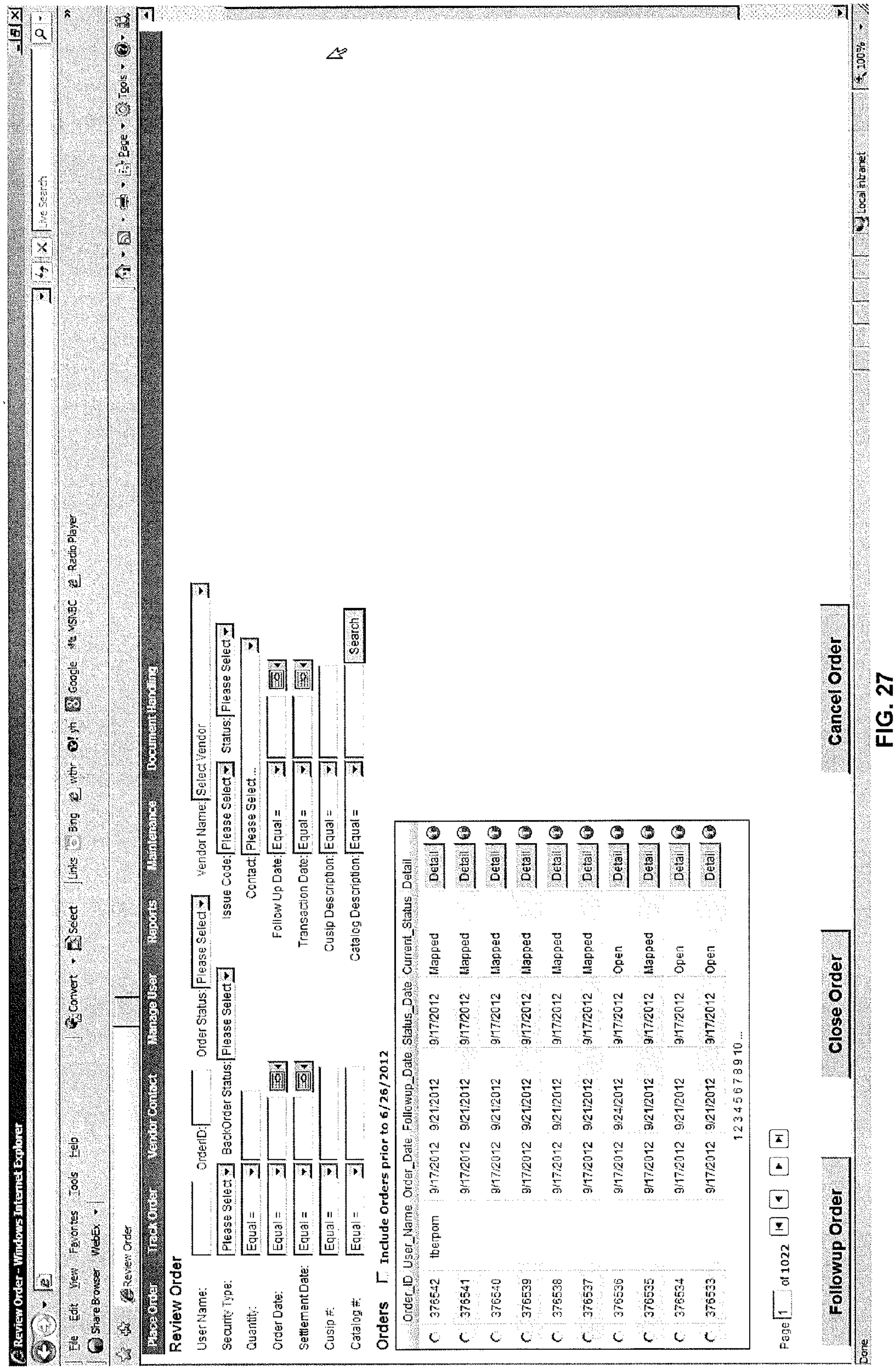
Figure 28:
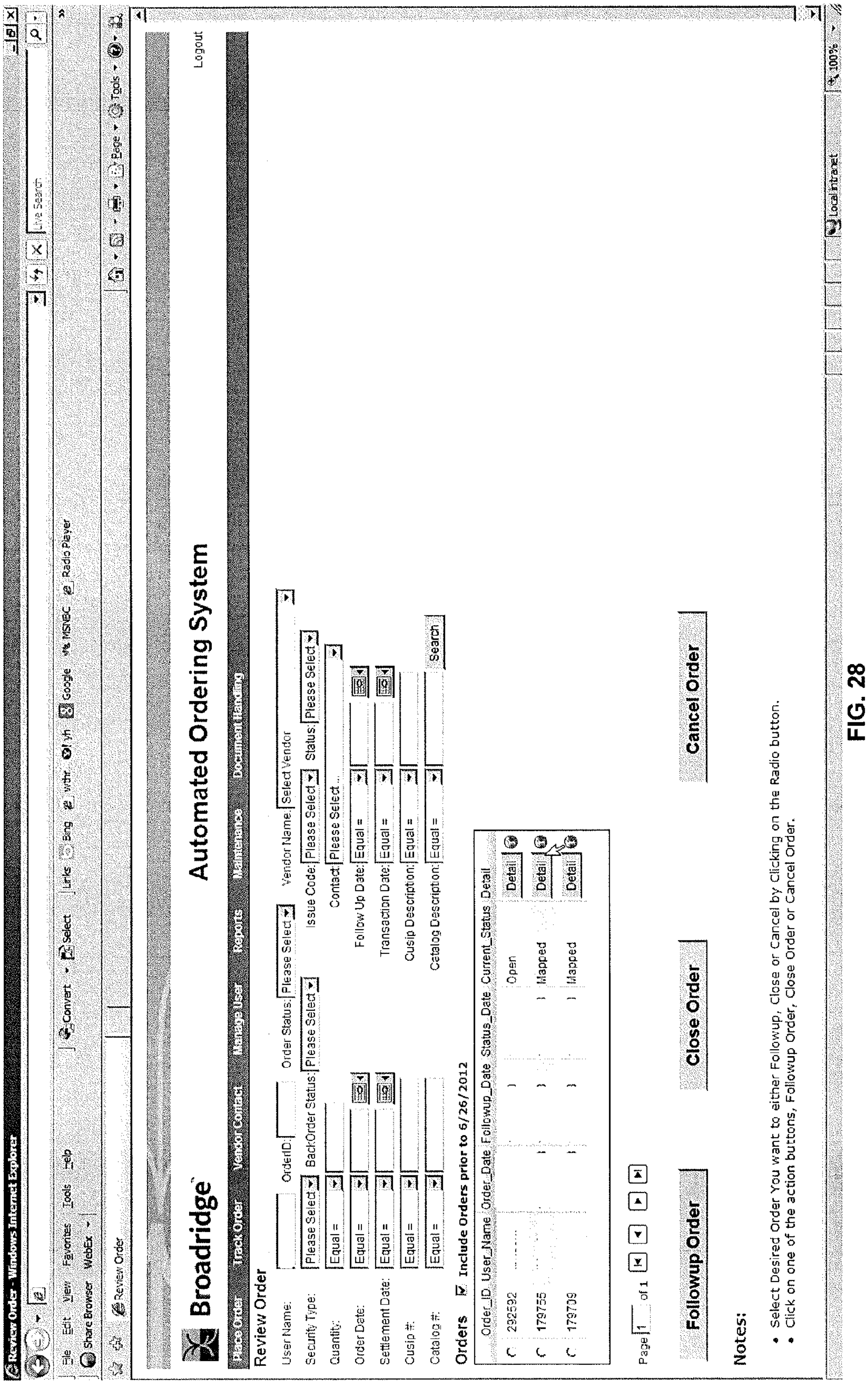

In some embodiments, the inventive computer methods and the computer systems/machines of the instant invention provide order tracking by utilizing exemplary functionality (ies) in accordance with FIGS. 27-28.

Review/Follow-Up (Order Receipt Processing)

In some embodiments, the user can track the order from start to completion. In some embodiments, the user can view:

Order Detail

Order contacts

Order history

Modified Backorders

In some embodiments, when ordered material is received, they're logged into the warehousing system (WMS) and receipt documents are utilized to automatically update the AOS system against the original orders that were placed in the Order Receiving section.

In some embodiments, this information can be included in the Order Review history, the client Cusip activity report as well as the Prospectus View application.

Figure 29:
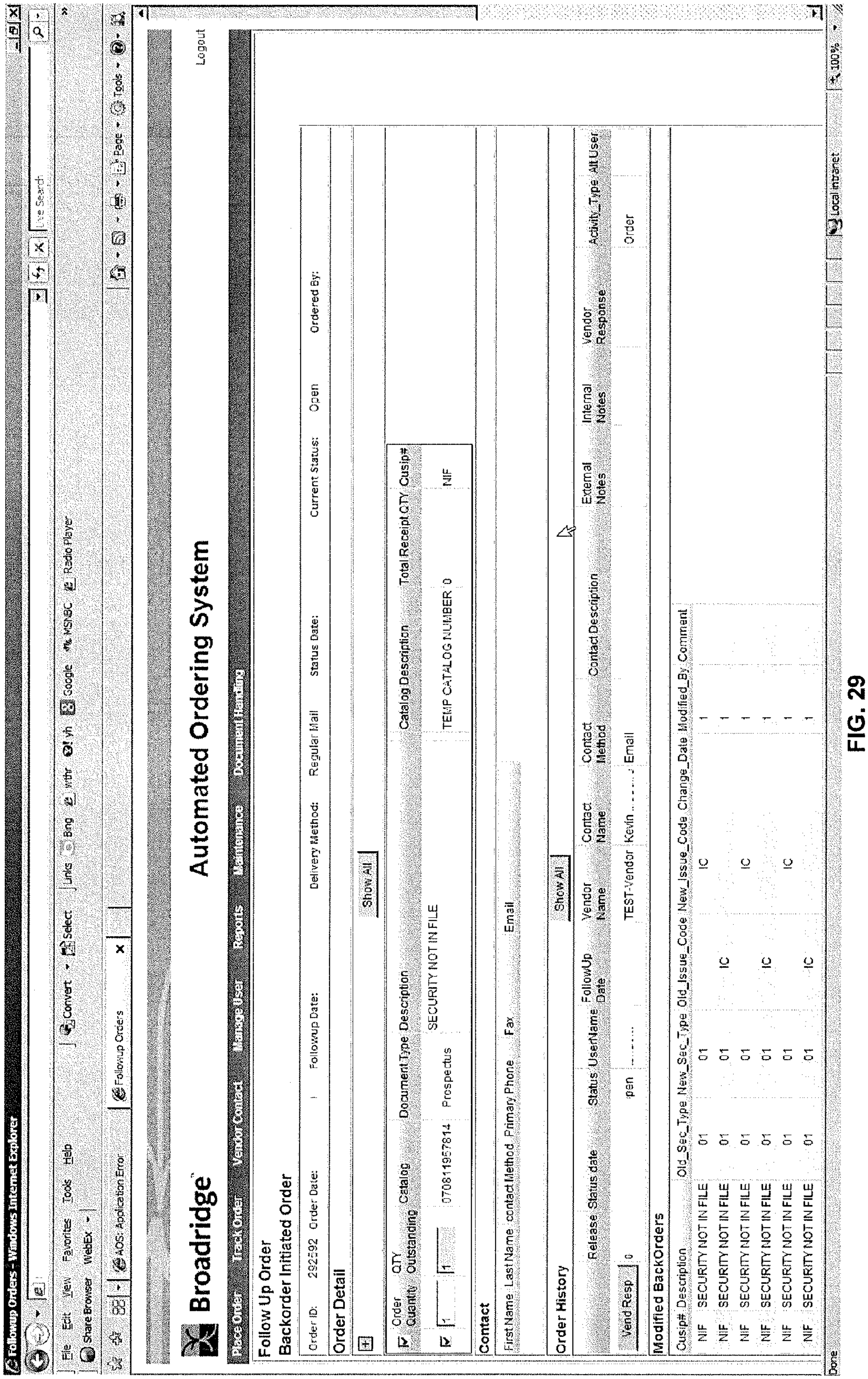

In some embodiments, the inventive computer methods and the computer systems/machines of the instant invention provide order followup by utilizing exemplary functionality (ies) in accordance with FIG. 29.

Close

In some embodiments, the user can view:

Order Detail

Order contacts

Order history

Modified Backorders, and

If need be update, the notes.

Cancel

In some embodiments, same as Close Order, the user can view:

Order Detail

Order contacts

Order history

Modified Backorders, and

If need be update, the notes.

In some embodiments, the difference between closing an order and canceling order, the client can be notified through an email that the order has been canceled.

Reports

In this section the users can be able to generate and view reports. For example, an Order Reports option shows various statistics:

1 Number of Open, Mapped Orders by Security Type (corporate, Government etc. . . . ) placed;

2 Top 20 Backorders by Security Type (corporate, Government etc. . . . ).

Figure 30:
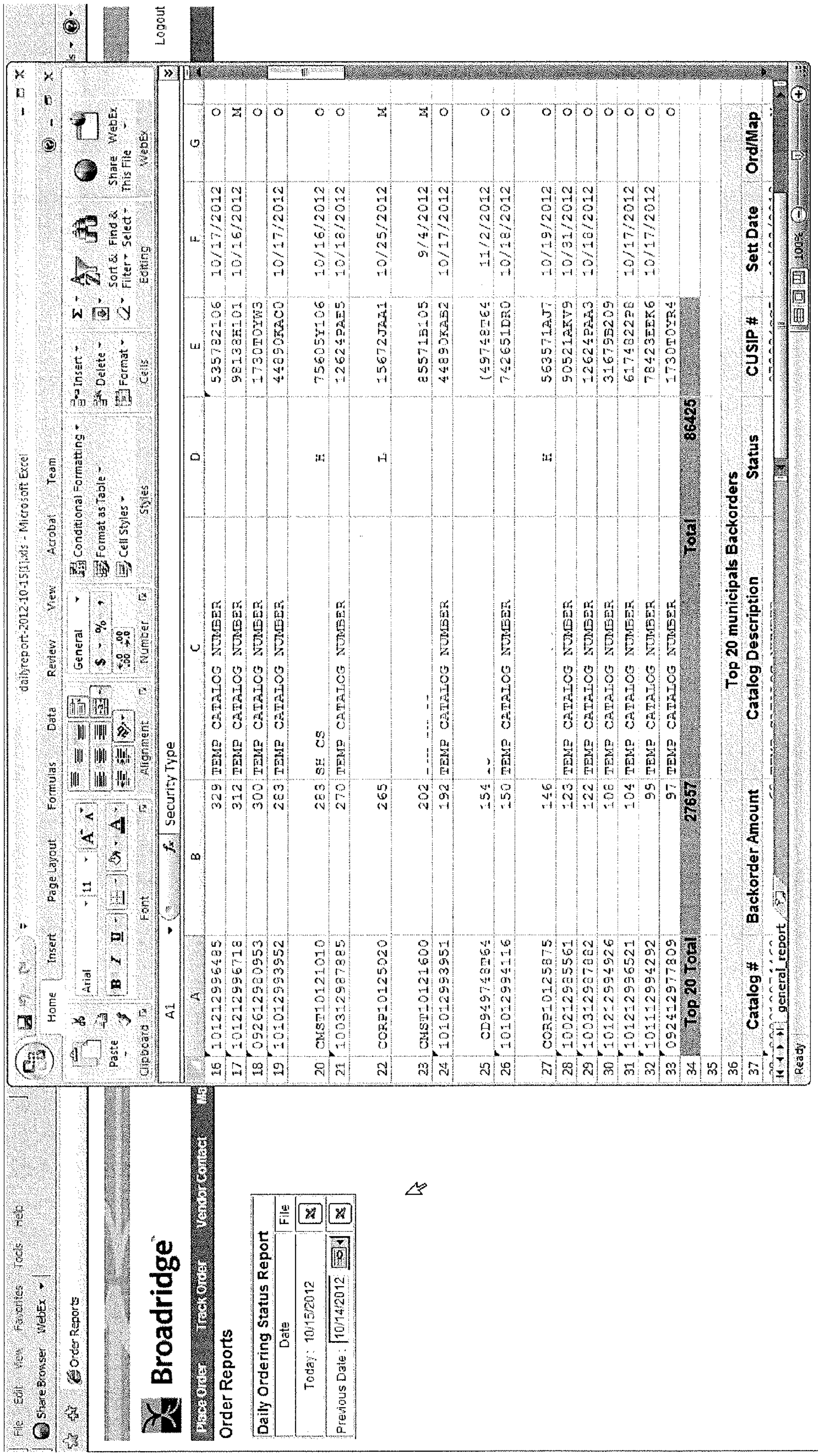

In some embodiments, the inventive computer methods and the computer systems/machines of the instant invention provide order reports by utilizing exemplary functionality (ies) in accordance with FIG. 30.

BackOrder Reports

Figure 31:
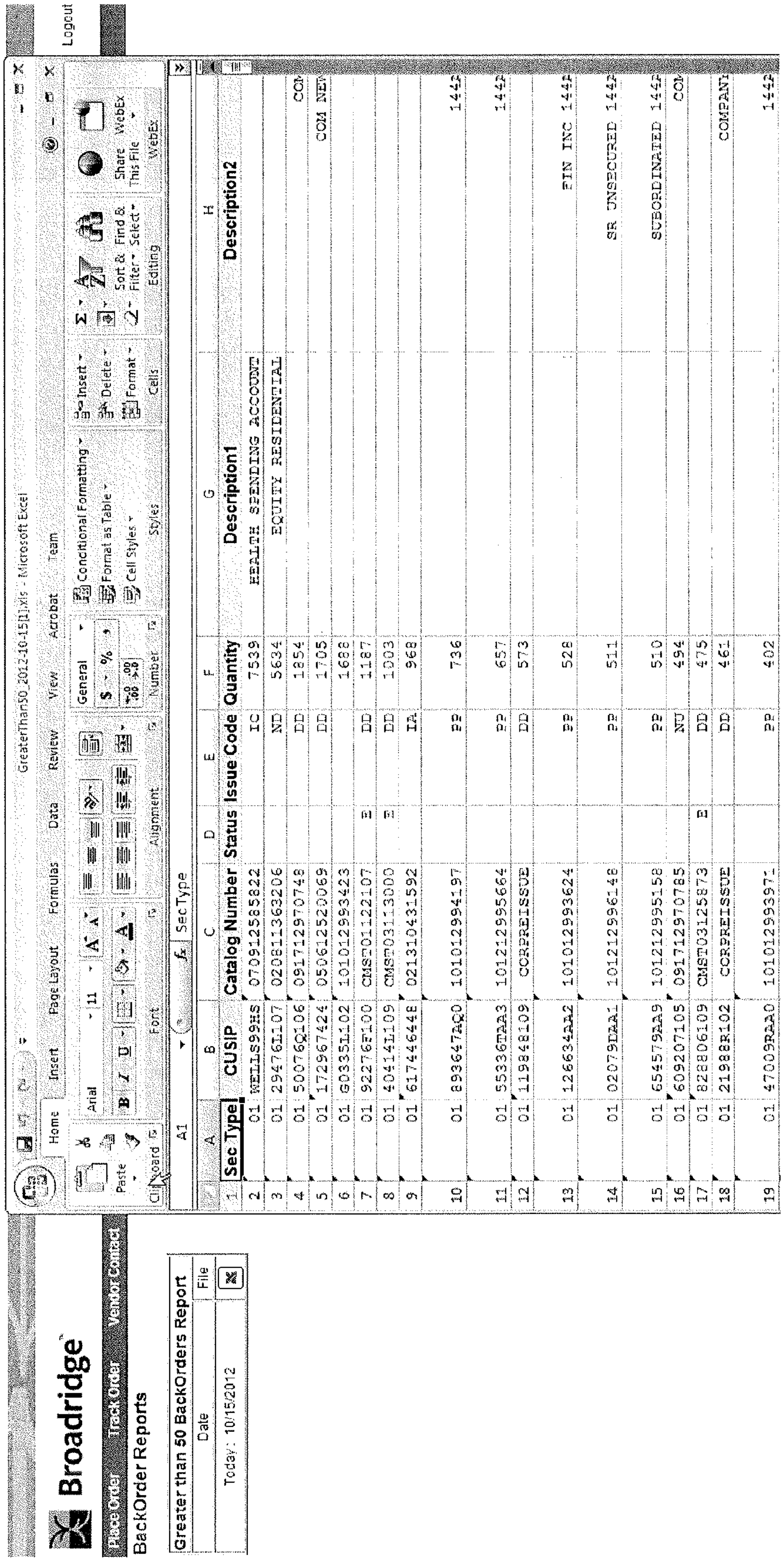

In some embodiments, this BackOrder report shows back orders with transactions that have quantity greater than 50 by Security Type. In some embodiments, the inventive computer methods and the computer systems/machines of the instant invention provide backorder reports by utilizing exemplary functionality(ies) in accordance with FIG. 31.

Inventory Report

Figure 32:
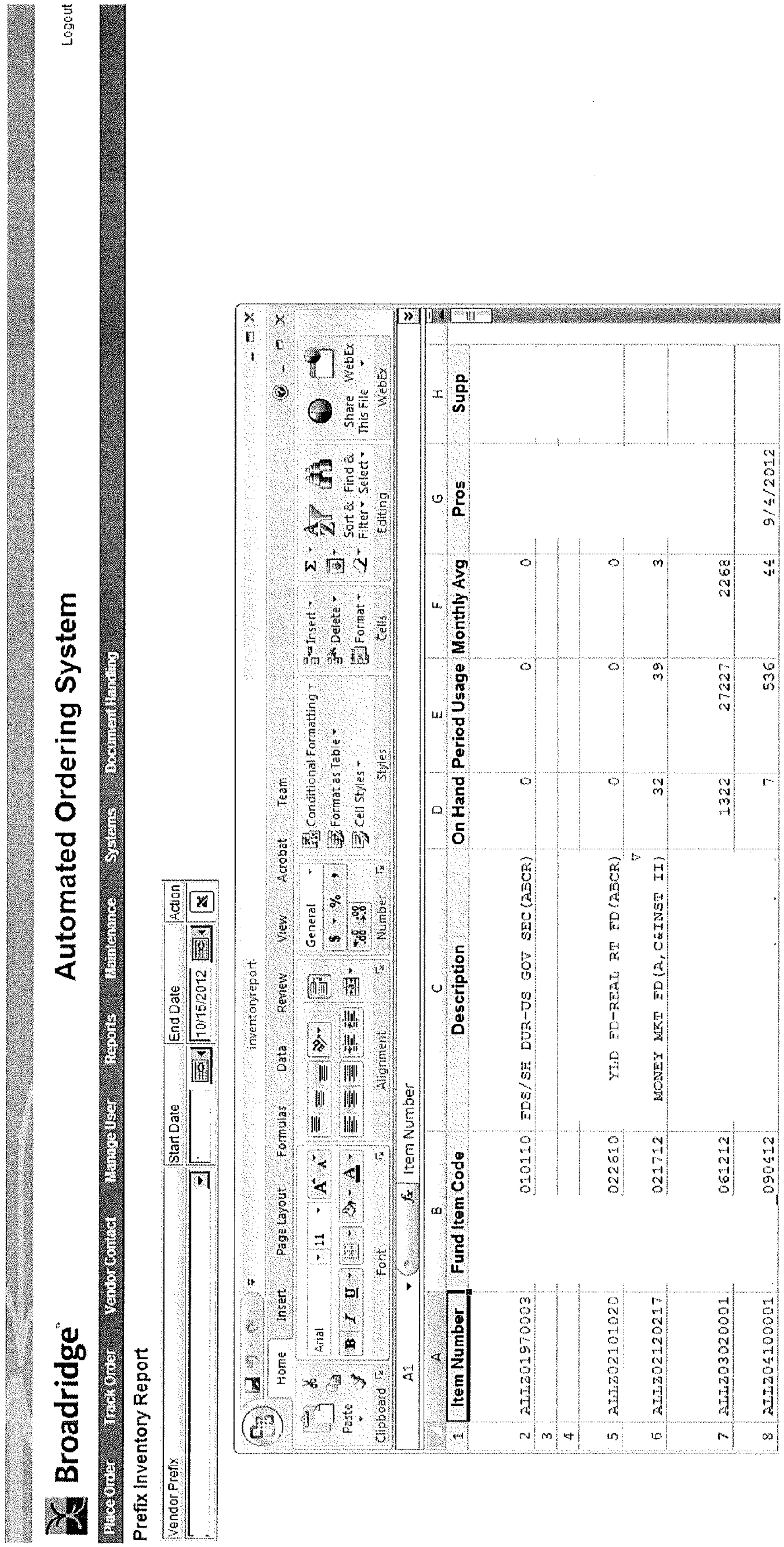

In some embodiments, this report is also used externally by the Fund. It shows the item usage for the period selected the monthly average and what is on hand. On the Inventory Report, just as is done on the Backorder screen, the Vendor Prefix is pre-populated and protected when the page is loaded, so they can only access data related to their fund. They can specify the date criteria to further control the date range that is returned. AOS creates the report in an Excel spreadsheet which they are free to save on their machine, edit, modify, etc. In some embodiments, the inventive computer methods and the computer systems/machines of the instant invention provide inventory reports by utilizing exemplary functionality (ies) in accordance with FIG. 32.

Orders by Prefix Report

Figure 33:
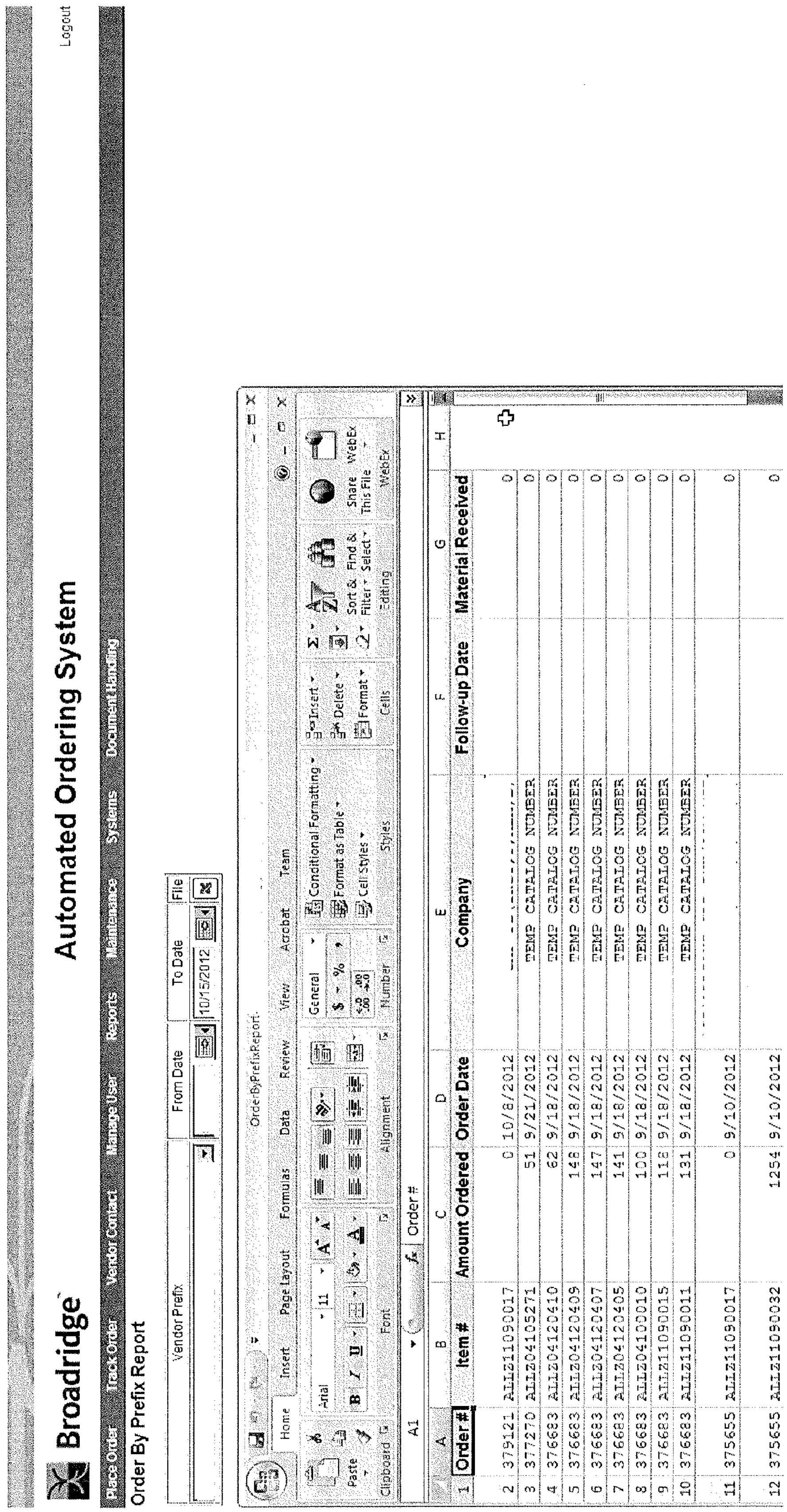

In some embodiments, orders for a selected vendor that were submitted with quantity amount/received and follow up dates. In some embodiments, the inventive computer methods and the computer systems/machines of the instant invention provide order reports by utilizing exemplary functionality (ies) in accordance with FIG. 33.

Client Cusip Status Report

Figure 34:
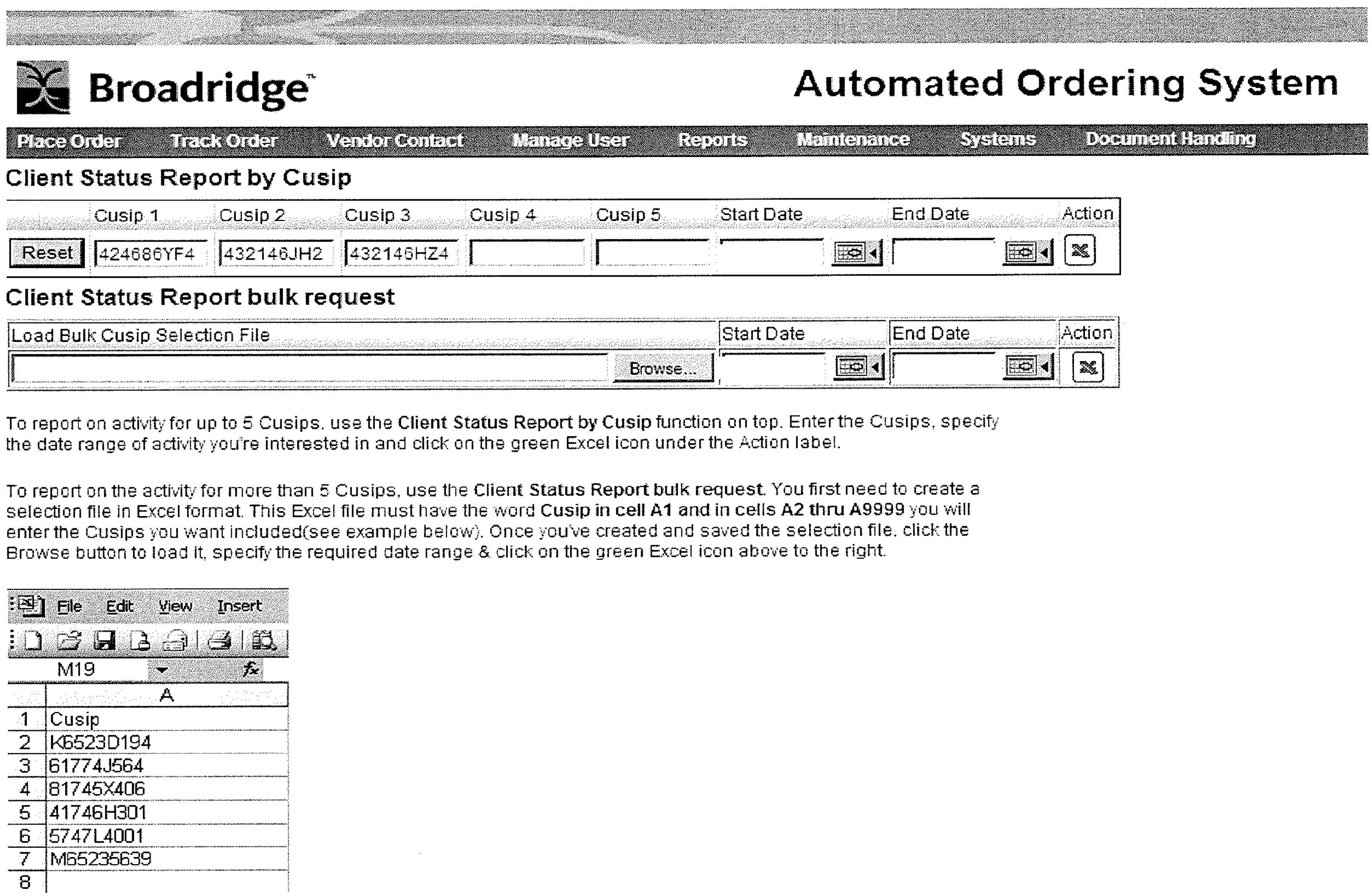

In some embodiments, this report can provide order history within the selected date range for the Cusip(s) selected including activity type, external notes, user, modified details, status, etc. In some embodiments, a user has an option to submit 1 to 5 Cusips and/or a special formatted excel file that include all the Cusips for which the report can be ran against. In some embodiments, the inventive computer methods and the computer systems/machines of the instant invention provide Cusip status reports by utilizing exemplary functionality (ies) in accordance with FIGS. 34-35.

Cusip Monitor Report

Figure 36:
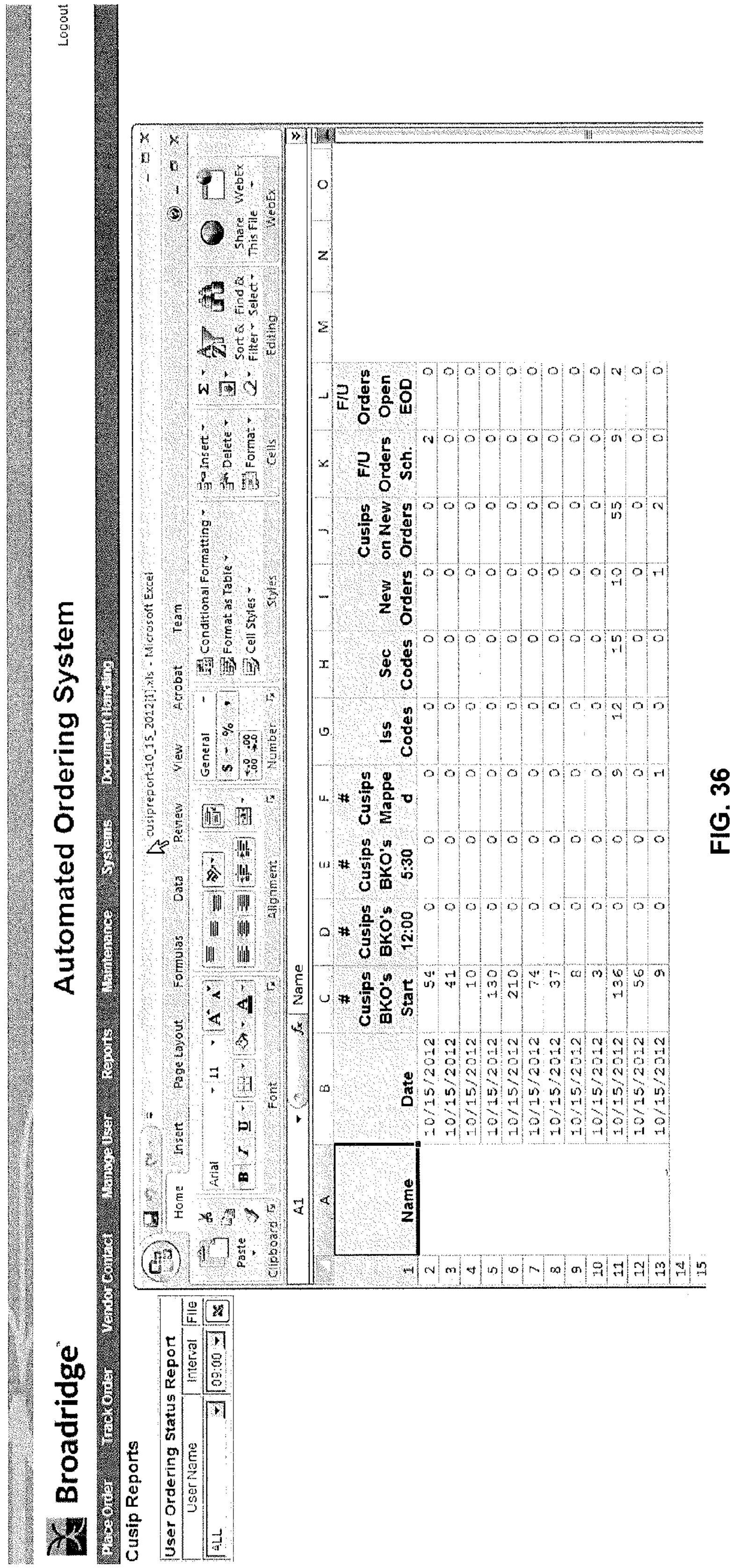
Figure 37:
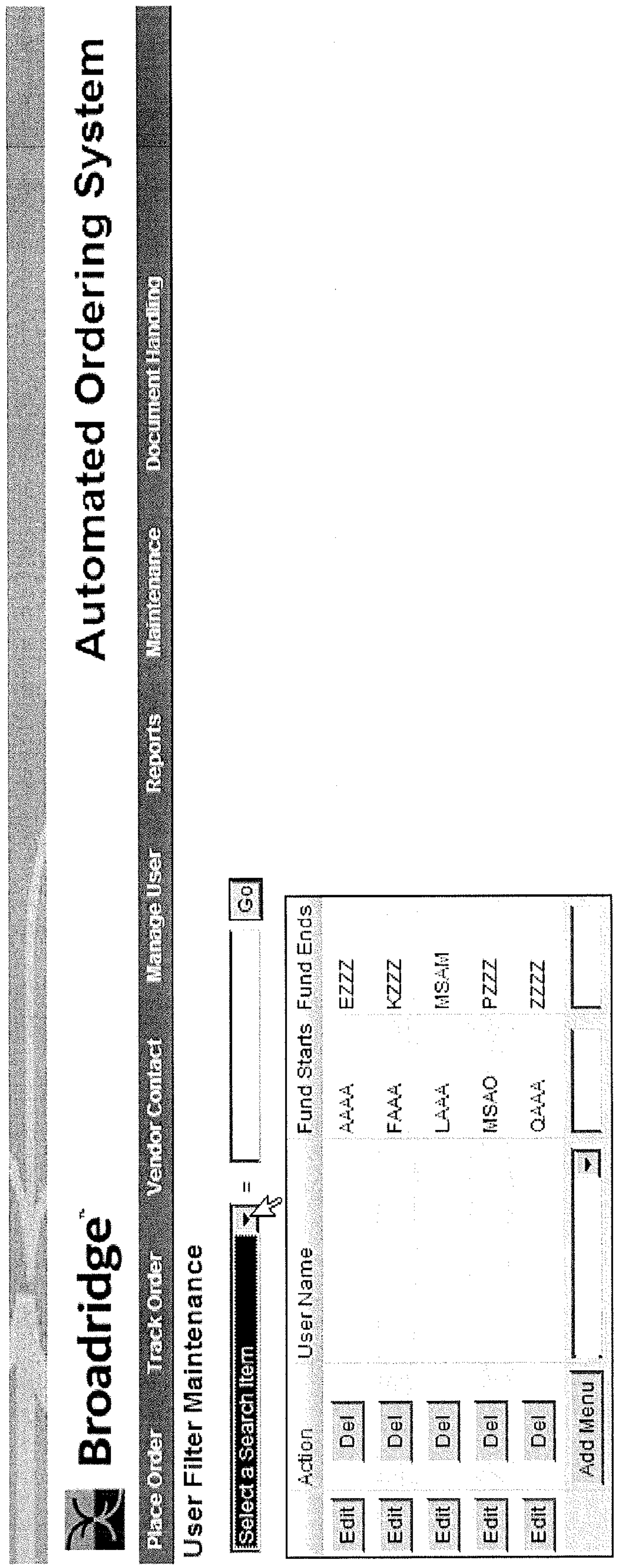
Figure 38:
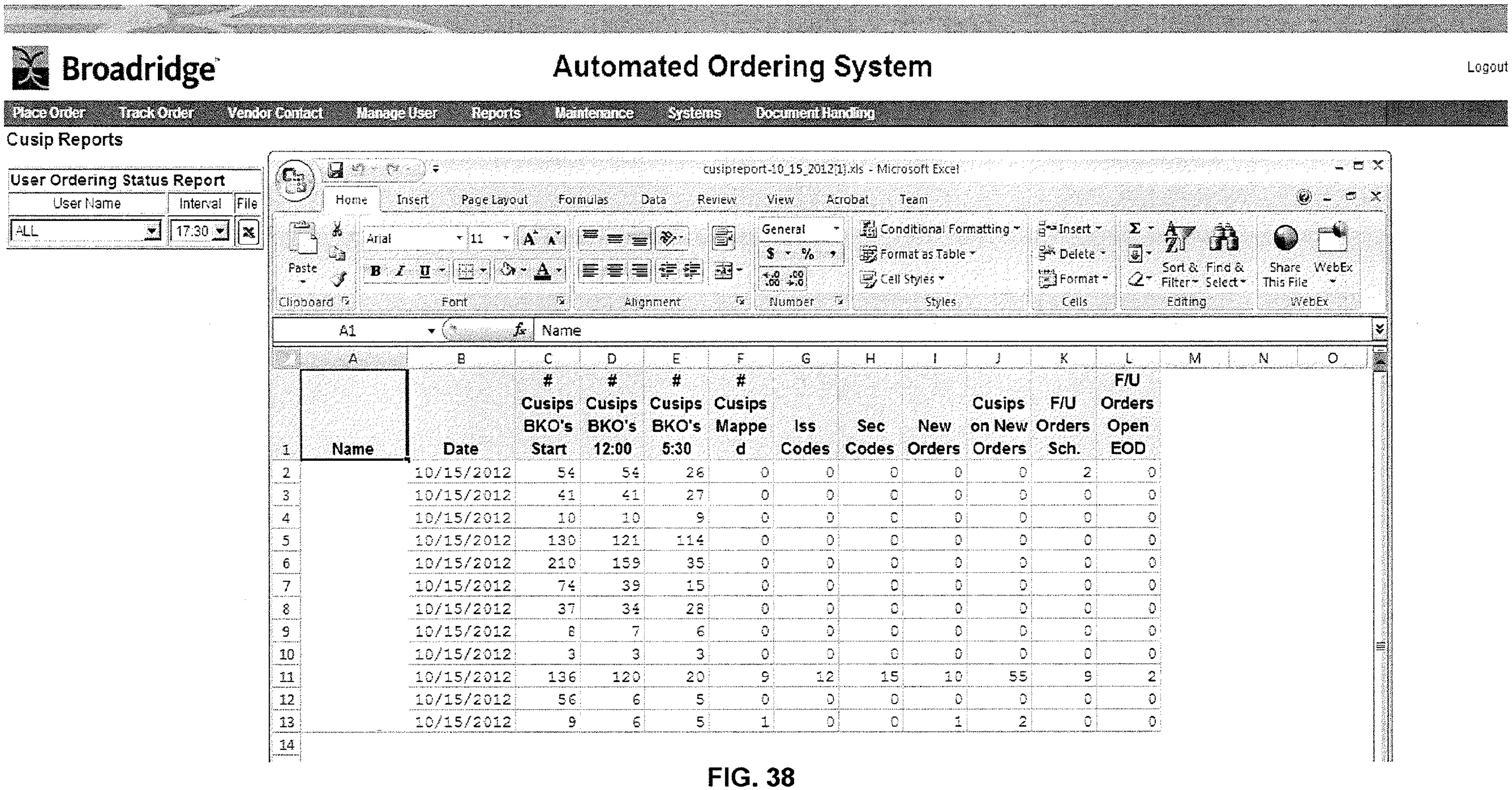

This Report is used to more accurately reflect the activity of the Ordering Associates. This user range which is maintained in the Range Filter Screen, drives the logic that generates this report. In some embodiments, the inventive computer methods and the computer systems/machines of the instant invention provide Cusip monitor reports by utilizing exemplary functionality(ies) in accordance with FIGS. 36-38.

Modified Cusip Details Report

Figure 39:
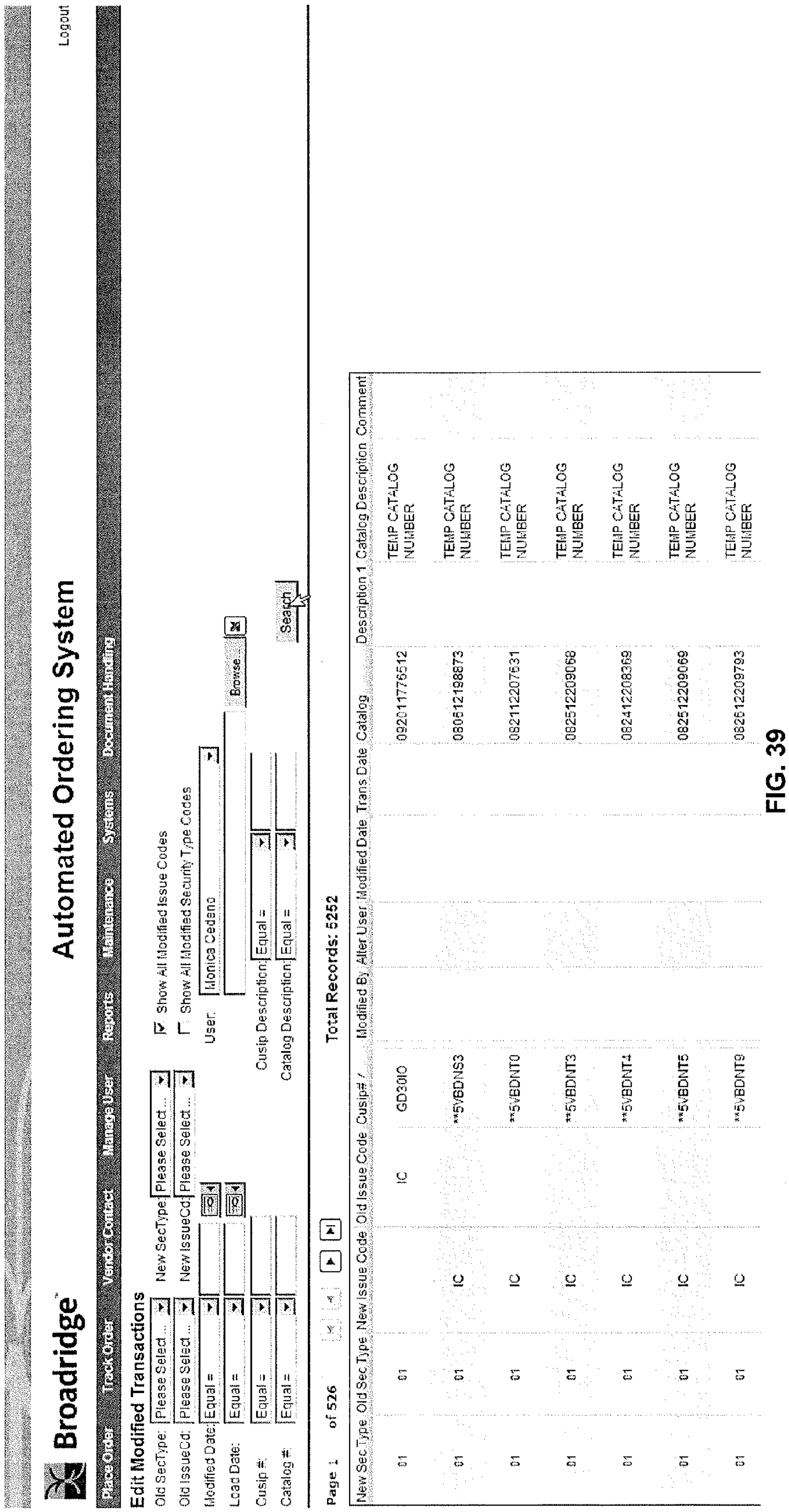
Figure 40:
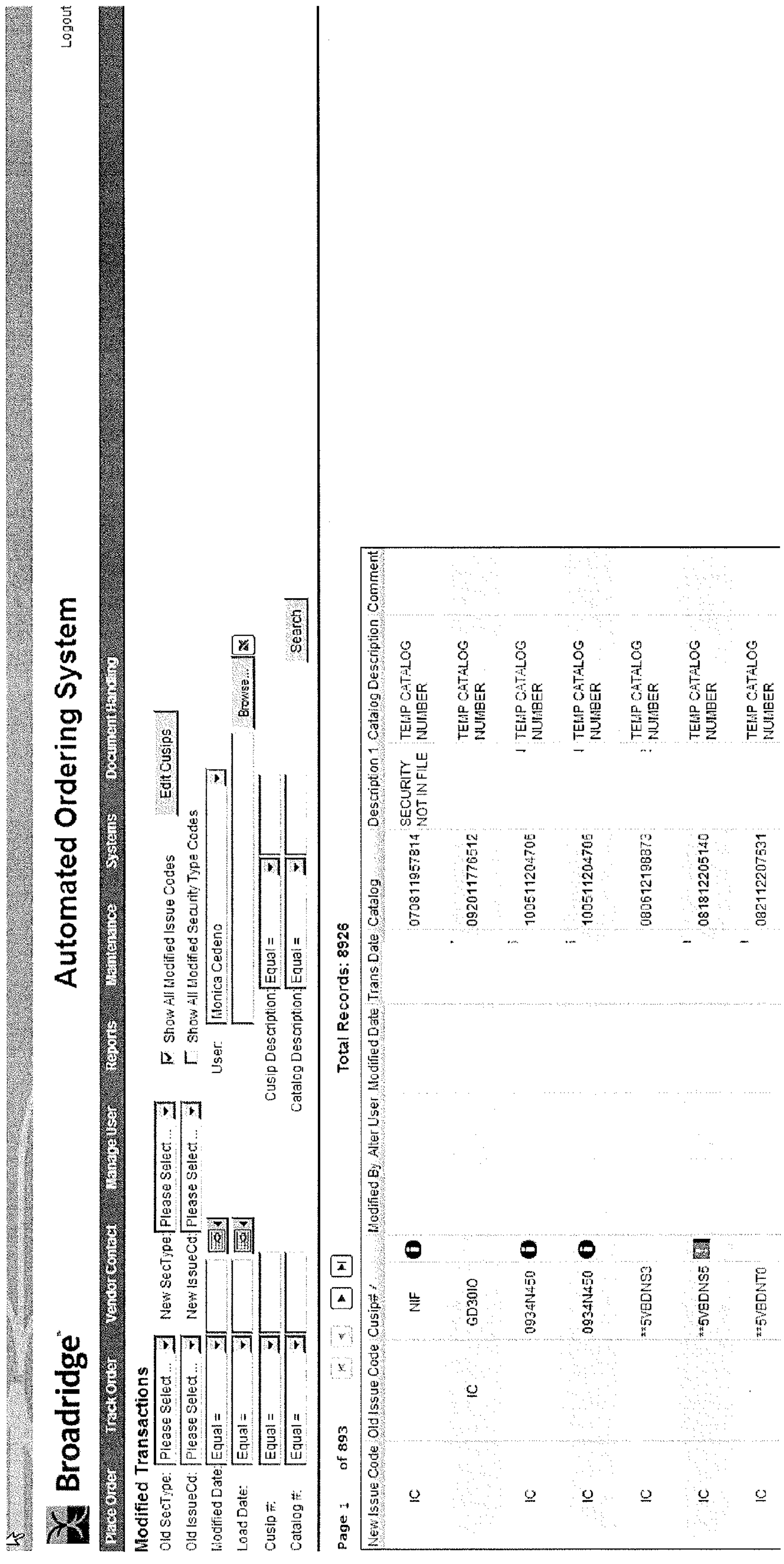

In some embodiments, this report's function allows the user to quickly & easily identify any security type and/or issue code changes that were done to transactions processed. In some embodiments, this is a very flexible function that gives the ability to specify a wide range of selection criteria to easily return filtered info. In some embodiments, a user can specify a given Cusip, ranges of Cusips, catalogs, dates, etc. In some embodiments, the user can click a check box to list all transactions with issue codes or security type changes. In some embodiments, the user can specify a user & return all the Cusip modifications done by that person. In some embodiments, the user can also load an Excel file with a list of Cusips that a client may send you requesting info on those specific Cusips. In some embodiments, the user can mix & match the options below to fit your needs. In some embodiments, the inventive computer methods and the computer systems/machines of the instant invention provide modified Cusip details reports by utilizing exemplary functionality(ies) in accordance with FIGS. 39-40.

Billing Contact Report

Figure 41:
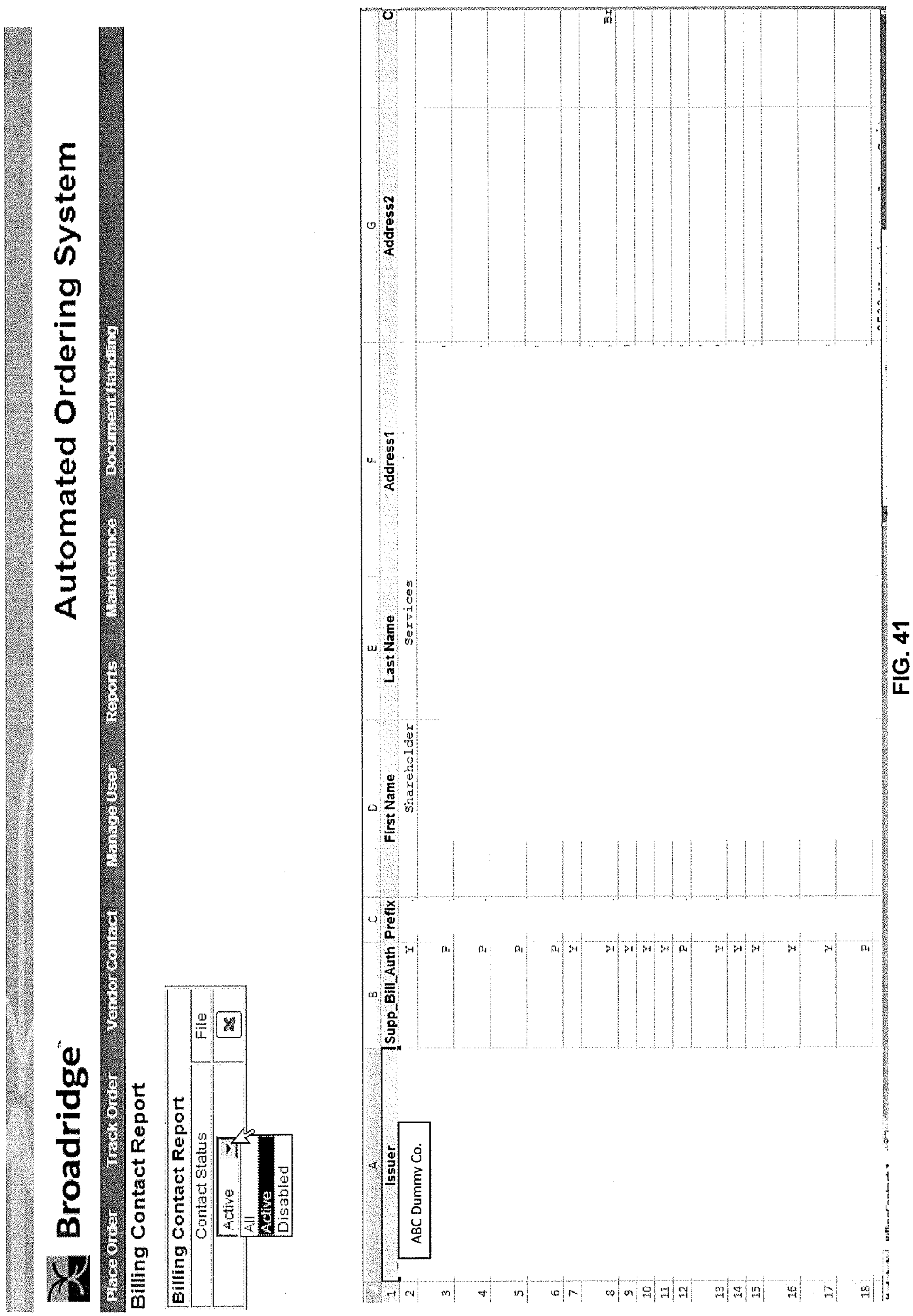

In this Report the user has an option to view All, Active or Disabled Contact Report. This report shows Billing contact info. In some embodiments, the inventive computer methods and the computer systems/machines of the instant invention provide billing reports by utilizing exemplary functionality (ies) in accordance with FIG. 41.

Maintenance

In this Maintenance section the users can be able to create/update:

Prefix Cross Reference

Create PDF

Issue Codes

Error Codes

PDF Page size Maintenance

Figure 42:
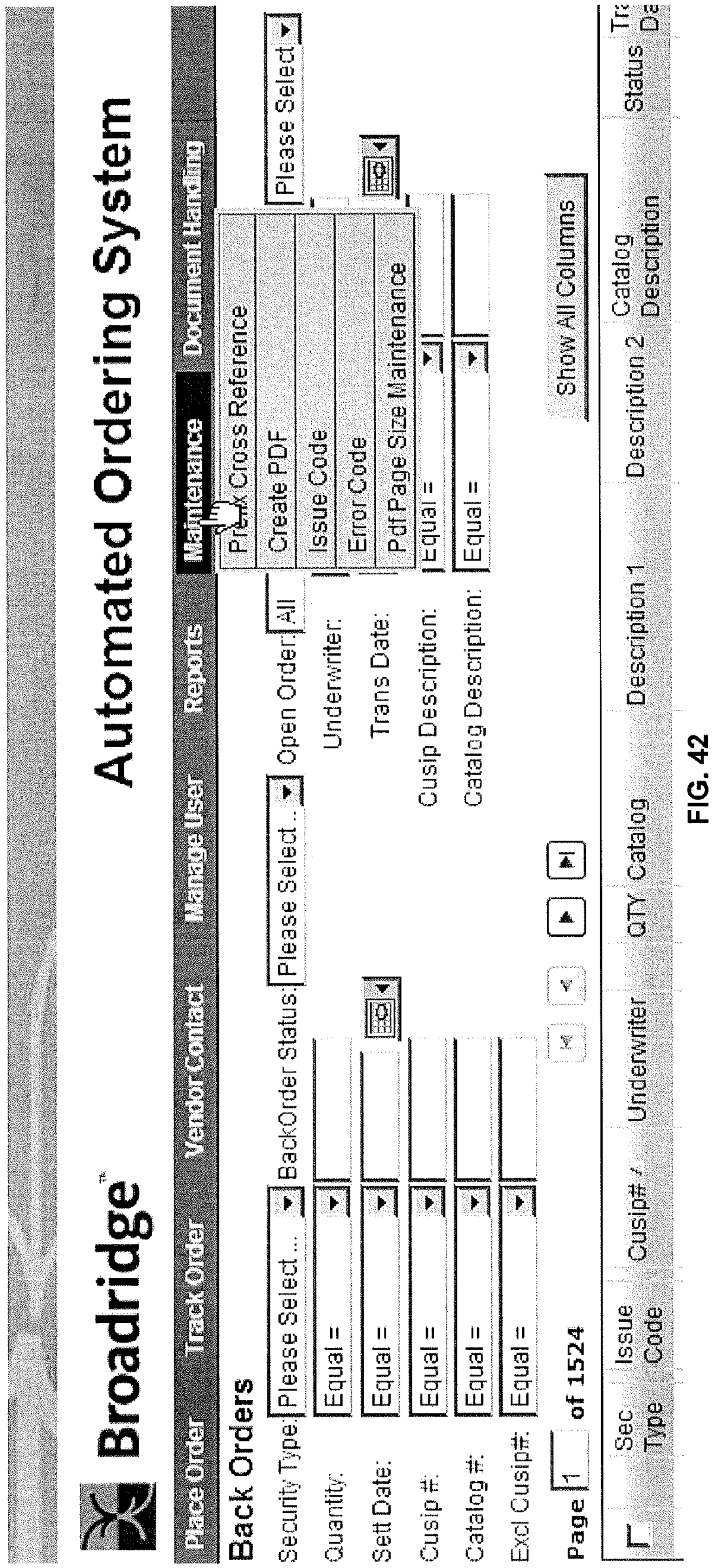

In some embodiments, the inventive computer methods and the computer systems/machines of the instant invention provide maintenance by utilizing exemplary functionality (ies) in accordance with FIG. 42.

Prefix Cross Reference

Figure 43:
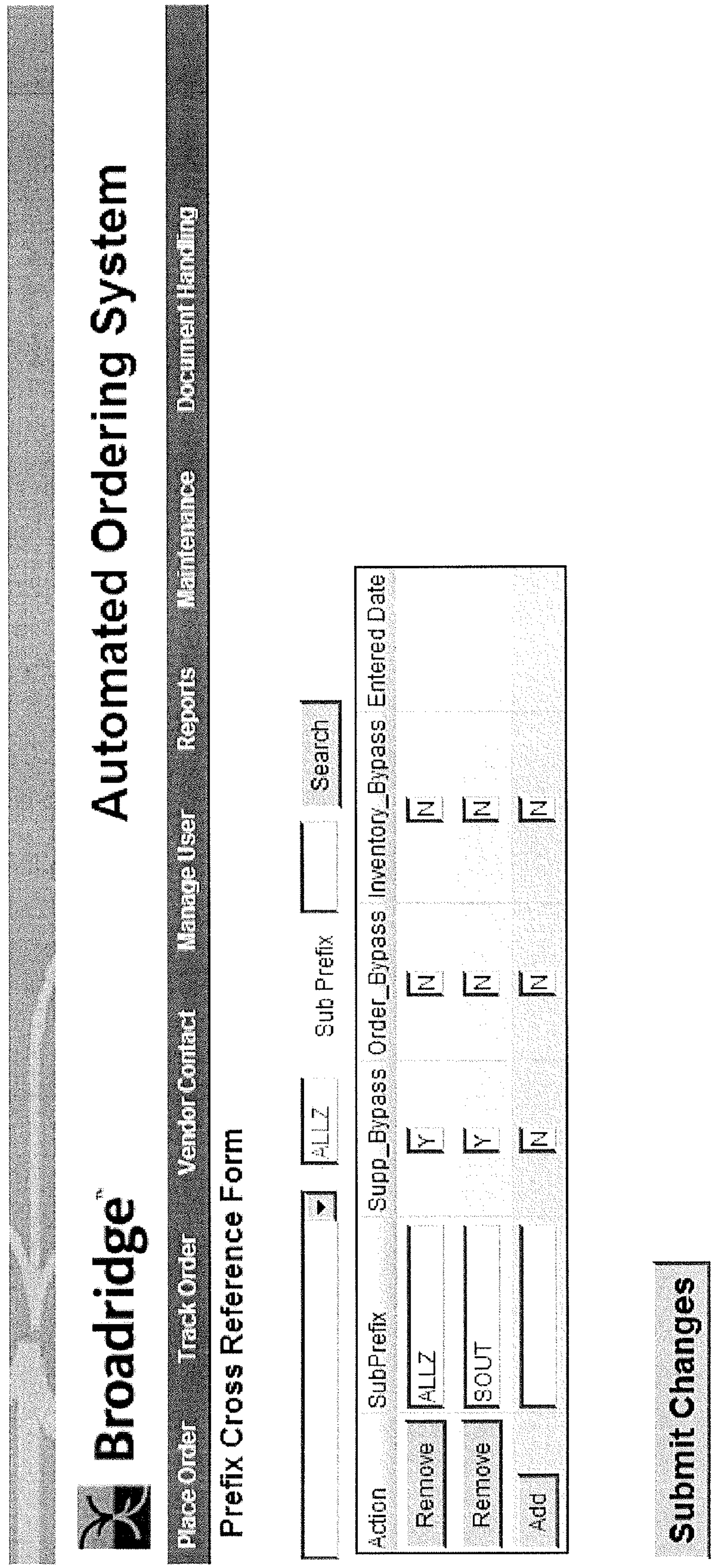

In some embodiments, this is where the Parent/Child relationship of the vendors is created and maintained. In some embodiments, the inventive computer methods and the computer systems/machines of the instant invention provide prefix cross reference by utilizing exemplary functionality(ies) in accordance with FIG. 43.

Create PDF

Figure 44:
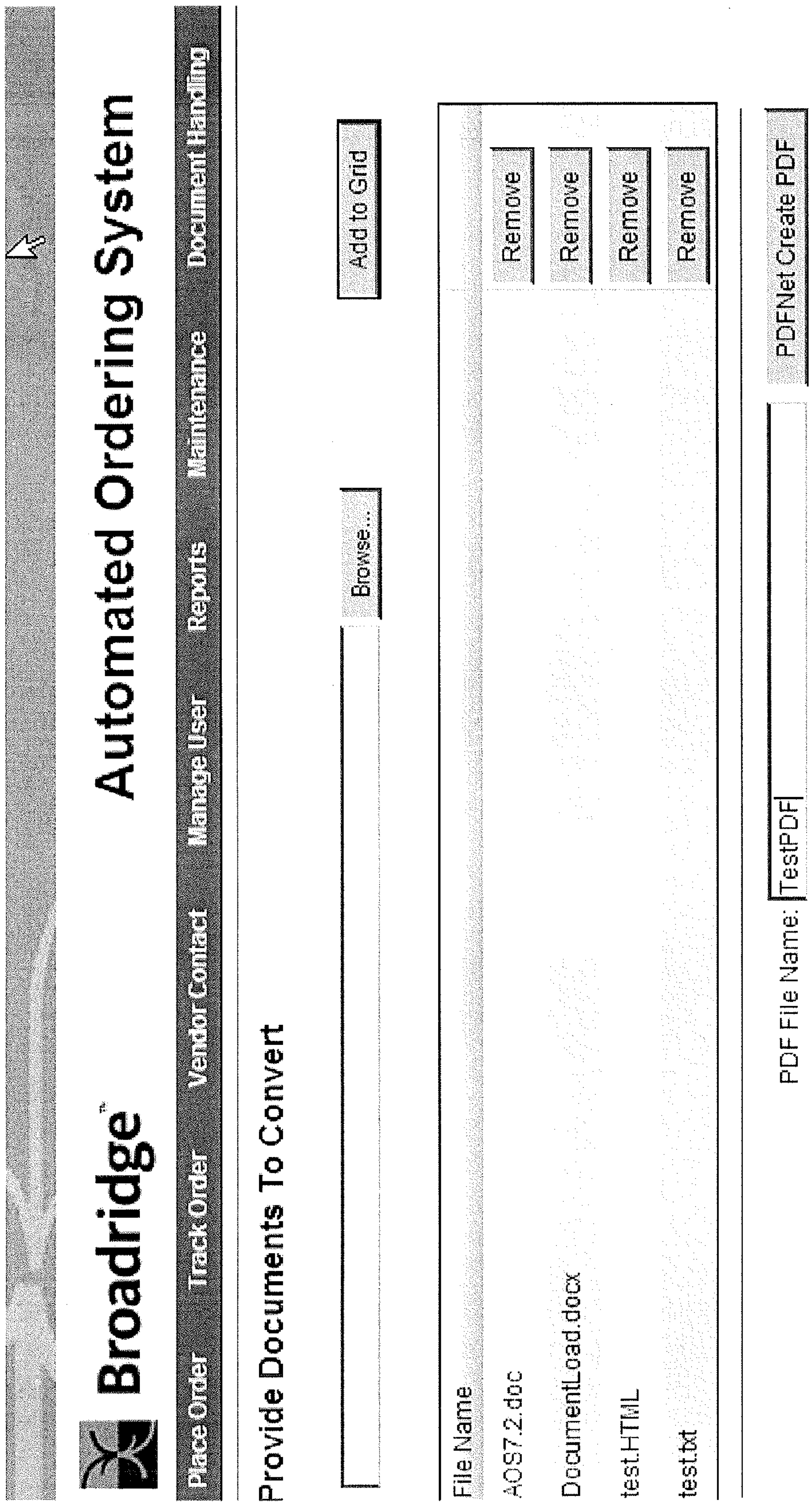

In some embodiments, this is where the user can convert or combine different types of documents into a PDF. In some embodiments, the inventive computer methods and the computer systems/machines of the instant invention provide document processing by utilizing exemplary functionality (ies) in accordance with FIG. 44.

Issue Codes

Figure 45:
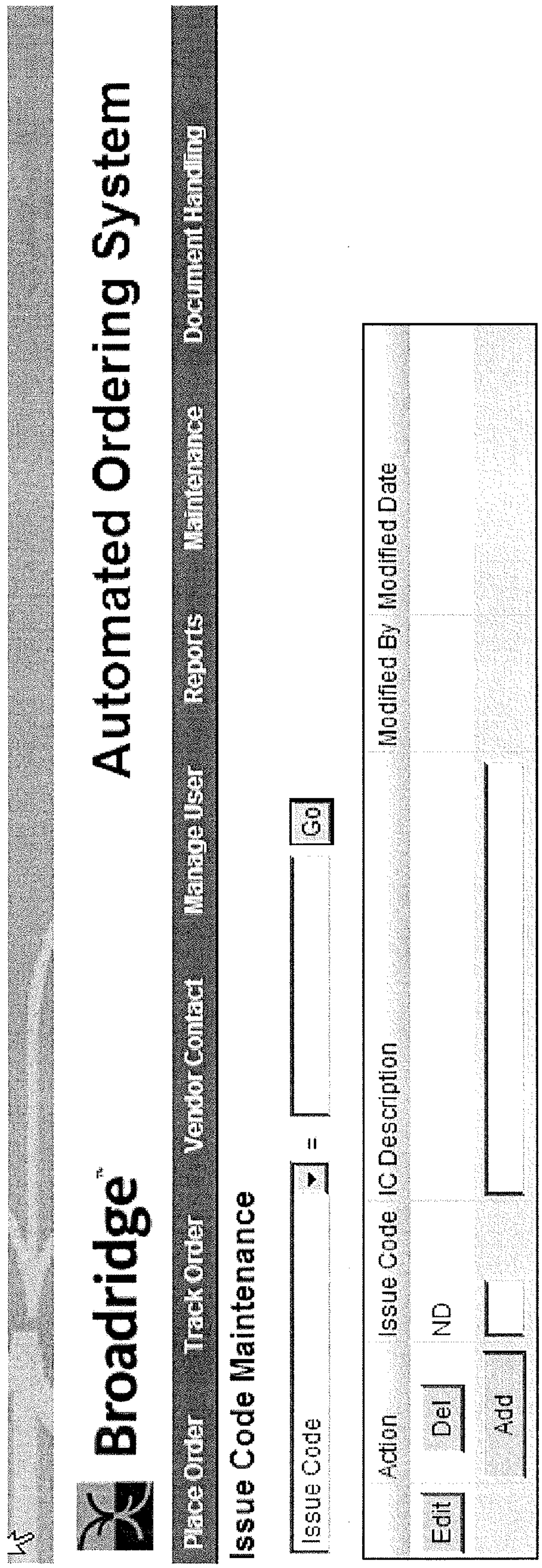

In some embodiments, this is where the Issue Codes are maintained. In some embodiments, the inventive computer methods and the computer systems/machines of the instant invention provide issue codes management by utilizing exemplary functionality(ies) in accordance with FIG. 45.

Error Codes

Figure 46:
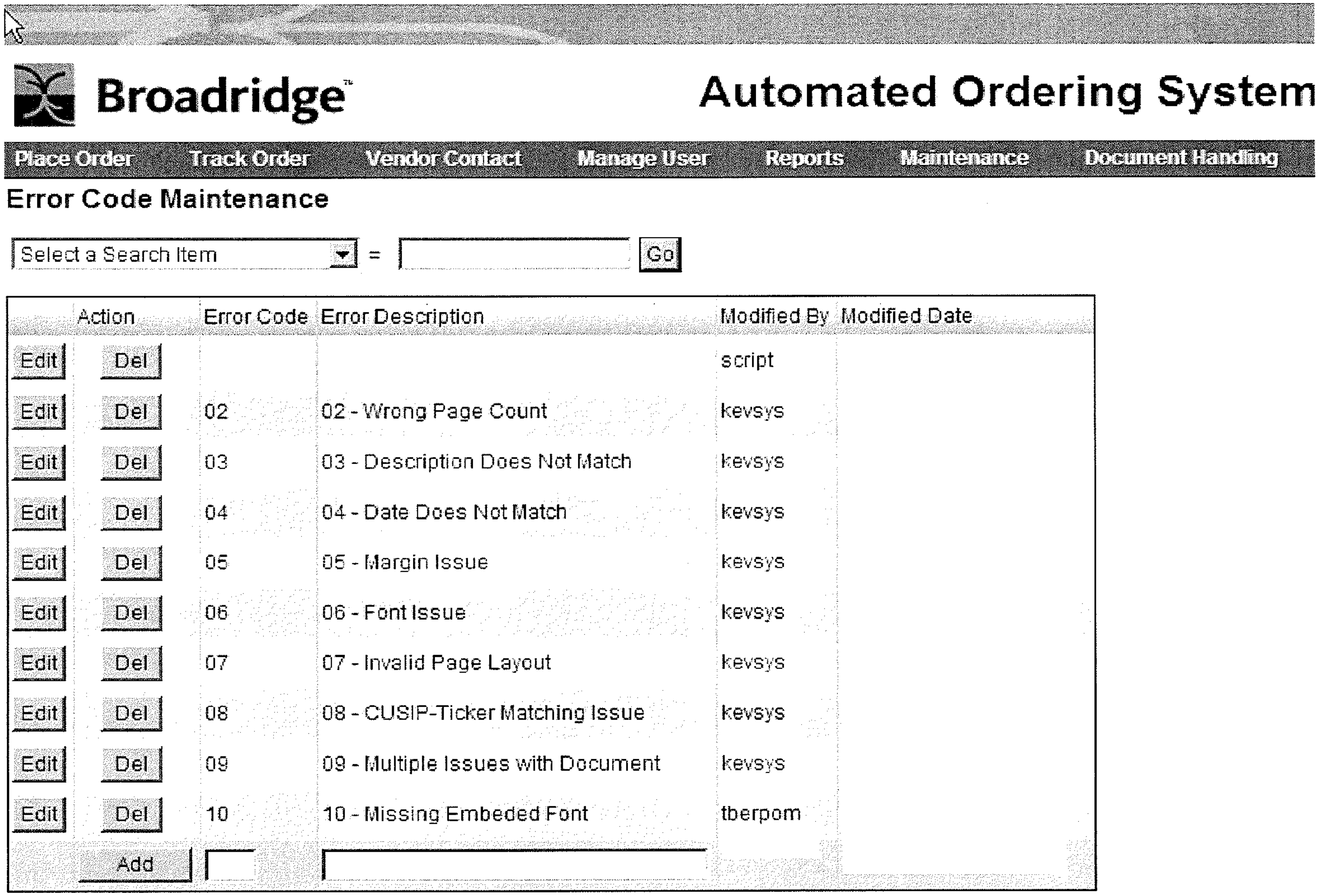

In some embodiments, this is where the Error Codes for the document handling are maintained. In some embodiments, they are used for the document handling QC to flag document with the error code/description when they fail a document. In some embodiments, the inventive computer methods and the computer systems/machines of the instant invention provide error codes management by utilizing exemplary functionality (ies) in accordance with FIG. 46.

PDF Page Size Code Maintenance

Figure 47:
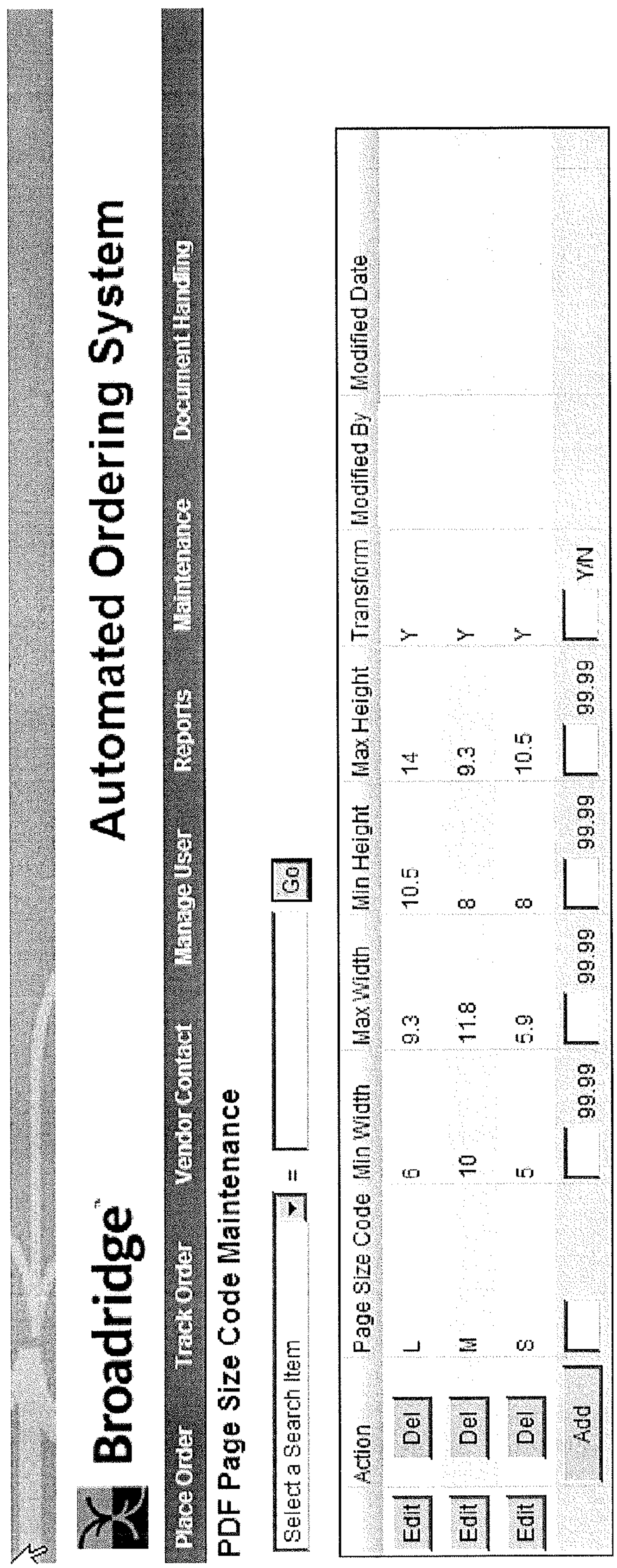

In some embodiments, this is where PDF Page Size/Codes for the document handling are configured and maintained. In some embodiments, they are used for the document handling to define what are the range of sizes for a document allowed to fall under a certain Code (L, M, S). In some embodiments, the inventive computer methods and the computer systems/machines of the instant invention provide pdf page size code management by utilizing exemplary functionality(ies) in accordance with FIG. 47.

External Access

Client Access

Figure 48:
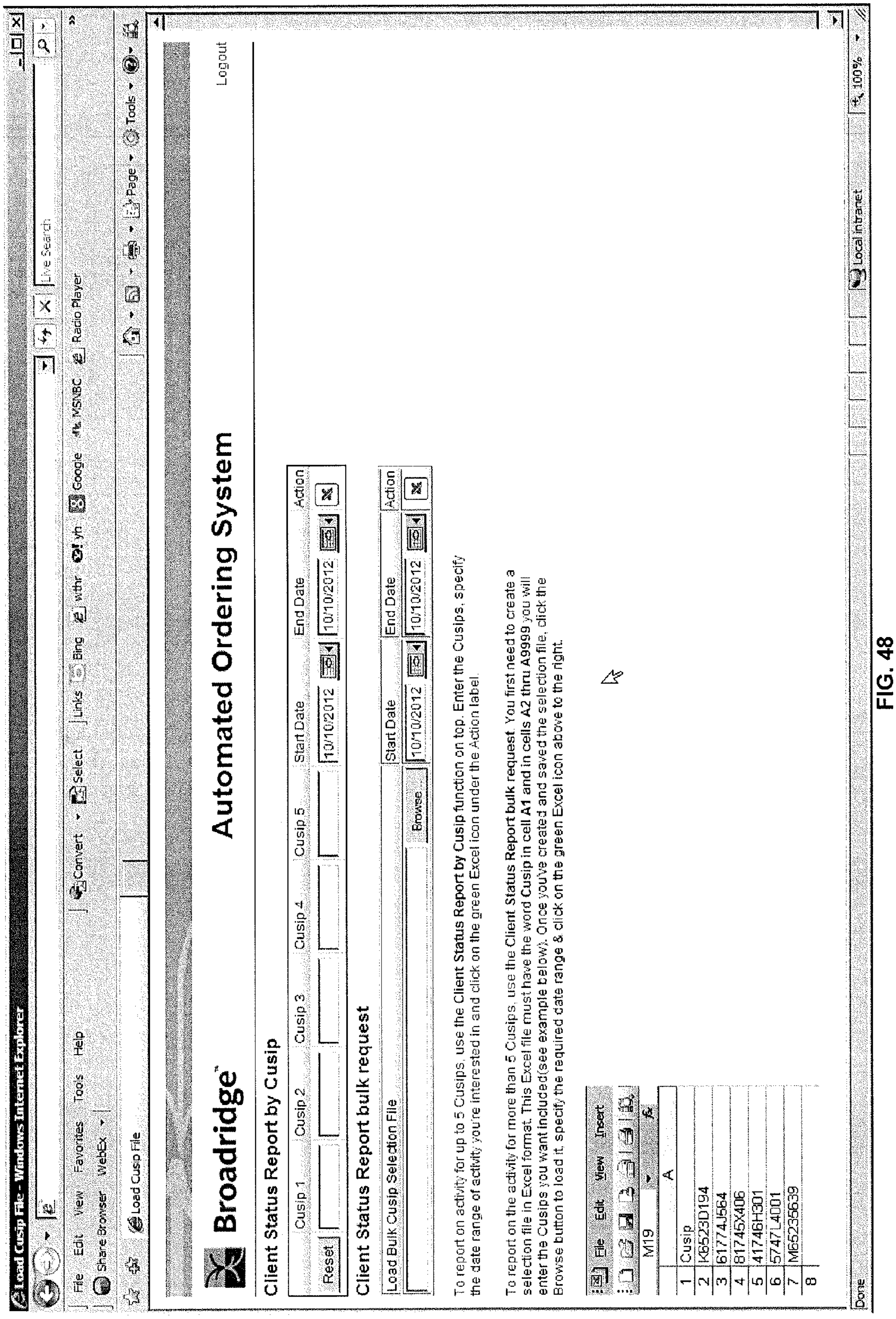

In some embodiments, when a user logs in, who has been defined under the Role of Client, the user can only be allowed to view the Client Cusip Status report which is called using a web service so that it could be used by another system (Prospect View) as shown below. In some embodiments, the user can have inquiry access only; all update functionality can be protected. In some embodiments, certain data and be blocked from being accessed by the user such as, but not limited to, internal notes, etc. In some embodiments, the inventive computer methods and the computer systems/machines of the instant invention provide user/client access management by utilizing exemplary functionality(ies) in accordance with FIG. 48.

Fund Access

Figure 49:
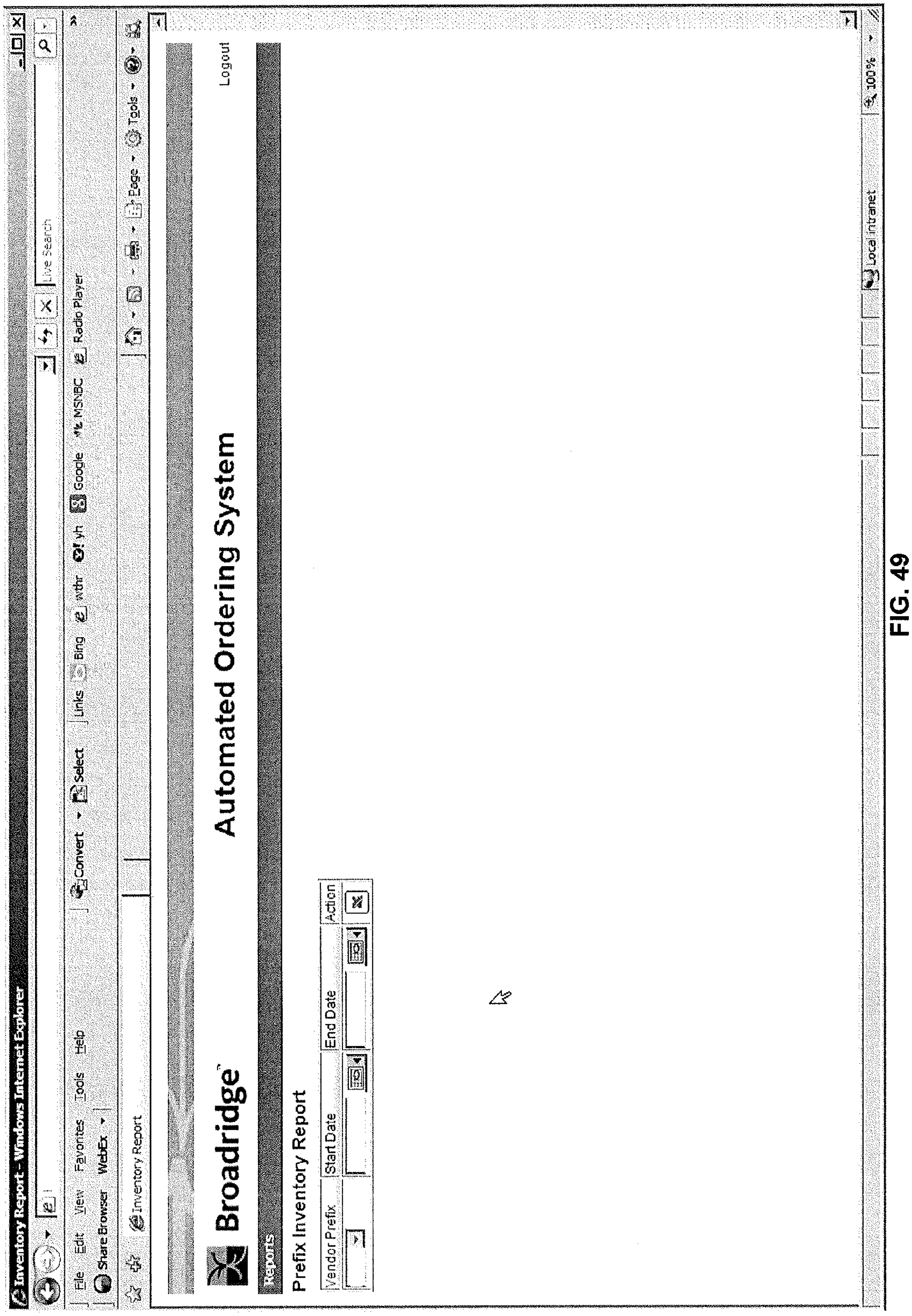

In some embodiments, when the user logs in who has been defined under the Role of Fund, the user can be allowed to view Backorders and generate Inventory reports for only the Fund that the user represents. In some embodiments, logic can be driven based on a Security Type for this user and a Prefix specified on the Add/Update User screen. In one example, when clients/users login to AOS, they can only get access to the Inventory Report. Through the Prefix cross reference logic where the Parent/Child relationship of the vendors, data belonging to all those prefixes can be returned. In some embodiments, the inventive computer methods and the computer systems/machines of the instant invention provide fund user/client access management by utilizing exemplary functionality(ies) in accordance with FIGS. 49-50.

Document Handling System (DHS)

Document Load

In some embodiments, the inventive computer methods and the computer systems/machines of the instant invention have an ability to print/deliver documents on demand from electronic PDF versions of Issuer documents (Prospectus, SummaryPro, SAI, Annual Report etc.) In some embodiments, these electronic documents are obtained from various sources. In some embodiments, the first source being an SEC filing service called EDGAR. For example, all publically traded companies are required to file registration statements, periodic reports, and other forms electronically through EDGAR. In some embodiments, AOS's document processing repository(ies) has/have an automated process which mines the EDGAR database, extracts the documents/data & loads into its/their system(s). In some embodiments, document processing repository(ies) transmit(s) these (Edgar Sourced) pdf's/xml, mapping data & process status files and FTP them to print facilities throughout the day. In some embodiments, these files are ingested, logged in the database & made print ready for high speed print by background processes.

In some embodiments, some issuers may prefer to distribute "Branded" documents with logos, color, etc., and these are supplied directly to AOS from the issuer via, for example, FTP or emails. Ordering reviews and processes the "Branded" documents via the Document Handling page and the system forwards the pdf and xml metadata (document info) files to the document processing repository(ies) via, for example, FTP. In some embodiments, these "Branded" documents can be used in place of the EDGAR sourced documents for print, web presentation & e-delivery purposes.

In some cases, the Issuers create "Branded" documents but don't send them to AOS and in this situation; the AOS pulls documents from the Issuers web site, ingest them through the Document Load screen and make them available for print as described above. In some embodiments, each ingested PDF is first run through a process which interrogates all documents, extracts PDF attributes from each, logs the attributes in the database & forwards the does to an additional conversion server. This server runs a third party product (PDF2AFP) to convert the document from PDF format into AFP format, forwards the AFP version of the document to a folder which is accessible to the IPM/IPW print process. At this point the database reference for each document is updated to indicate that this document as available for print.

In some embodiments, there are 2 types of documents that are used:

- Branded Documents: Some Issuers prefer to distribute "Branded" Documents with logos, color, etc., and these are supplied directly to Broadridge from the Issuer via FTP or emails. In some cases, the Issuers create "Branded" documents but don't send them to Broadridge and in this situation; the Ordering Team can pull documents from the Issuers web site.
- Edgar Documents: All publically traded companies are required to file registration statements, periodic reports, and other forms electronically through EDGAR.
- Broadridge Document processing repository(ies) has an automated process which mines the EDGAR database, extracts the documents/data & loads it into their system. Document processing repository(ies) transmits these (Edgar Sourced) pdf's with XML files that contains document Metadata, mapping data & process status files and FTP them to Broadridge Print facility 1 throughout the day.

In some embodiments, branded documents received from Funds through email or FTP are loaded into AOS using the Document Handling System and submitted. In some embodiments, Document processing repository(ies) receive(s) Edgar Documents which are then ingested into AOS by a DocumentResponse process triggered by a web service, on real-time basis or periodically, for example every 30 minutes. In some embodiments, the documents that are loaded whether loaded by a user or received through FTP from Document processing repository(ies) and ingested:

1 Documents information gets stored in AOS DB

2 Documents get sent to DDS

3 Documents get Transformed to AFP files so that they are Mainframe print ready and get sent to the NAS AFP folder.

4 Documents get sent to Electronic Document Delivery and Archival system to be archived 5 Documents that are loaded get sent to Document processing repository(ies) through FTP so that they get Edgar checked and get back all the information related to the document such as DocId, ExpirationDate, EffectiveDate, AmmendedDate, FilingDate, SupplementDate, LatestSupplementDate, DeadDate, FundFamily, LatestSupplementFilingDate, LatestSupplementDate.

In some embodiments, there are 3 types of Feeds that we receive from Document processing repository(ies) throughout the day to update print database(s). Document Response feed:

For Branded Documents: the document information related to the document loaded in an XML file. For Edgar Documents: the documents (PDF) and the document information related to the document in an XML file.

Document Status feed: the Document status report which provides statuses for all the processes that a document goes thru at Document processing repository(ies). Whenever a process status for a branded document is changed, the status update is FTPd to us in the status report.

Mapping Data feed: the information related to all the document in a mapping file (Intraday mapping file) that is received on real-time or a predetermined periodic basis, for example, throughout the day and processed by a MappingData process.

The document information extracted: DocId, Prefix, ExpirationDate, EffectiveDate, AmmendedDate, FilingDate, SupplementDate, LatestSupplementDate, DeadDate, FundFamily, LatestSupplementFilingDate, LatestSupplementDate.

In some embodiments, at certain time, the Version Control process gets triggered. In some embodiments, the Version Control process Activate/Inactivate/Pend document accordingly.

The active documents (ready to be fulfilled by the Mainframe process) then are uploaded to the Mainframe using a WMS batch process. For Version Control see Version Control.

In some embodiments, the Version Control process can have one or more of the following steps.

Figure 51:
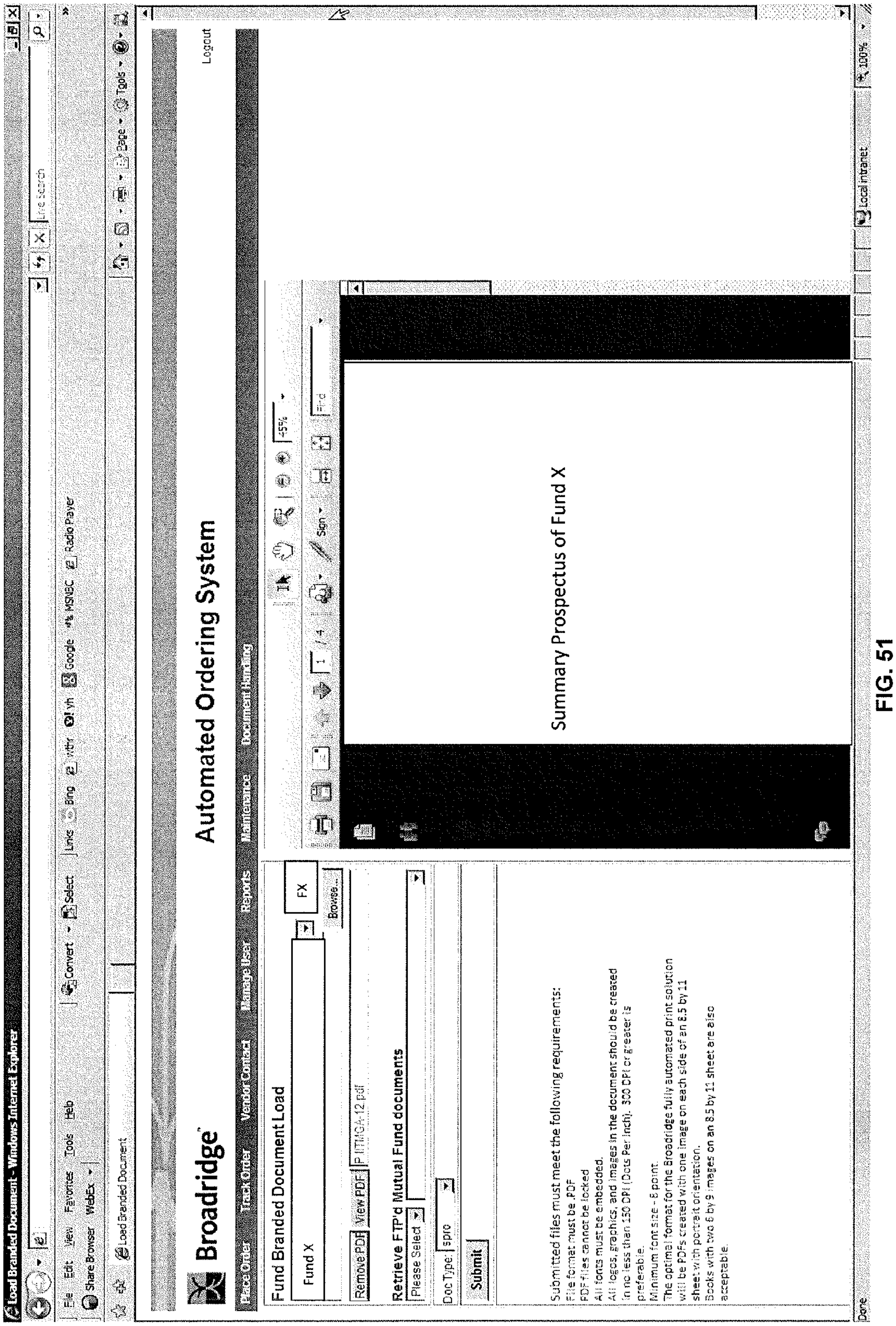

1) In some embodiments, the user can load Branded documents received from the issuer either through FTP or Email Using the Document Load Screen (see FIG. 51).

2) In some embodiments, once the Document is submitted, a record gets inserted in the tracker/trackerdetails tables, an XML file with the documents Metadata gets generated. In some embodiments, the instant invention utilized encryption protocols (e.g., MD5) for secure data transmissions. In some embodiments, a copy of the Document and XML files get sent to PDFInbox folder on the Web Server, where it gets ingested by Electronic Document Delivery and Archival system's Ingestion scheduled task that runs on-demand/real-time or on a pre-set periodic basis. The Electronic Document Delivery and Archival system Ingestion can move the document with the XML files to the Electronic Document Delivery and Archival system Archive Library.

3) In some embodiments, a copy of the Document and XML files get copied to the NAS. In some embodiments, the PDF is first run through DocInfo, a process which interrogates all documents, extracts PDF attributes, logs the attributes in the database & forwards the docs to an additional conversion server to be transformed. This server runs a third party product (PDF2AFP) to convert the document from PDF format into AFP format, forwards the AFP version of the document to a folder which is accessible to the IPM/IPW print process. At this point the database reference for each document is updated to indicate that this document as available for print. In some embodiments, document types that can be transformed are as follows:

i. spro—Summary prospectus ii. sprs—Summary prospectus supplement iii. prps—Statutory prospectus supplement iv. misc—Letters v. misc—Custom Portfolio In some embodiments, the inventive computer methods and the computer systems/machines of the instant invention provide document type management by utilizing exemplary functionality(ies) in accordance with FIG. 52.

4) In some embodiments, a copy of the Document and XML files get copied to DDS folder.

Figure 53:
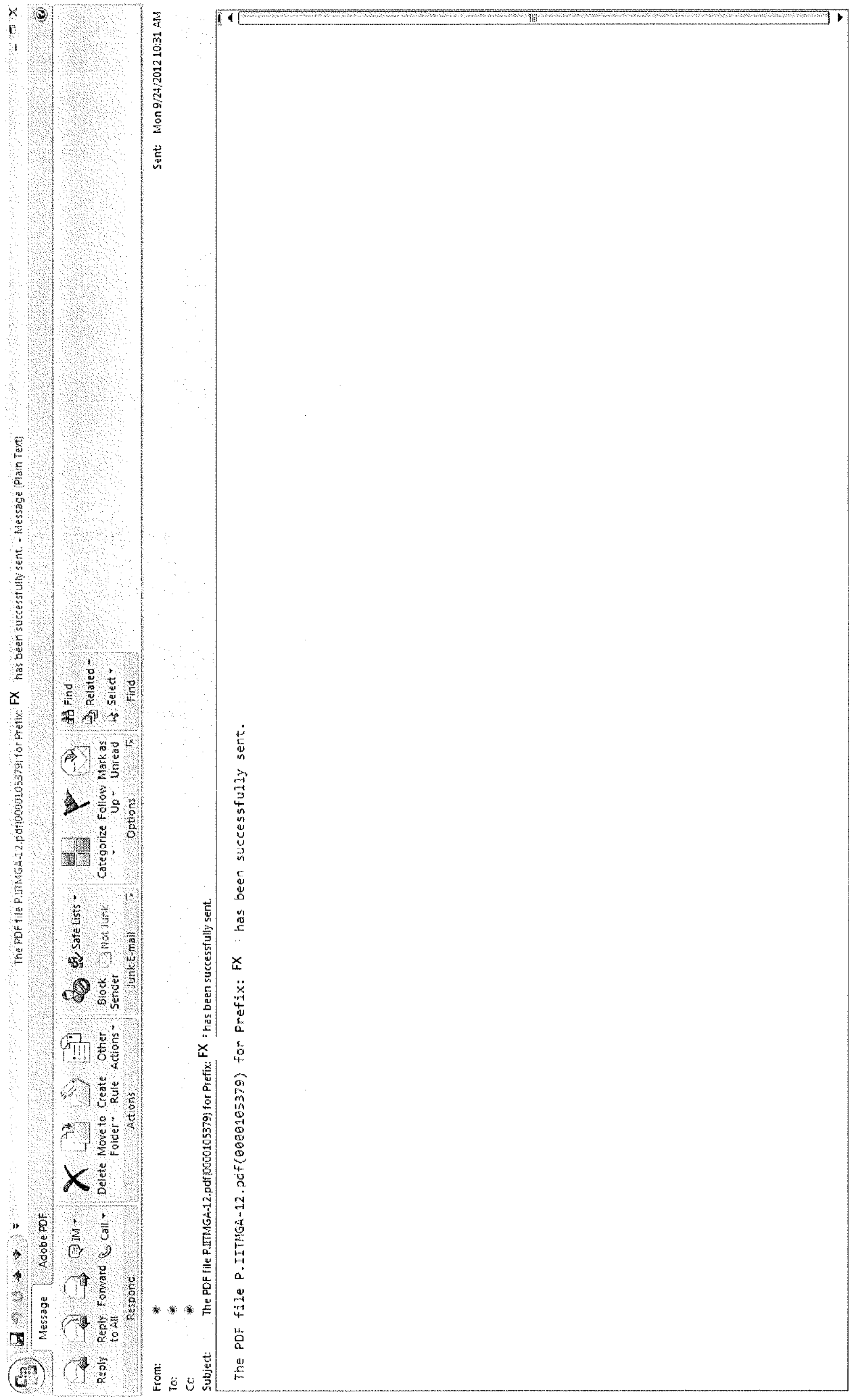

5) In some embodiments, a copy of Document/XML/.done files get FTPd to Document processing repository(ies) using the Receipt Id as the name that got created when the document was first submitted. In some embodiments, the inventive computer methods and the computer systems/machines of the instant invention provide action/event confirmations (e.g., an email) by utilizing exemplary functionality(ies) in accordance with FIG. 53.

6) In some embodiments, the documents/XML/.done files that are sent to Document processing repository(ies) can get FTPd back to AOS where a process moves them to the NAS so that they can be processed through the response feed with other Edgar documents/XML/.done, and are named with Document processing repository(ies)'s DocIds instead of the Receip ID which can be used to update print facility's records with those DocIDs and fund family, etc., extracted from the XML file. In some embodiments, other fields can be update with information received through other feeds from Document processing repository(ies) (mapping Feed, Intraday Feed, FilingDate Feed, Status Feed) such as Prefix, filing date, expiration date, supplement date etc., whether the Documents were Loaded through AOS DHS or through the Feed (Edgar Docs) from Document processing repository(ies).

In some embodiments, the DocumentProcessStatus feed provides info on the outcome of the Edgar Check. This feed can be processed and can update the Document Tracker with the Process Status. In some embodiments, an email are generated and an excel file of the StatusFeed get generated and attached to the email and get sent the Edgar Check Alert email box (Ordering Group). In some embodiments, XML/Done files get FTPd to AOS where a process moves them to the NAS.

In some embodiments, there are three types of Mapping files we receive from Document processing repository(ies) that get FTPd to AOS where there is a process that moves them to the NAS, so that they can be processed. For more details, see Document processing repository(ies)/DHS feeds.

7) In some embodiments, periodically, the Version Control process gets triggered by the last mapping file received from Document processing repository(ies) by a window Service.

The Version Control process Activate/Inactivate/Pend document accordingly.

The active documents (ready to be fulfilled by the Mainframe process) then are uploaded to the Mainframe using a WMS batch process.

Document Tracking

In some embodiments, documents processed through this Document Load screen are logged, tracked in the AOS database and archived in Electronic Document Delivery and Archival system. In some embodiments, the documents and information related to each document is accessible via the Document Tracker screen. In some embodiments, the document search criteria on this screen allow the user to select a specific document or a group of documents based on very granular search criteria. In some embodiments, a document can be identified based on any combination of the following fields: Item Number, Material Code, Receipt ID, AFP_ID, Imposed, Prefix, User ID, Cusip, PDF_ID, Status Date. Status, Doc Type. Entry Date, Vendor Name, Source or a specific File Name. Once the page retrieves information on the documents included in your search criteria, you can retrieve the actual document from Electronic Document Delivery and Archival system by clicking on an pdf icon.

Figure 54:
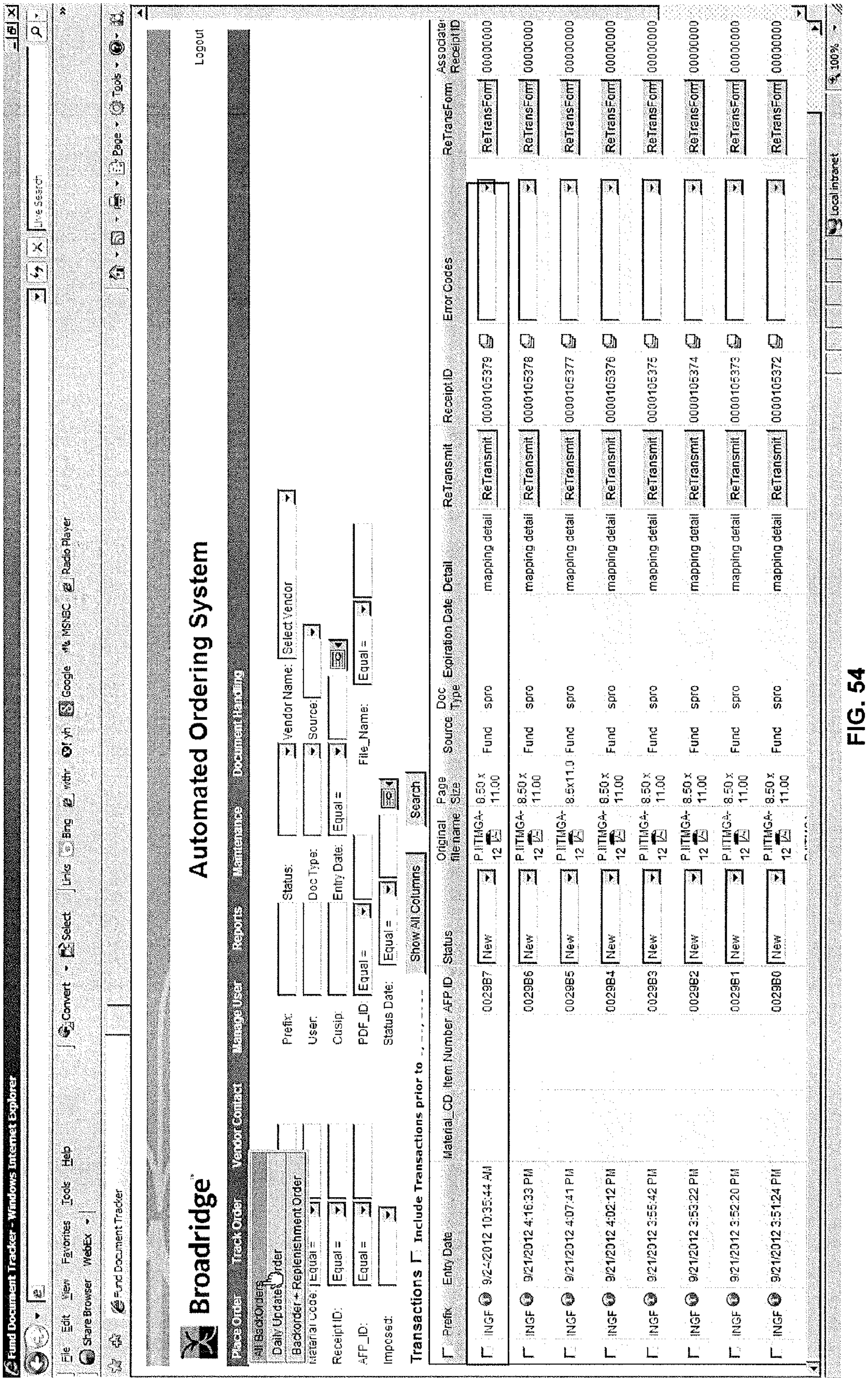

This can invoke the PE API and retrieve the document to your screen. The user can also use this screen to retransmit a document(s) which can FTP the selected document/XML/.dne to Document processing repository(ies). In some embodiments, the inventive computer methods and the computer systems/machines of the instant invention provide retransform documents by utilizing exemplary functionality (ies) in accordance with FIG. 54.

Print Preparation

In some embodiments, documents are ingested as a PDF, run through a process which interrogates each one, extracts attributes from each, logs the attributes in the database & forwards the docs to an additional conversion server. This server runs a third party product (PDF2AFP) that converts the document from PDF format into AFP format. The AFP version of the document is then forwarded to a file share which is accessible to the IPM/IPW print process. At this point the database reference for each document is updated to indicate that this document as available for print.

Exemplary Quality Control

In some embodiments, at periodic rate, there is a QC upload process that gets triggered which sends Document attributes from the AOS Tracker and WMS that have not been QCed and sends that to the Mainframe to print a set of 1 each of newly submitted PDF's to be printed. In some embodiments, these control set documents are reviewed by QC prior to being used for actual Prod runs. To segregate this control set, the DocumentInfo/TransformMonitor to flag these docs as Transformed after the submission/transformation processes. In some embodiments, the Transformed status can identify the docs to be selected in a QC upload process. After the QC print run, QC can review the printed output for errors. In some embodiments, if there are problems with a given document, the user can log on to the Document Handling portion of the AOS application and use the AFP QC Scan Screen to change the status of the given document to Fail. In some embodiments, to speed the process, all the user has to enter either manually enter the AFP_ID or use scanning gun, the system can automatically fail the document and they can be required to check which Error code(s) to indicate why the document failed. In some embodiments, associates with QC role can be routed directly to this QC screen which is a restricted view that does not allow the Retransmit function. In some embodiments, if a given document passes the QC inspection, the QC flag in the Tracker get set to 'Y' and they'll be selected later in the WMS upload which runs after the FeedMapping and Version Control, and selects and sends active documents/records to the Mainframe. In some embodiments, the mainframe files tell the print process which documents can be used in the Production print run.

Figure 55:
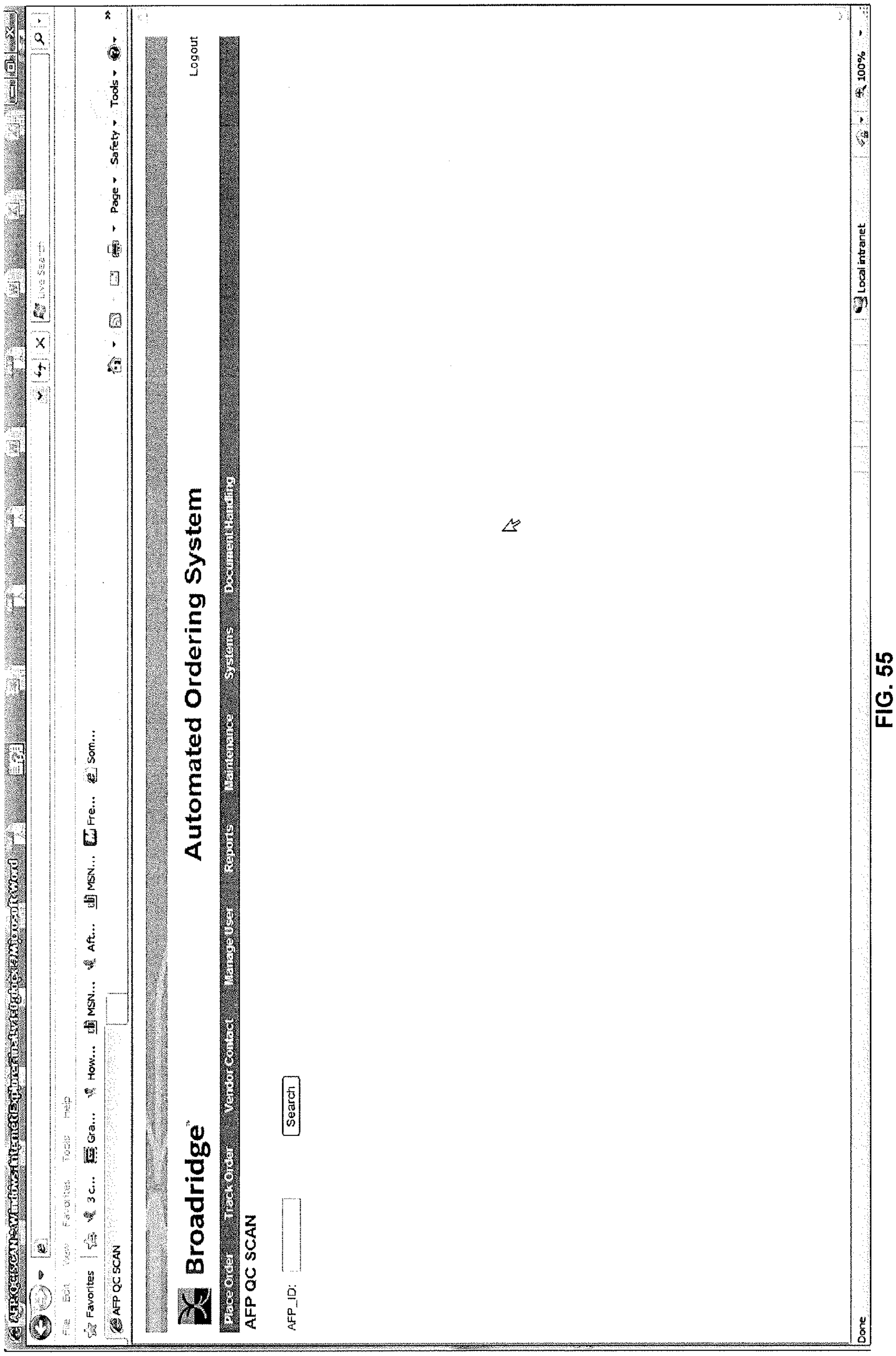
Figure 56:
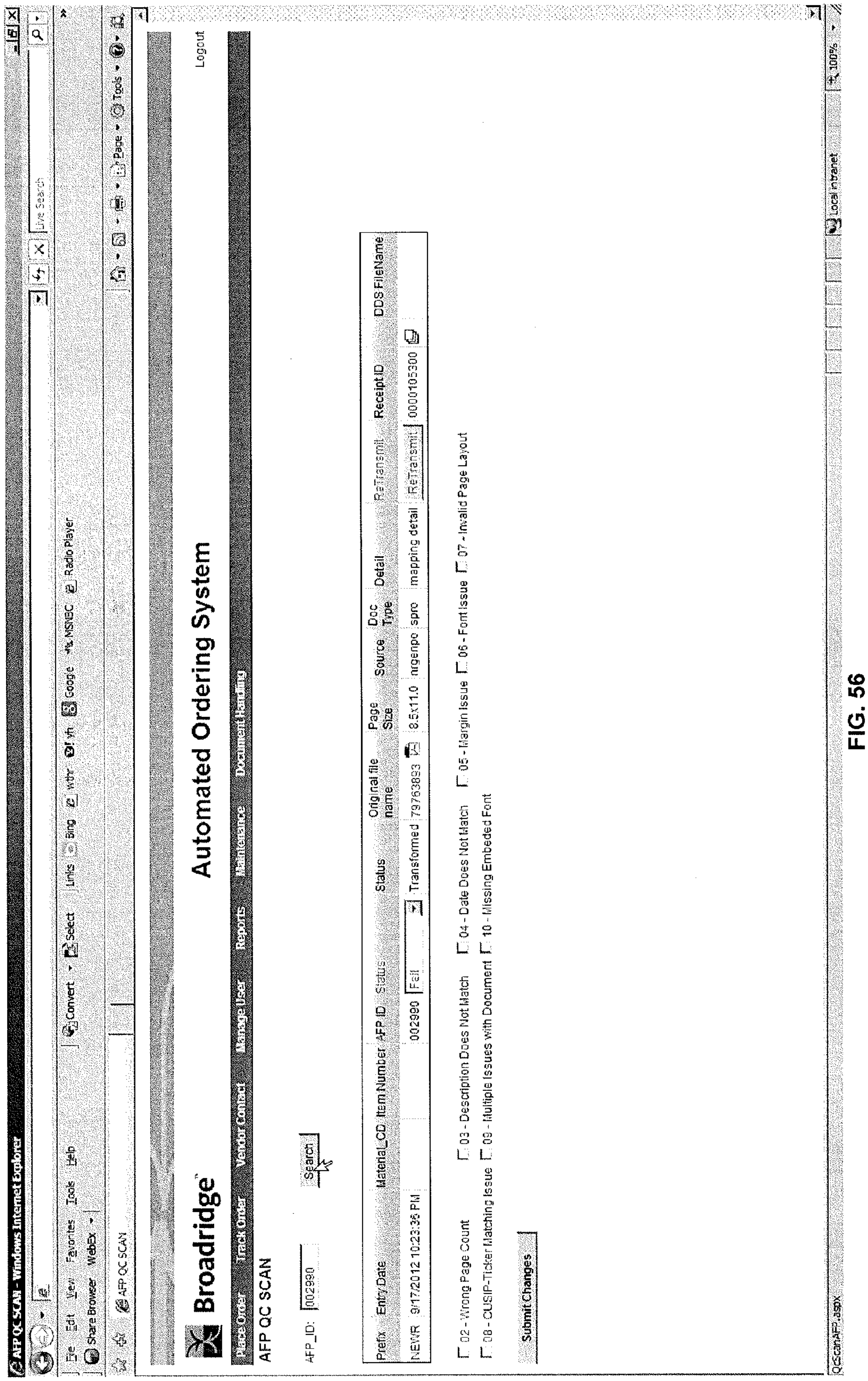

Exemplary AFP QC Scan Screen (FIGS. 55-56)

In some embodiments, the logic behind this screen as follows:

i. Only fail documents where the QCed flag is set to N.

ii. Change the status in the Document Tracker to F—always.

iii. Record the transaction in the Detail table.

Figure 57:
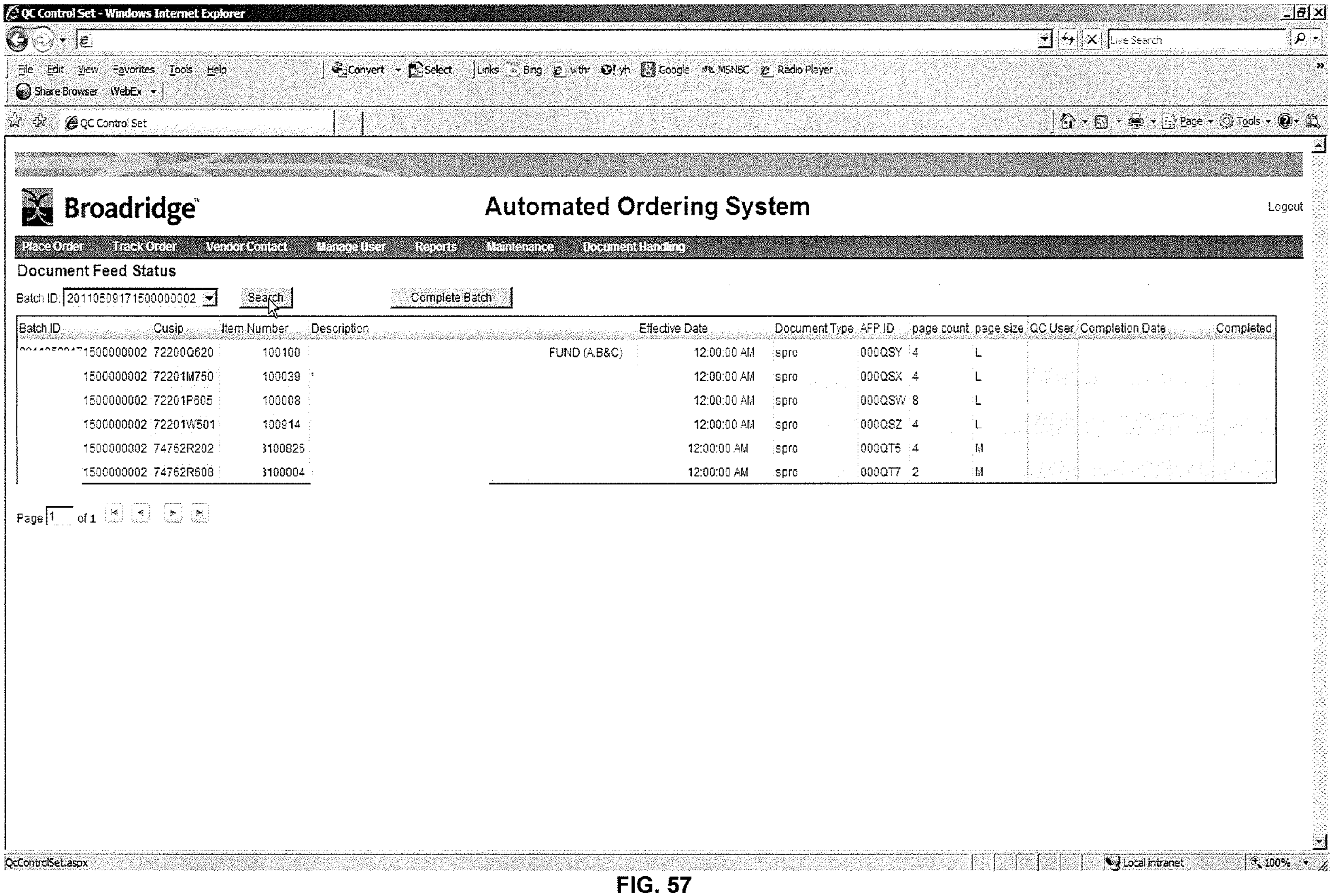

Exemplary QC Batch Screen (FIG. 57)

In some embodiments, this screen is where a QC user completes the batch which sets Documents that have gone through the QC process by setting the QC flag in the tracker to 'Y'. Documents with the QC flag set to 'Y' can be selected to be processed by VC.

A QC user can select the batch to be completed, then click the Complete Batch button:

Each record in the batch can be flagged as being completed.

Each record in the batch can be date/time stamped.

The associate ID of the person completing the batch can be captured.

Capture the status changes. In some embodiments, the following values can be captured for each record of the batch being completed:

1. ProcessName="PrinterQC"
2. ProcessStatus="Succede"IProcessStatus="Failed/Passed"
3. ProcessStatusId="25"/ProcessStatusId="26"
4. ProcessStatusCode="Printer QC Passed"/ ProcessStatusCode="Printer QC Failed"
5. ProcessStatusDesc="Passed Print facility 1 printer QC"/ ProcessStatusDesc="Failed Print facility 1 printer QC"

In some embodiments, the instant invention allows to generate the XML/done status feed to be transmitted to Document processing repository(ies).

In some embodiments, the instant invention allows to transmit the XML/done status file to Document processing repository(ies) via FTP:

Document processing repository(ies)'s FTP site

Destination folder—DocStatus

Exemplary DHS Flow Diagrams

Figure 58:
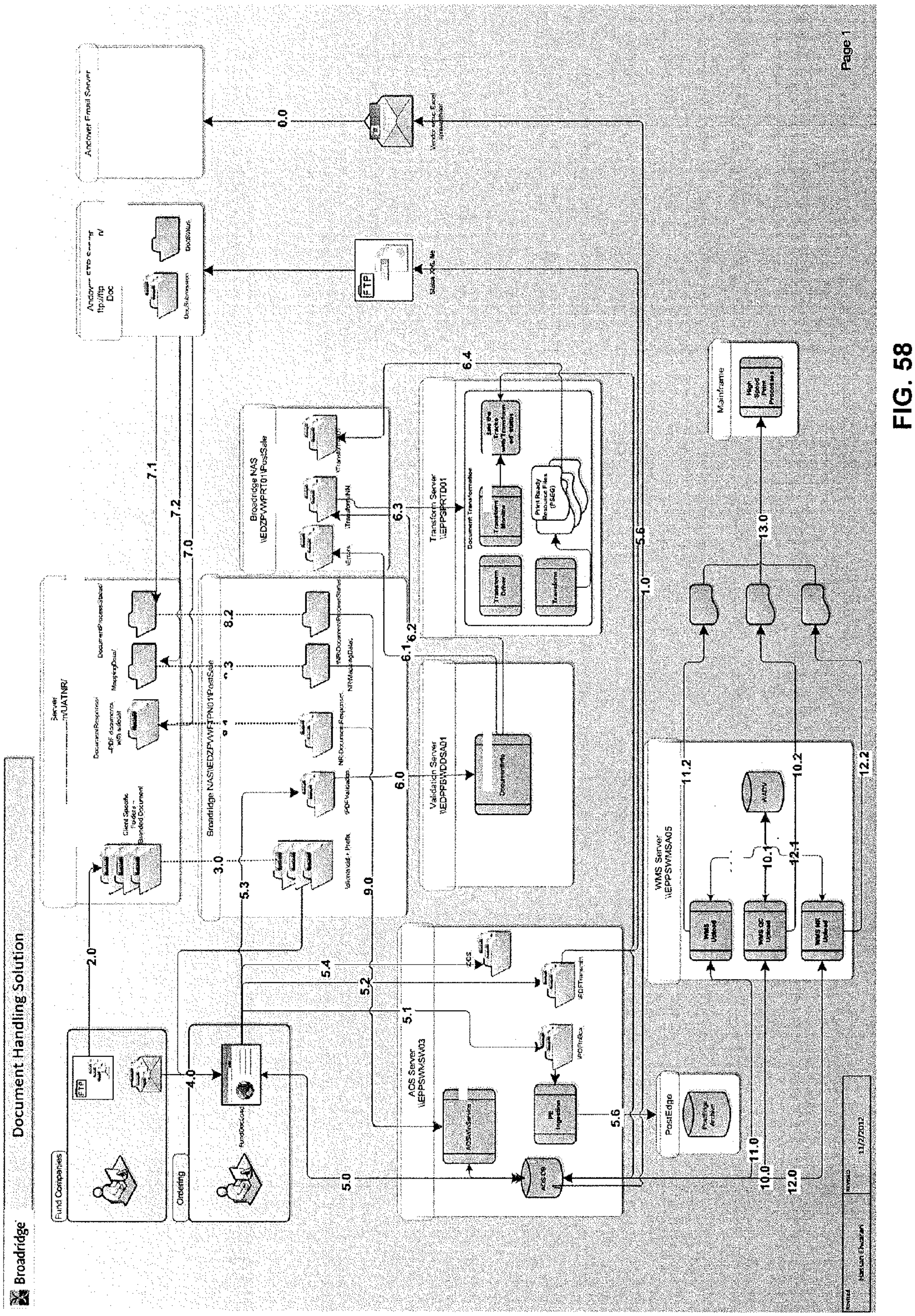

Steps of an Exemplary DHS Diagram 1 in Accordance to Some Embodiments of the Instant Invention (FIG. 58)

1.0 All the vendors that go through the Document Handling Solution. In some embodiments, any change the status whether it is a newly entered Vendor or an Updated Vendor a process gets triggered to FTP all those changes to Document processing repository(ies).

2.0 Branded documents get FTPd or Emailed to us by the users/client (e.g., Mutual Funds, Issuers, etc).

3.0 An automated Process can move FTP'd document from the FTP to the Client folder on the NAS.

4.0 The User uses the Document Handling System (DHS) to load either the Document from the NAS or the emailed and submit it.

5.0 The document Information get stored on the AOS Database with status 'NEW'.

5.1 The document get copied to the PDFInbox folder on the AOS WebServer which can be moved to the Electronic Document Delivery and Archival system archive.

5.2 The document get copied to a the staging Transmit folder on the AOS WebServer which can be FTPd the Document processing repository(ies).

5.3 The document get copied to a the Validation folder on NAS to be picked up and moved by DocumentInfo functionality.

5.4 The document get copied to the DDS folder on the AOS WebServer.

5.5 The document get moved and FTP'd to Document processing repository(ies) from the staging Transmit Folder on the AOS WebServer.

5.1 A scheduled window task that run on-demand/real-time or on a pre-set periodic basis which triggers a .NET console App that ingests the PDFs and XML files that were deposited in the INBOX folder and back them up. For example, the predetermined periodic basis can be Monday through Friday. In some embodiments, the scheduled Task also triggers a process that load all the PDFs and XML files to the Electronic Document Delivery and Archival system archive.

6.0 The document get moved from the Validation Folder to the TransformInn to be transformed by the DocumentInfo process and updates the AOS DB with Document Attributes such as page count, page size, etc.

6.1 The document get copied to the Error folder if it errors off.

6.2 The document get moved to the TransformIn Folder to be Transformed by the Transform Monitor process.

6.3 Transform process polls PDF(S) on NAS, transforms them using, for example but not limited to, PDF2AFP.

6.4 Transform process move transferred Document (Print Ready Resource files) to the TransformOUT folder for the Mainframe to use.

7.0 Document processing repository(ies) can FTP back the Branded documents that we sent to them as well as the Edgar document that Document processing repository(ies) generated by mining the SEC filing service called EDGAR. In some embodiments, document processing repository(ies) can also e-mail a Sidecar XML file for each document containing Document Attributes. In some embodiments, those files can be deposited on the NAS in the DocumentResponse folder.

7.1 Document processing repository(ies) can FTP throughout the day the status info on the outcome of the Edgar check. This information can be needed to update the Document Tracker with the Process Status. The files can be deposited in the DocumentProcessStatus folder on the FTP site.

7.2 Document processing repository(ies) can also FTP on-demand/real-time or on a pre-set periodic basis an IntraDay mapping file and 1 filingDate mapping file on-demand/real-time or on a pre-set periodic basis as well as a Mapping file on-demand/real-time or on a pre-set periodic basis. In some embodiments, this information can be needed to update the Document Tracker. In some embodiments, all the mapping files get deposited in the MappingData folder on the FTP site.

8.0 A process that gets triggered by Autosys to move files FTPd from Document processing repository(ies) to a DocumentResponse folder on the NAS.

8.1 A process that gets triggered by Autosys to move files FTPd from Document processing repository(ies) to a DocumentProcessStatus folder on the NAS.

8.2 A process that gets triggered by Autosys to move files FTPd from Document processing repository(ies) to a MappingData folder on the NAS.

9.0 A Window Service running on the AOS Webserver processes those FTP'd files, updates the AOS Database, and move the files to the Archiving folders on the NAS accordingly.

10.0 On-demand/real-time or on a pre-set periodic basis, there is a QC upload process that gets triggered and sends Document attributes from the AOS Tracker and WMS (10.1) that have not been QCed and sends that to the Mainframe to print (13.0) a set of 1 each of newly submitted PDF's to be printed and reviewed by QC.

11.0 On-demand/real-time or on a pre-set periodic basis (e.g., prior to the Mapping file and Version control) this gets Triggered and uploaded document information from AOS process (11.1) and WMS (11.2) to Mainframe (13.0).

12.0 On-demand/real-time or on a pre-set periodic basis (e.g., after the Mapping file and Version control process has ran), this process gets triggered and uploads document information from AOS (12.1) and WMS (12.2) to Mainframe (13.0).

Steps of the Exemplary DHS Diagram 2 (FIGS. 4A-4G):

1.0 Vendor Maintenance.

1.1 Any changes to the vendor options are extracted to an Excel spreadsheet and transmitted to Document processing repository(ies) via FTP.

2.0 Users/Clients (e.g., Mutual Fund companies, Public Company Issuers) transmit their Branded PDF documents to Broadridge.

2.1 FTP transmissions of documents in bulk.

2.2 Email transmissions of smaller volume documents.

3.0 Autosys process that moves the clients' documents from the FTP site to client specific folders on the NAS.

4.0 Ordering uploads the documents using Document Load function in AOS.

4.1 AOS accesses the client specific folders on the NAS to allow Ordering to load each document.

4.2 Ordering load each document received via email.

5.0 Document load process.

5.1 Document metadata gets created in the AOS database with a status of N (new).

5.2 The documents are copied to the PDFInbox folder.

5.2.1 The Electronic Document Delivery and Archival system Ingestion process processes the documents in the PDFInbox folder.

5.3 The documents are copied to the PDFTransmit folder.

5.3.1 The documents and status XML files are transmitted to the Document processing repository(ies) FTP site by the AOSWinService.

5.4 The documents are copied to the PDFValidation folder.

5.5 The documents are copied to the DDS folder (e.g., documents in the DDS folder are used for the cut sheet print process).

6.0 Electronic Document Delivery and Archival system Ingestion Process.

6.1 The process zips all the documents and associated XML files and moves the resulting zip file to the Data folder.

6.1 The process transmits the zip file to the Electronic Document Delivery and Archival system environment for archiving using Connect:Direct.

7.0 The documents are processed by the DocumentInfo process.

7.1 The DocumentInfo process currently extracts the page size and number of pages.

7.1.1 Documents that are not of a valid page size are moved to the Errors folder.

7.1.2 Documents that are processed successfully are moved to the TransformIN folder.

8.0 Transformation process.

8.1 The Transform process transforms the documents in the TransformIN folder.

8.1.1 The Transform process outputs the PSEGS to the TransformOUT folder.

8.1.2 The TransformMonitor process monitors the TransformOUT folder and updates to T in the AOS database.

9.0 VDWB process in Document processing repository (ies).

9.1 Document processing repository(ies) transmits document status XML files via FTP.

9.1.1 Autosys process that moves the status XML files to the NAS.

9.1.2 AOSWinService process.

1. Applies the status updates to the AOS database.

2. Moves the XML files to the archive folder.

9.2 Document processing repository(ies) transmits mapping files via FTP.

9.2.1 Autosys process that moves the mapping files to the NAS.

9.2.2 AOSWinService process.

9.2.2.1. Applies the mapping data to the AOS database.

9.2.2.2 Executes the Version Control process (fund mapping file only).

9.2.2.3. Moves the mapping files to the archive folder.

9.3 Document processing repository(ies) transmits documents and associated sidecar XML files via FTP.

9.3.1 Autosys process that moves the documents and associated sidecar XML files to the NAS.

9.3.2 AOSWinService process.

9.3.2.1 Create document metadata record in the AOS database.

9.3.2.2 Moves the documents and XML files to the archive folder (e.g., documents, including Branded documents that were previously sent to Document processing repository(ies).)

10.0 WMS Upload processes.

10.1 WMS Upload process extracts data from the AOS and WMS databases for all active documents.

10.1.1 WMS Upload process creates data file.

10.2 WMS QC Upload process extracts data from the AOS and WMS databases for documents that have not been QC'd.

10.2.1 WMS QC Upload process creates data file.

10.3 WMS NR Upload process extracts data from the AOS and WMS databases for all active documents.

10.3.1 WMS Upload process creates data file.

11.0 Upload files are transmitted to the mainframe to drive the various document print processes.

Exemplary Document Processing Repository(Ies)/DHS Feeds

In some embodiments, the inventive computer methods and the computer systems/machines of the instant invention feed(s) from Document processing repository(ies) (NR/NewRiver/Andover) that can be: PDFs (Branded and Document processing repository(ies)'s generated PDFs from EDGAR filings), status reports for the submitted branded documents, and the mapping files for the documents that have been processed.

In some embodiments, there are 3 Document processing repository(ies) feeds that AOS/DHS can be designated as, but is not limited to:

1—DocumentResponse (Response Feed)

2—DocumentProcessStatus (Status Feed)

3—MappingData (Mapping Feed)

Document Response.

In some embodiments, the DocumentResponse feed can include information in response to Branded Documents that AOS had originally processed through the Document Handling system and forwarded on to Document processing repository(ies) for Link&Layering, EdgarCheck, Out of Stock, etc. In some embodiments, the DocumentResponse feed from Document processing repository(ies) can serve as an acknowledgement mechanism that identifies to AOS that Document processing repository(ies) actually received & processed the documents that AOS transmitted.

In some embodiments, the DocumentResponse feed can also contain Branded (documents that we sent)/Edgar sourced PDF documents and Meta data about these documents. The Document Handling logic can be processing these files throughout the day, ingesting them, archiving them, logging them in our database & forwarding them to the next logical step in our process. In some embodiments, when AOS first processes Edgar sourced does from Document processing repository(ies), AOS might not have enough information to identify which fund they are for or what security they describe so they are logged into AOS a "NEWR" document with no associated mapping info. In some embodiments, a MappingData feed can be received throughout the day to assist in this identification In some embodiments, branded PDFs uploaded to Document processing repository(ies) are uploaded back to AOS FTP site along with a sidecar XML file. This sidecar XML file contains the Document processing repository(ies) generated unique id for the document. PDFs and sidecar XML files are delivered and then a corresponding .done file is uploaded to indicate upload is complete.

In some embodiments, delivery location for the Document Response Feed files can be in the DocumentResponse folder. In some embodiments, AOS's process moves them to the NAS.

Delivery Protocol

In some embodiments, PDFs are uploaded to our FTP site. For each PDF delivered, there is a corresponding sidecar XML file and a .done file. These files are delivered throughout the day and night and processed at a determined interval repeatedly by a process that gets triggered by a window service on a periodic basis (e.g., every 30 minutes, every hour, daily, etc.).

File Naming Format

In some embodiments, PDF file—DOCID.pdf (DOCID is the Document processing repository(ies)'s generated DOCID).

Sidecar XML file—DOCID.pdf.xml (this file contains the Meta data for the PDF file).

.done file —DOCID.pdf.done (this is the trigger file to indicate PDF file and sidecar XML file have been uploaded).

Document Status Process.

In some embodiments, Delivery location for the Document Status Report can be a DocumentProcessStatus folder and be then transmitted to the NAS.

In some embodiments, the Document status report provides statuses for all the processes that a document goes thru at Document processing repository(ies). In some embodiments, whenever a process status for a branded document is changed, the status update is FTP'd to AOS in the status report.

In some embodiments, a process, once the files are received, gets triggered that moves those files from the FTP Site to the NAS. In some embodiments, a service (e.g., the DocumentProcessStatus feed) can run periodically, for example, every 30 minutes. In some embodiments, this feed can be processed and updates the Document Tracker with the Process Status.

In some embodiments, an email can be generated and an excel file of the StatusFeed get generated and attached to the email and get sent th Edgar Check Alert email box (Ordering Group). In some embodiments, a status report with the status for multiple documents (i.e. there can be multiple <document> elements), as shown in FIG. 59.

Delivery Protocol

In some embodiments, a status report is uploaded to our FTP site. In some embodiments, a ".done" file is also uploaded to indicate the status report has been uploaded successfully if there is no corresponding ".done" file.

Exemplary File naming format can be:

1) DocumentStatusReport_datetime.xml (datetime—YYYYMMDDHHmmSS); and

2) DocumentStatusReport_datetime.xml.done.

Document processing repository(ies)'s exemplary Failure/Process status conditions are shown in Table 1.4.

TABLE 1.4

| Process Name | Process Status Description |
|---|---|
| IngestCheck | Processing has not started yet |
| IngestCheck | Processing has started, but not completed |
| IngestCheck | Pre-processing completed successfully |
| IngestCheck | File format not supported |
| IngestCheck | File could not be opened in native viewer |
| IngestCheck | Digital signature from metadata did not match signature calculated on file |
| IngestCheck | Metadata given with document was corrupt |
| DocAssociation | Processing has not started yet |
| DocAssociation | Processing has started, but not completed |
| DocAssociation | Associate CUSIP and Supplements completed successfully |
| DocAssociation | Unrecognized document type |
| DocAssociation | Document type recognized, but submitter not authorized for that document type |
| DocAssociation | Matching, unexpired, Edgar document found, but at least one supplement from submitted doc does not match the primary document in the submitted doc |
| DocAssociation | File could not be opened in native viewer |
| DocAssociation | There was not one and only one base document contained in the submitted document (e.g. more than one prospectus or zero prospectuses) |
| EdgarCheck | Processing has not started yet |
| EdgarCheck | Processing has started, but not completed |
| EdgarCheck | Passed EdgarCheck |
| EdgarCheck | Passed EdgarCheck through an override |
| EdgarCheck | File format not supported |
| EdgarCheck | File could not be opened in native viewer |
| EdgarCheck | Digital signature from metadata did not match signature calculated on file |
| EdgarCheck | Metadata given with document was corrupt |
| EdgarCheck | Unrecognized document type |
| EdgarCheck | Document type recognized, but submitter not authorized for that document type |
| EdgarCheck | Matching, unexpired, Edgar document found, but at least one supplement from submitted doc does not match the primary document in the submitted doc |
| EdgarCheck | File could not be opened in native viewer |
| EdgarCheck | There was not one and only one base document contained in the submitted document (e.g. more than one prospectus or zero prospectuses) |
| EdgarCheck | No corresponding Edgar document could be found based on matching CUSIPs |
| EdgarCheck | A matching Edgar document was found that has newer effective/revision dates |
| EdgarCheck | Matching Edgar document with matching dates was found, but Edgar document is expired |
| EdgarCheck | Matching Edgar document was found, but the effective/revision dates for each CUSIP associated to the document did not match |
| EdgarCheck | Matching, unexpired, Edgar document found, but submitted doc has fewer supplements than Edgar doc |
| EdgarCheck | Matching, unexpired, Edgar document found, but submitted doc has more supplements than Edgar doc |
| EdgarCheck | Matching, unexpired, Edgar document found, but at least one supplement from submitted doc does not match the primary document in the submitted doc |
| EdgarCheck | Matching, unexpired, Edgar document found, but at least one supplement from submitted doc has a different date than Edgar |
| PrinterQC | Processing has not started yet |
| PrinterQC | Processing has started, but not completed |
| PrinterQC | Passed Print facility 1 printer QC |
| PrinterQC | Failed Print facility 1 printer QC |
| DocTrackerStatusUpdate | Print facility 1 has not indicated document should be discontinued |
| DocTrackerStatusUpdate | Print facility 1 document has been reactivated |
| DocTrackerStatusUpdate | Print facility 1 discontinued use of document |
| FilingDateCheck | Print facility 1 Edgar Filing Date Check Passed |
| FilingDateCheck | Print facility 1 Edgar Filing Date Check Failed |
| DocExpiration | Print facility 1 has not expired the doc |
| DocExpiration | Print facility 1 has expired the doc |

Mapping Data Process.

In some embodiments, delivery time for the mapping file can be throughout the day or at night. In some embodiments, delivery location for the mapping file(s) can be in a Mapping-Data folder from which they can be moved to the NAS. In some embodiments, there are 3 types of Mapping files that are received from Document processing repository(ies):

1) FundMapping_YYYYMMDDHHmmSS.txt (also known as the fund mapping file) (In some embodiments, this file is used by the Version Control Process);

2) IntradayFundMapping_YYYYMMDDHHmmSS.txt which runs on real-time or a periodic basis (e.g., several times a day, etc.) (it is used to update AOS Document tracker fields: DocId, Prefix, ExpirationDate, EffectiveDate, AmmendedDate, FilingDate, SupplementDate, LatestSupplementDate, DeadDate, FundFamily, LatestSupplementFilingDate, LatestSupplementDate; and to populate the AOS_Crossreference and AOS_DocumentAssociation); and 3) FilingDate_FundMapping_YYYYMMDDHHmmSS.txt (this file runs real-time or on a periodic basis (e.g., once a day, etc.), and is used to update AOS Document tracker fields: DocId, Prefix, ExpirationDate, EffectiveDate, AmmendedDate, FilingDate, SupplementDate, LatestSupplementDate, DeadDate, FundFamily, LatestSupplementFilingDate, LatestSupplementDate) and to populate the AOS_Crossreference and AOS_DocumentAssociation).

In some embodiments, the function of the Intraday Mapping Feed process and Filing Date Mapping Feed process can be as follows:

1) AOS Cross Reference (this interim mapping feed process can also populate the new cross-reference as follows:

a. If CUSIP/PDF_ID/Document Type combination does not exists, insert a record into the AOS mapping table.

Document Association

Since the Mapping Feed can be returning the attributes of a single document at any given time (e.g., the document is either a new Branded or old Branded document, or the document is either a new Edgar or old Edgar document), the Version Control process identifies documents that are linked together with the document being returned based on the AOS_Crossreference and AOS_DocumentAssociation tables/fields. For example, the AOS_DocAssociation uses a Master Doc ID/DocId as the link. For example, new AOS_CrossReference and DocumentAssociation tables can be maintained during the mapping feed processing. For example, the new cross-reference can contain the following columns:

Master Doc ID
Doc ID
Doc Type
Doc Source
Effective Date
Revision Date
Latest Supplement Date
Filing Date
Latest Supplement Filing Date, and
Status.

In some embodiments, the process for populating this new cross-reference can be as follows:

If Doc ID/Doc Type combination does not exist in the new Document Association table, then:

Use CUSIP to reference the AOS cross-reference table for existing documents;

If documents are found in the AOS cross-reference table, then:

1) Use existing Doc ID(s) to query the new Document Association table;

1.a) If document is found in the new Document Association table, then:

Insert a record for the new document using the existing Master Doc ID into new Document Association table;

1.b) If document is not found in the new Document Association table, then:

1.b.1. Generate new Master Doc ID, and 1.b.2. Insert a record for each document using the Master Doc ID into new Document Association table;

If documents are not found in the AOS cross-reference table, then:

1.a.1. Generate new Master Doc ID, and 1.a.2. Insert a record for new document using the Master Doc ID into new Document Association table.

In some embodiments, a process based on a file FilingDate-FundMapping_YYYYMMDDHHmmSS.txt runs once a day prior to the mapping file, and is used to update AOS Document tracker fields: DocId, Prefix, ExpirationDate, EffectiveDate, AmmendedDate, FilingDate, SupplementDate, LatestSupplementDate, DeadDate, FundFamily, LatestSupplementFilingDate, LatestSupplementDate.

In some embodiments, the functions of the Mapping Feed process can utilize AOS Cross Reference functionality (since AOS can be maintaining multiple document types related to a CUSIP, create a satellite cross-reference table in additional to one present in WMS; this new cross-reference table can be maintained during the mapping feed processing and can contain at least the following columns: CUSIP, Ticker Symbol, Receipt ID, and Document Type).

In some embodiments, the process for populating this new cross-reference can be as follows:

If CUSIP/PDF_ID/Document Type combination does not exists, insert a record into the AOS cross-reference table;

Document Association (since the Mapping Feed can return the attributes of a single document at any given time (e.g., the document is either a new Branded or old Branded document, or the document is either a new Edgar or old Edgar document);

the Version Control process identifies documents that are linked together with the document being returned in order for the Version Control process to Activate/Inactivate/Pend the right documents, and that where the AOS_Crossreference and AOS DocumentAssociation come to play:

1) the AOS_DocAssociation uses a Master Doc ID/DocId as the link;

2) the AOS_CrossReference and DocumentAssociation tables can be maintained during the mapping feed processing, and the AOS_CrossReference table can contain at least the following columns: Master Doc ID, Doe ID, Doc Type, Doc Source, Effective Date, Revision Date, Latest Supplement Date, Filing Date, Latest Supplement Filing Date, and Status.

In some embodiments, the process for populating this new cross-reference can be as follows:

If Doc ID/Doc Type combination does not exist in the new Document Association table, then:

use CUSIP to reference the AOS cross-reference table for existing documents;

If documents are found in the AOS cross-reference table, then:

use existing Doc ID(s) to query the new Document Association table;

If document is found in the new Document Association table, then:

Insert a record for the new document using the existing Master Doc ID into new Document Association table;

If document is not found in the new Document Association table, then:

Generate new Master Doc ID, and

Insert a record for each document using the Master Doc ID into new Document Association table.

If documents are not found in the AOS cross-reference table, then:

Generate new Master Doc ID, and

Insert a record for new document using the Master Doc ID into new Document Association table.

In some embodiments, the file format is Pipe (|) delimited. In some embodiments, sidecar xml and .done files come with the mapping file. In some embodiments, the .done file indicate the file upload is completed.

Delivery Protocol

In some embodiments, a mapping file is uploaded to AOS's FTP site. In some embodiments, the Mapping file is delivered along with a sidecar xml file and a.done file. In some embodiments, the invention utilizes that following file naming format:

MappingFile: FundMapping_datetime.txt;

Sidecar XML File: FundMapping_datetime.txt.xml (Meta data for the mapping file);

.done file: FundMapping_datetime.txt.done (a trigger file to indicate that the mapping file(s) and the sidecar XML file(s) have been uploaded successfully).

Table 1.5 shows exemplary fields that a tracking table can have.

TABLE 1.5

| Field | Description |
|---|---|
| CUSIP | The CUSIP identifying the share class of the fund |
| Doc ID | NRDL document ID for the PDF of this document |
| Is Current | Value can be 1 if the document is the currently effective document available in Edgar or 0 if there is a newer document available or this document is expired |
| Submitter Doc ID | AOS receipt ID |
| Page Count | Number of pages in the PDF |
| Fund Product Type | This is a 4-character code identifying the product type of the fund (e.g. OEMF is open-ended mutual fund, ETF is exchange traded fund, UI is UIT, etc.) |
| Doc Type | Possible doc type codes are as follows:<br>Code — Description<br>spro — Summary prospectus<br>sprs — Summary prospectus supplement<br>pros — Statutory prospectus<br>prps — Statutory prospectus supplement<br>misc — Any non-CUSIP based document (e.g. letters)<br>Note that spro and pros documents can also have supplements combined into them, so when delivering them, the sprs and prps do not also need to be delivered. The 288 file should only have a pros/spro or prps/sprs for a given CUSIP for a given investor, never both pros/spro and prps/sprs. |
| Fund Name | The name of the fund (includes the share class name) |
| Eff Date | The effective date of the document as given on the front cover |
| Rev Date | The revision date of the document as given on the front cover - the date can be identified on the cover with language like "revised as of" or "as supplemented on", etc. If no revision date is given on the cover, this field can be blank. |
| Filing Date | Date the filing was made with Edgar (get this through the Doc ID <—> RFID association - the assumption with a branded PDF is that it must pass EdgarCheck to be included in the mapping file, so there can be an RFID associated with it). |
| Exp Date | Expiration date of the document - calculated as 16 months + 1 day from the financial date if the financial date is available, otherwise 12 months from the effective date. Note: if a newer document in Edgar is available but there is not yet a PDF for it, the expiration date can be set to the later of the newly-filed documents filing date and effective/revision date. For branded docs, this is populated with any expiration date specified to us by the fund company (has not happened before). If no expiration date has been specified for the branded doc, then this is only populated if EdgarCheck has associated an Edgar document, and it can contain the calculated expiration date based on the data from the associated Edgar document. |
| Ticker | The ticker for the CUSIP |
| Fund State | Indicating whether the fund is active or dead. |
| New CUSIP | The new CUSIP this CUSIP has been mapped to - populated if the fund state is dead and there's a new CUSIP available |
| Dead Date | The date the CUSIP was liquidated, merged, etc. - populated if the fund state is dead and we were able to determine the date it was liquidated, merged, etc. |
| Last Supplement Date | The effective date of the last supplement filed against this document (null if there are no supplements or this document is a supplement) |
| Last Supplement Filing Date | The filing date of the last supplement filed against this document (null if there are no supplements or this document is a supplement) |

Version Control

In some embodiments, to utilize a Version Control of the material, the vendor of that document has to be set in the vendor maintenance screen.

Exemplary Switches For Version Control

In some embodiments, a Version Control flag in the Document Type table is used to indicate if that specific document type should be subjected to version control. In some embodiments, the version control can interrogate this flag determine what documents should be included. In some embodiments, the status of the document in AOS_DocumentTracking can be either Transformed, Active, Pending or Reload ('T','A','P', 'R').

In some embodiments, the Version Control results in specific common actions to take effect in AOS and WMS. In some embodiments, the following are the exemplary groupings of exemplary common actions that can take place during the Version Control process:

a. Update actions Group 1:
i. Do not reset DTS;
ii. Leave the old Branded/EDGAR Active;
iii. Leave the old inventories Active;
iv. Leave the old dates in WMS;
b. Update actions Group 2:
i. Do not reset DTS;
ii. Inactive the old Branded/EDGAR;
iii. Destroy the old inventories;
iv. Leave the old dates in WMS;
c. Update actions Group 3:
i. Reset DTS;
ii. Inactivate the old Branded/EDGAR;
iii. Activate the new Branded/EDGAR;
iv. Destroy the old inventories;
v. Update the dates in WMS;
d. Update actions Group 4:
i. Reset DTS;
ii. Inactive the old Branded/EDGAR;
iii. Destroy the old inventories;
iv. Leave the old dates in WMS;
e. Status XML to reactivate a document:
i. Capture the status—the following values can be captured:
1. ProcessName="FilingDateCheck"
2. ProcessStatus="Succeeded"
3. ProcessStatusId="30"
4. ProcessStatusCode="Filing Date Check Passed"
5. ProcessStatusDesc="Print facility 1 Edgar Filing Date Check Passed";
ii. Generate the XML status feed to be transmitted to Document processing repository(ies);
iii. Transmit the XML status file to Document processing repository(ies) via FTP.
1. Document processing repository(ies)'s FTP site;
2. Destination folder—DocStatus;
f. Status XML to take down a document:
i. Capture the status changes—the following values can be captured:
1. ProcessName="FilingDateCheck"
2. ProcessStatus="Failed"
3. ProcessStatusId="31"
4. ProcessStatusCode="Filing Date Check Failed"
5. ProcessStatusDesc="Print facility 1 Edgar Filing Date Check Failed";
ii. Generate the XML status feed to be transmitted to Document processing repository(ies);
iii. Transmit the XML status file to Document processing repository(ies) via FTP.
1. Document processing repository(ies)'s FTP siteDestination folder-DocStatus;
g. Determine EDGAR Check status:
i. The ProcStatusID field in the Document Tracker table can now store the EDGAR Check Status;
h. Get associated documents:
i. Query the new Document Association table using current Doc ID to get the Master Doc ID:
1. Use the Master Doc ID to retrieve all associated documents from the new Document Association table.

In some embodiments, the instant invention maintains version control of Branded Documents, EDGAR documents, trade confirmations, advertising materials and other documents that are to be send out so as to confirm that the correct version of each particular document is used for fulfillment.

Examples of Post-Sale Flow and Dependencies

Figure 60:
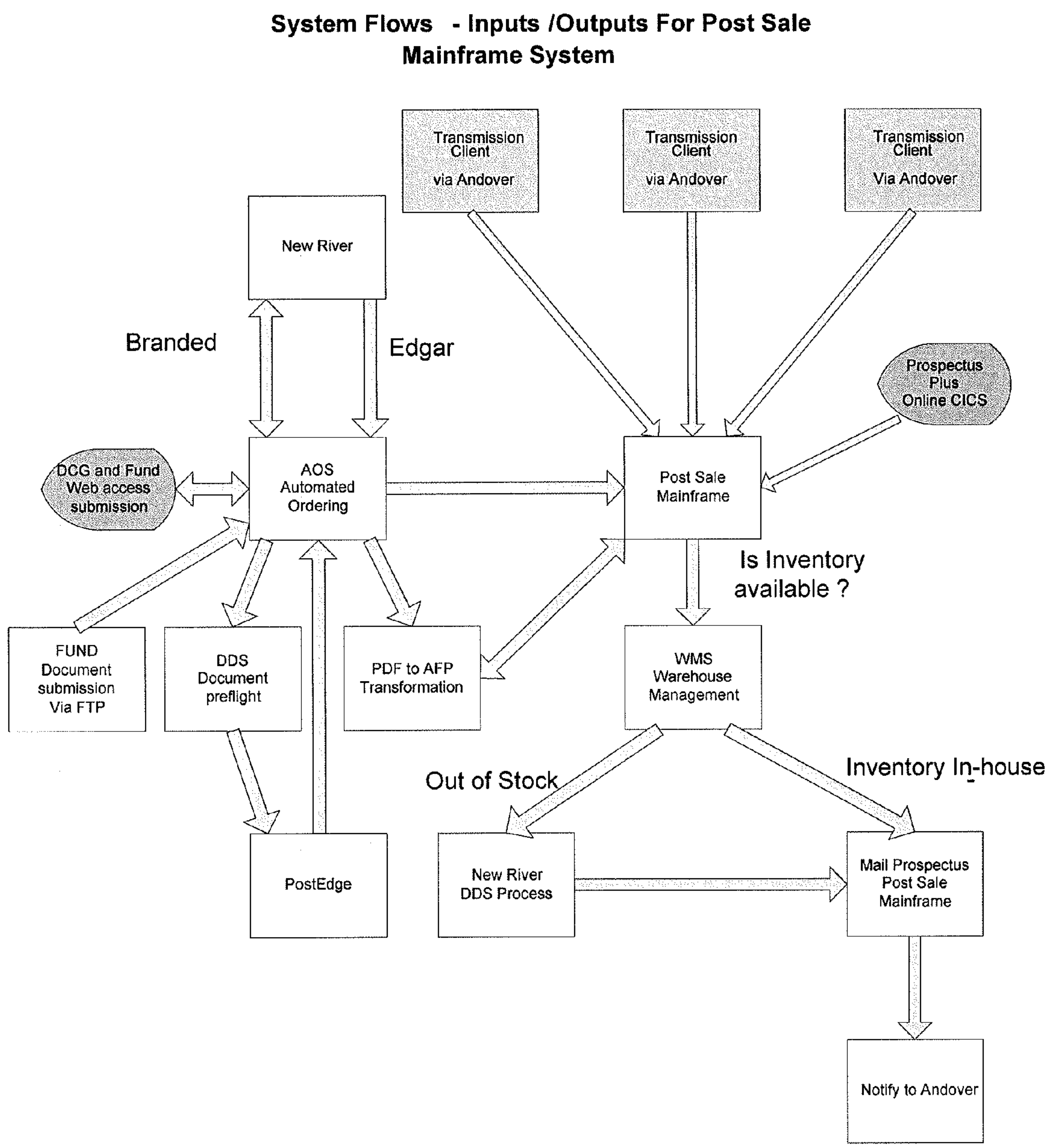

In some embodiments, the inventive computer methods and the computer systems/machines of the instant invention utilize an exemplary process flow shown in FIG. 60, by which the AOS application interacts with the mainframe as well as the WMS system.

Exemplary Primary Data Sources

In some embodiments, AOS's main database is the ADP_AOS_PDB database but it also interfaces with the WMS systems database WADV.

Exemplary Postsale AOS/DHS Environment

Figure 61:
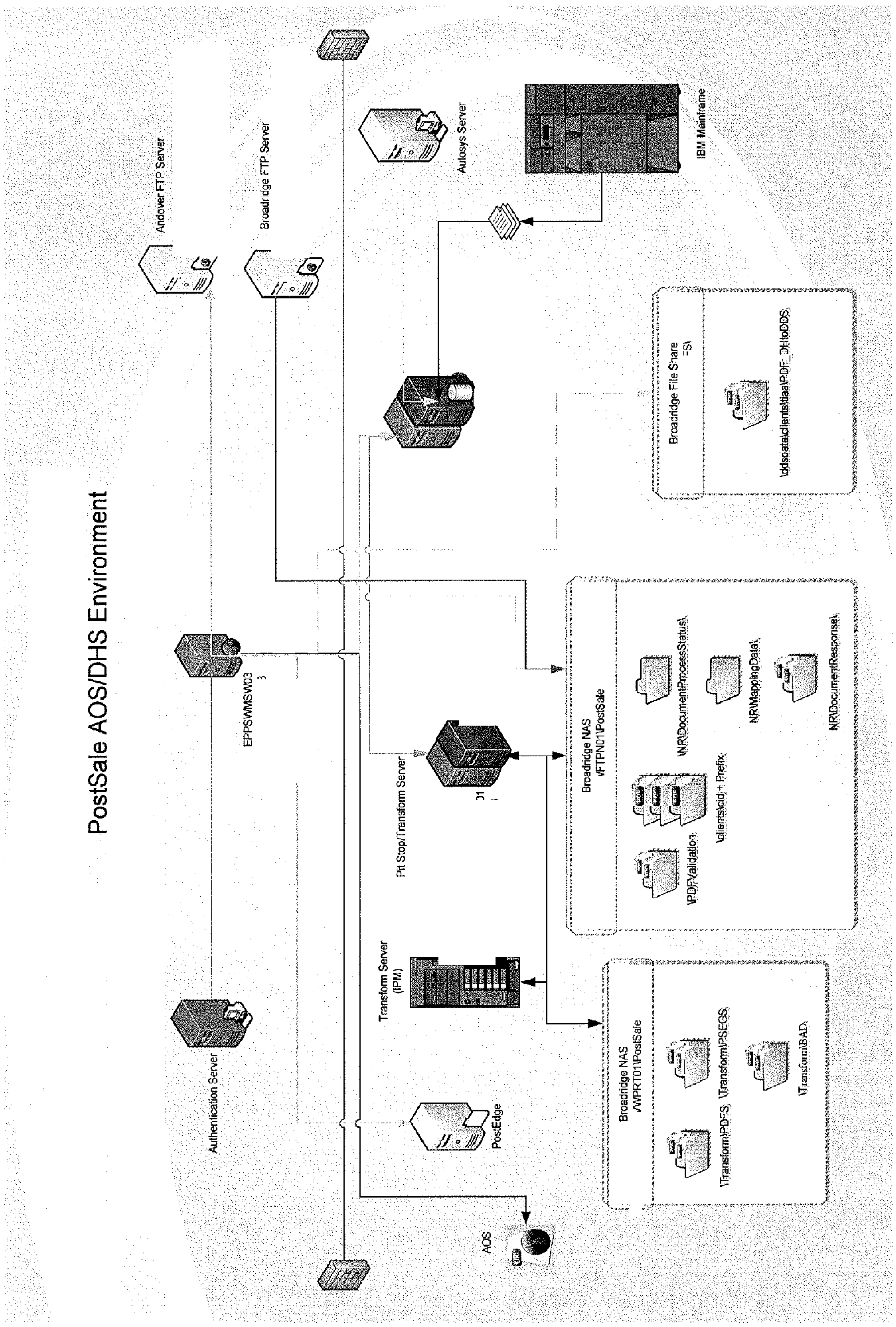
Figure 62A:
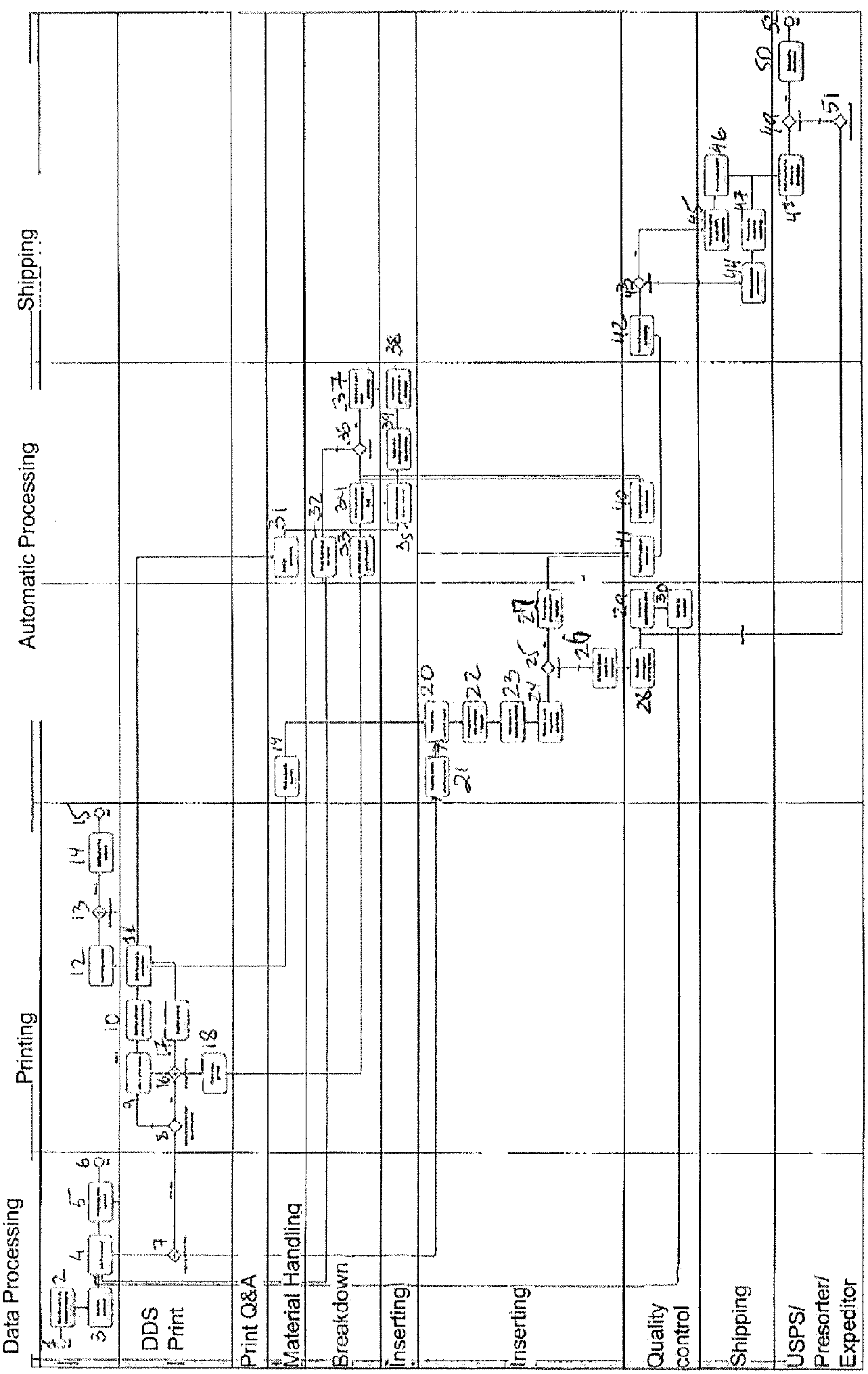
FIG. 62A is another flowchart representative of some embodiments of the present invention.
Figure 62B:
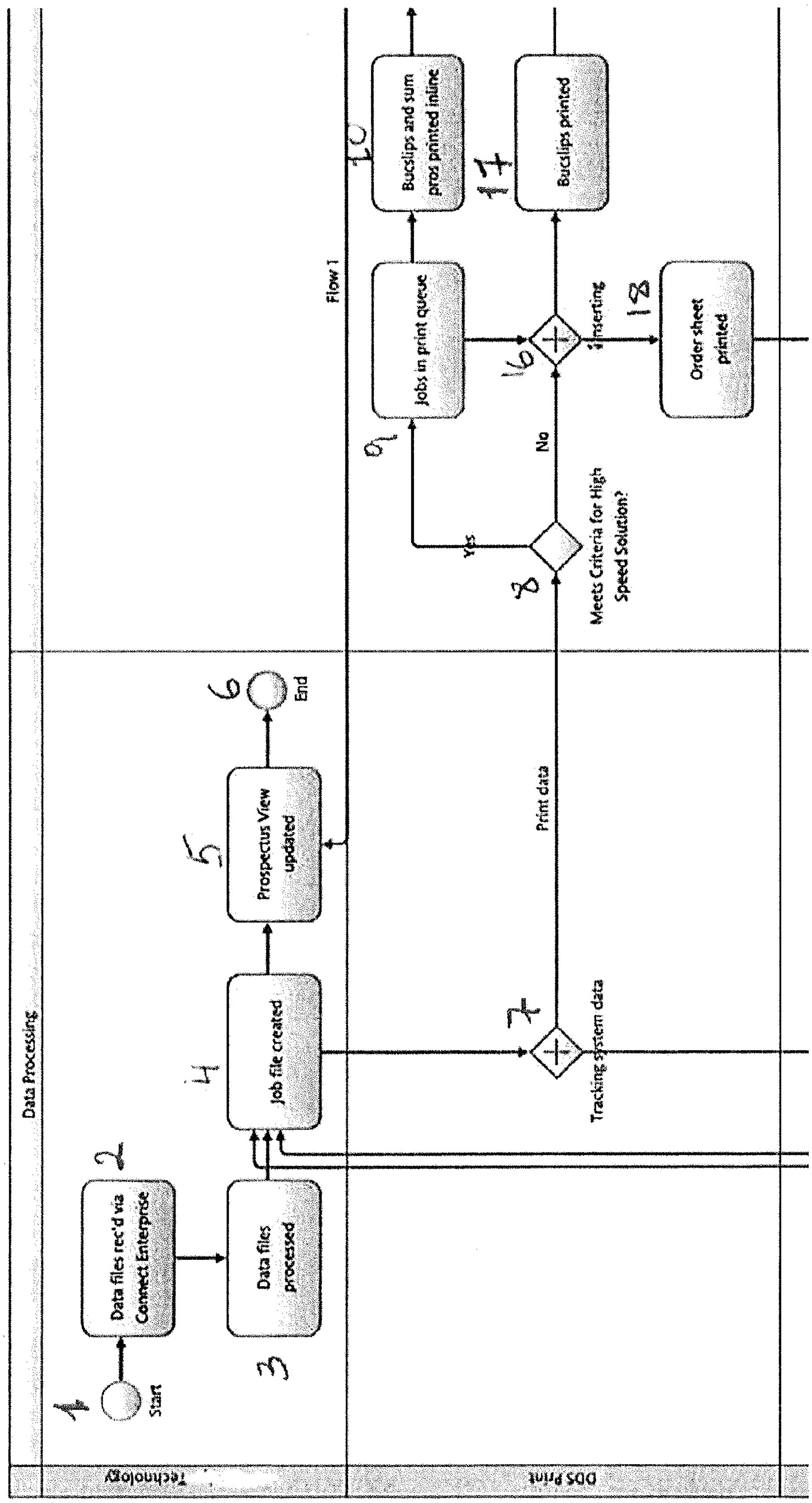
FIGS. 62B-62H are magnified portions of FIG. 62A.
Figure 62C:
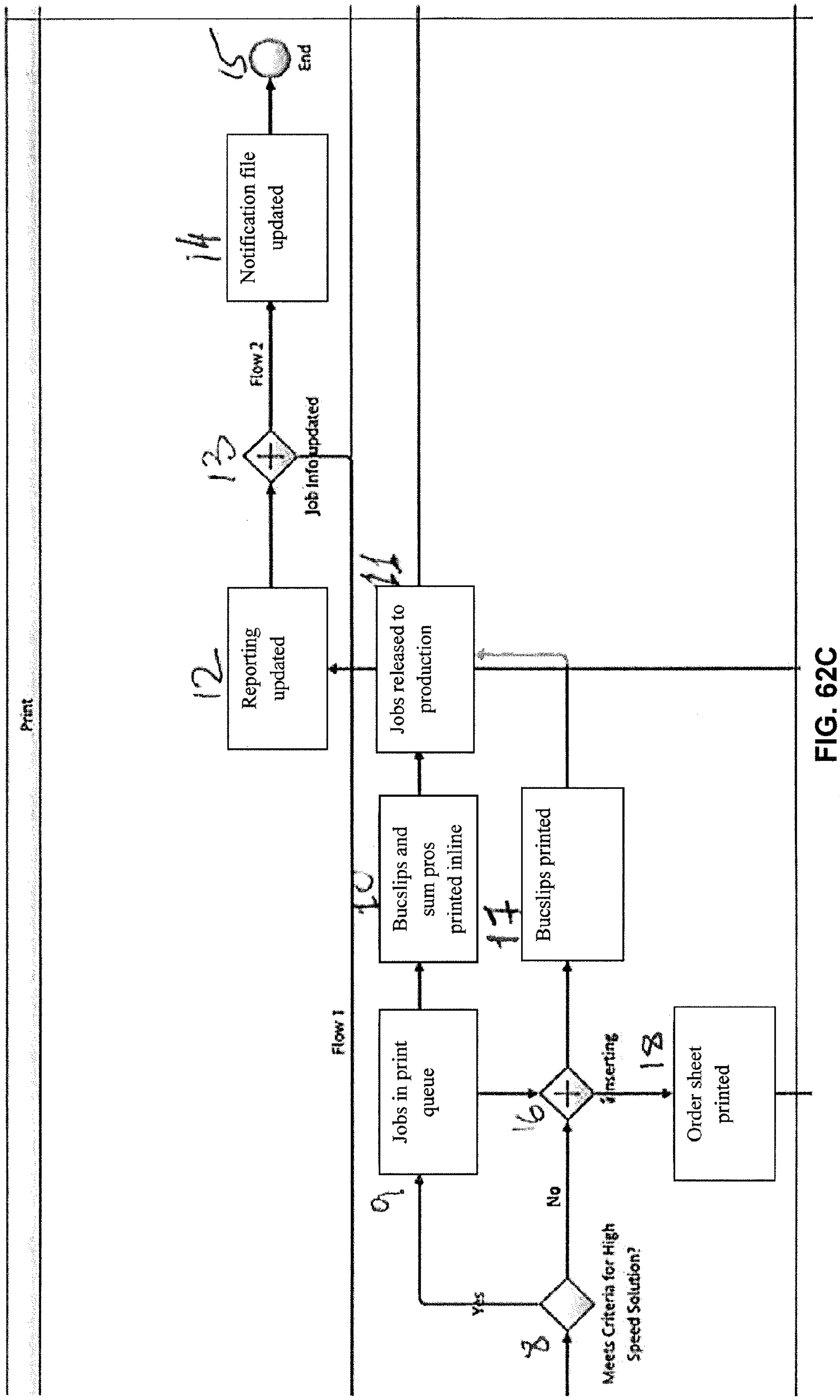
Figure 62D:
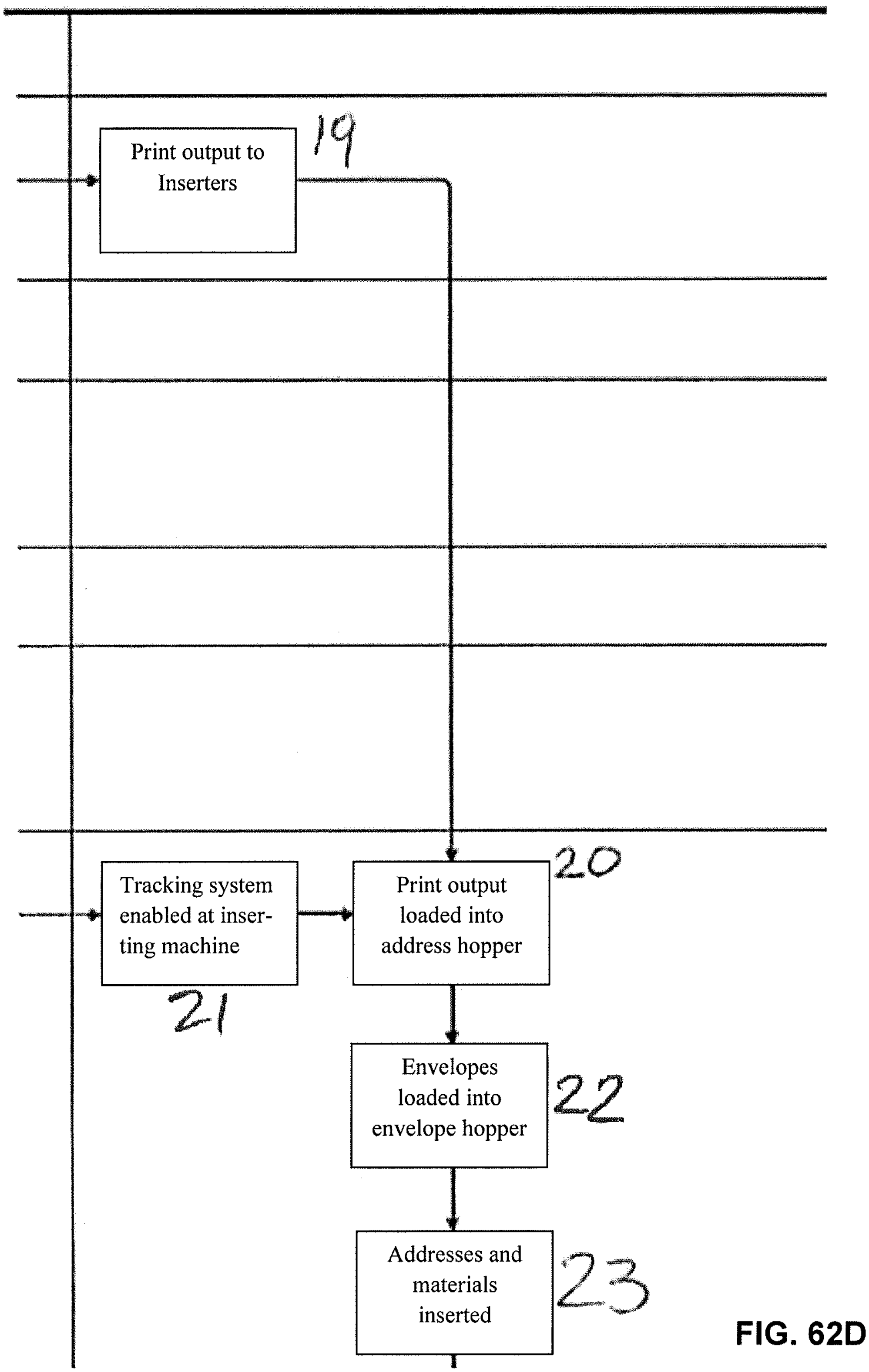
Figure 62E:
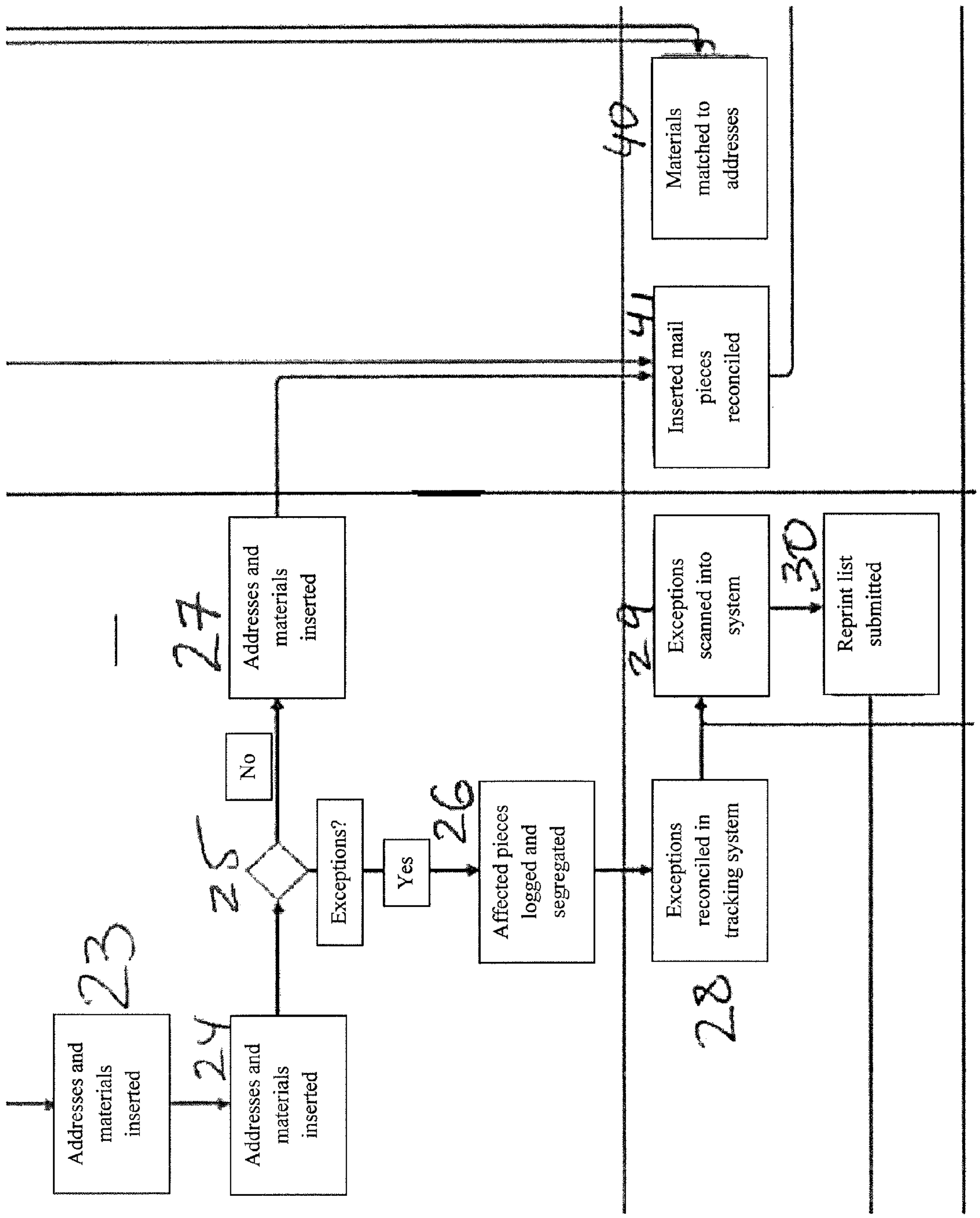
Figure 62F:
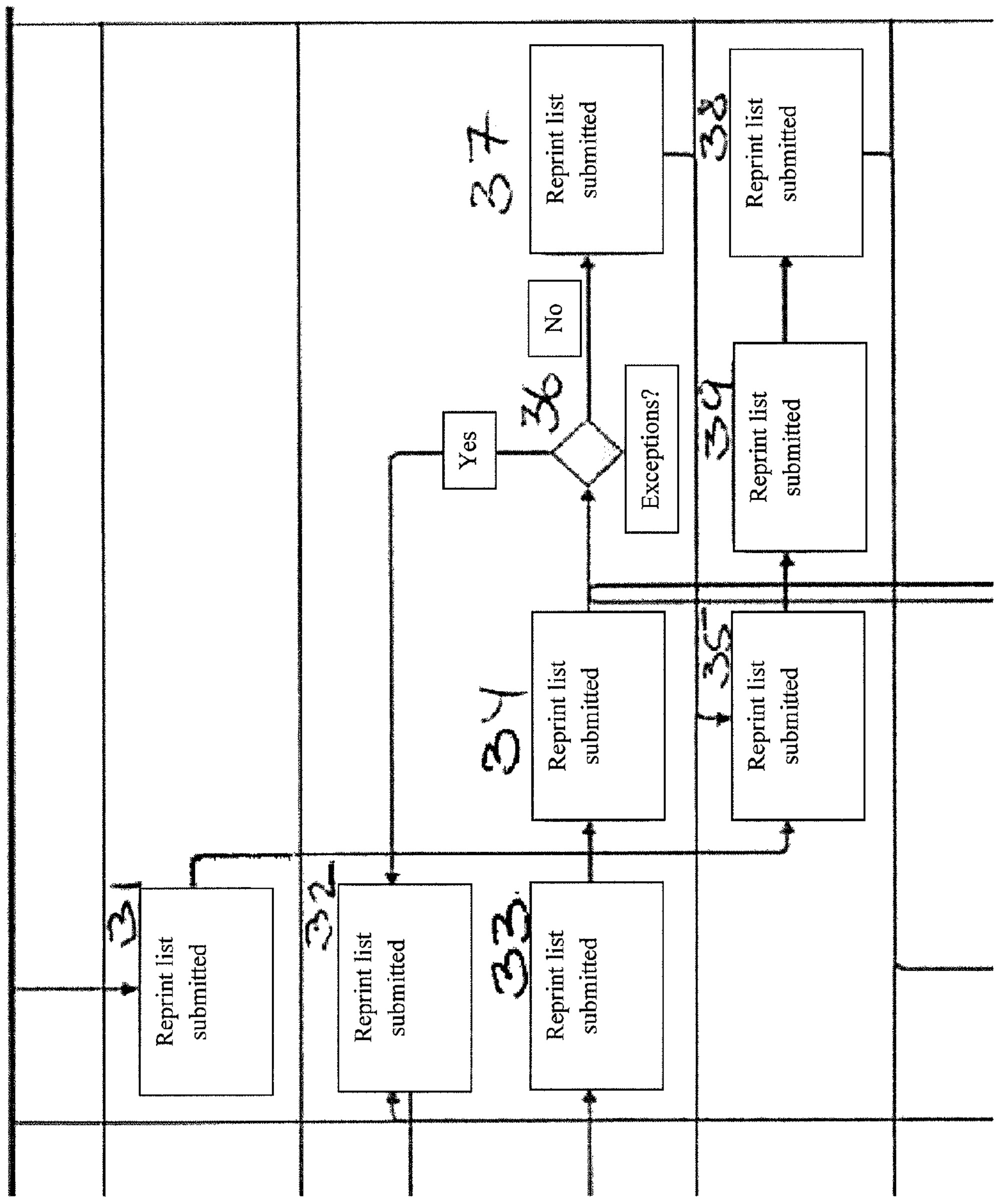
Figure 62G:
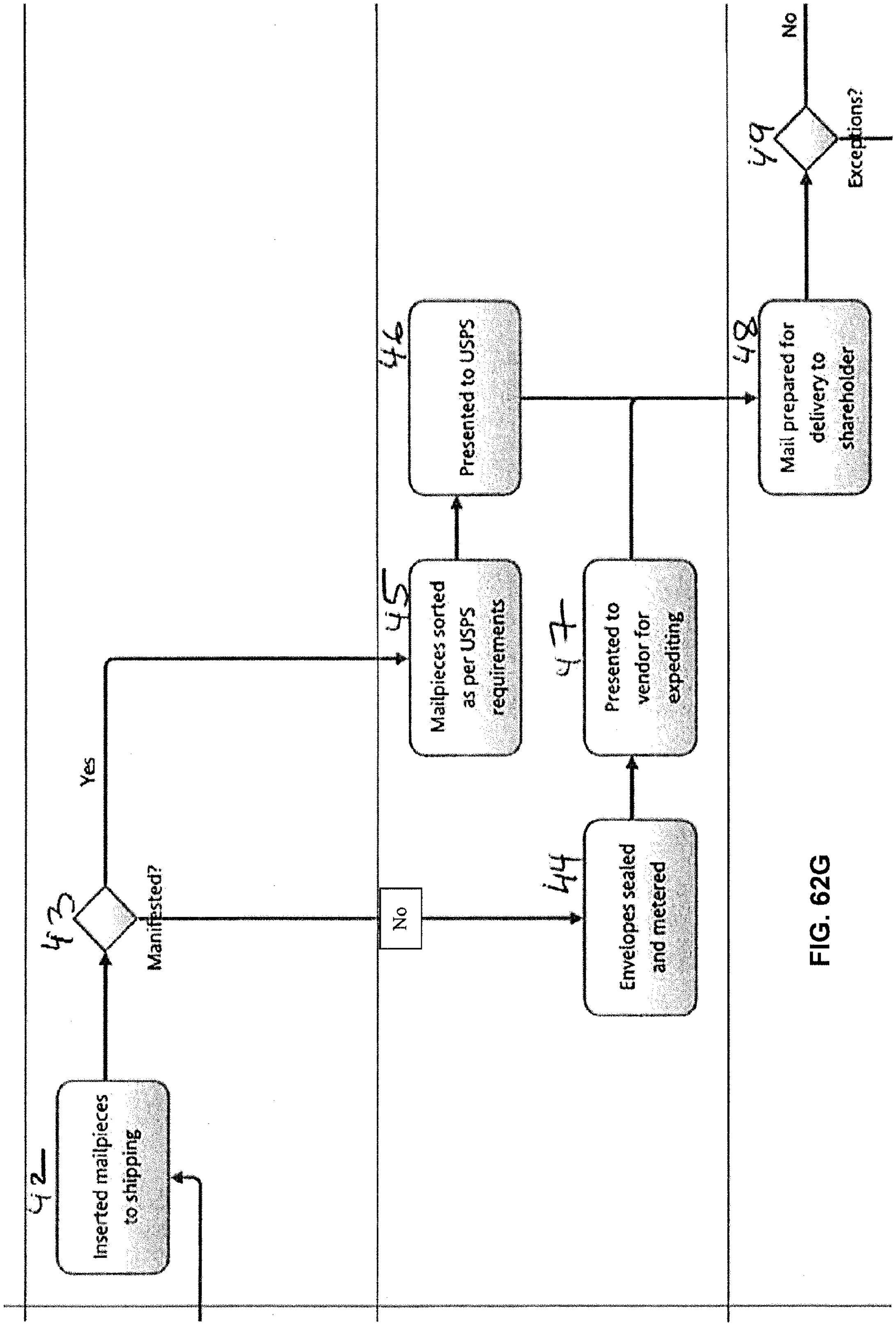
Figure 62H:
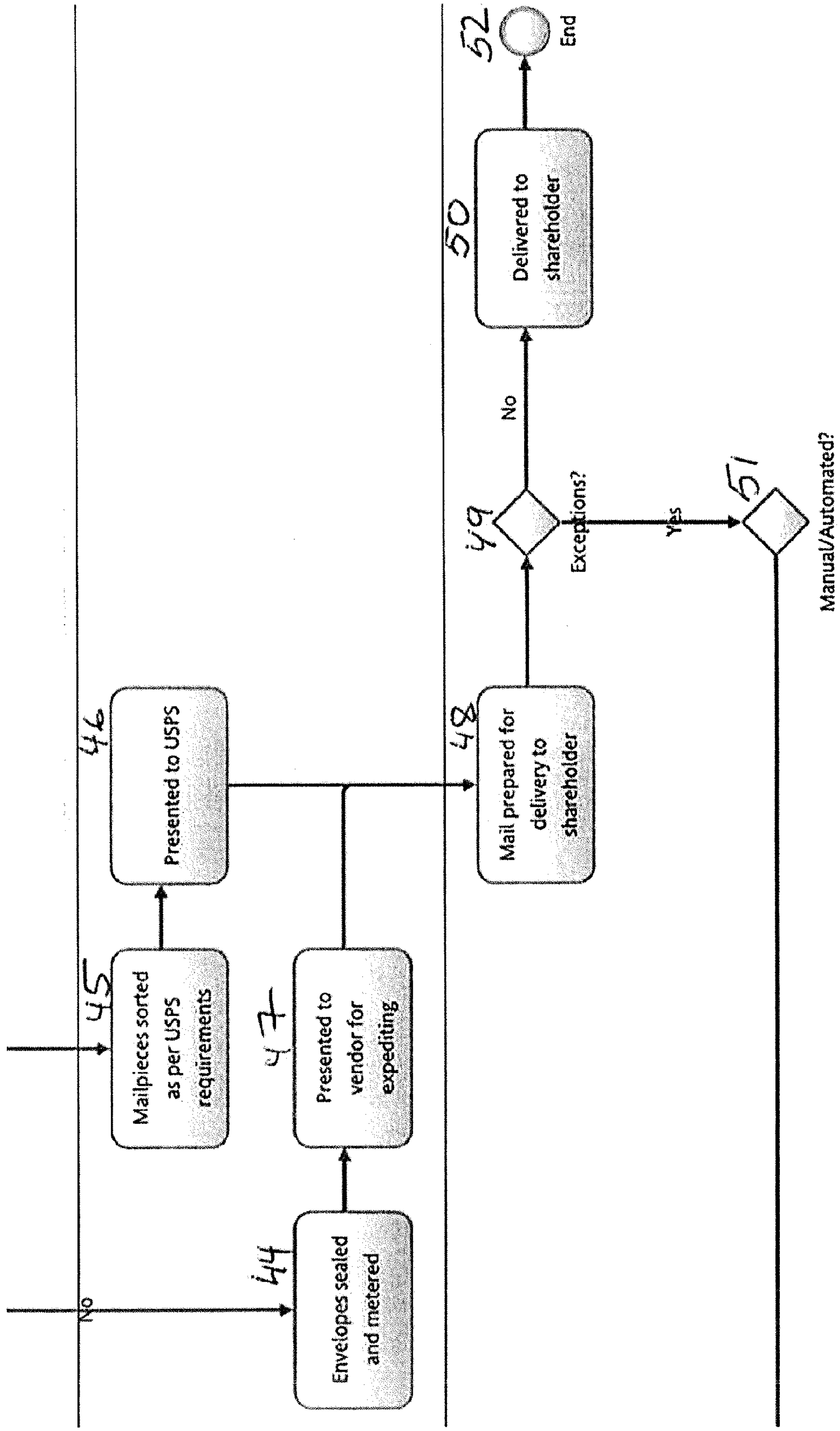

In some embodiments, the inventive computer methods and the computer systems/machines of the instant invention utilize an exemplary Post-Sale AOS/DHS environment shown in FIG. 61.

Exemplary Bar Code Instructions

In some embodiments, the inventive computer methods and the computer systems/machines of the instant invention utilize the following processes to encode 2D Bar Code or any other suitable scannable identifier(s) that direct(s) high throughput printing machines (e.g., by utilizing a camera module of a printer) how to on-demand and selectively print and assemble distinct documents into mailings. In some embodiments, 2D Bar Code(s) can be printed on a trade confirmation page that list all securities/financial instruments that an investor owns and/or has purchased. In some embodiments, the inventive computer systems and methods may utilize devices that can communicate printing and assembling instructions via IEEE 802.11b, a wireless networking standard, e.g., wireless chipsets, instead of 2D Bar Code(s). In some embodiments, the inventive computer system and methods may utilize devices with technologies such as NetSense, UPnP, iReady, Bluetooth as a communication medium.

In some embodiments, the inventive computer systems and methods may utilize devices that can communicate printing and assembling instructions via Near Field communications, or NFC, which is a set of short-range wireless technologies, typically requiring a distance of 10 cm or less. NFC operates at 13.56 MHz and at rates ranging from 106 kbit/s to 848 kbit/s. NFC typically involves an initiator and a target; the initiator, typically, actively generates a RF field that can power a passive target. In some embodiments, NFC can be an open platform technology standardized in, for instance, ECMA-340 and ISO/IEC 18092 standards.

In some embodiments, the printers are initiators and the encoded trade confirmations include encoded targets, such as tags or stickers that do not require batteries.

In some embodiments, the script (instructions) can take as input the weight and thickness information for paper, envelope, and insert(s). In some embodiments, the script (instructions) performs calculations to determine average weights and thicknesses based on a number of sheets. In some embodiments, the script (instructions) uses those calculations to build the "PATTR" records needed by MailStreamPlus process. In some embodiments, the script (instructions) also creates a WEIGHTS file that is used in calculating the total piece weights for StreamWeaver code as further detailed.

Below is an exemplary annotated computer script that creates the weight table needed for postal manifesting:

Below is an exemplary annotated computer script that creates the weight table needed for postal manifesting:

```
# Input:   Takes 5 arguments.
#          (1) The input paper and envelop info,
#          (2) The input insert info,
#          (3) The jobid; this can be prepended to the output file names
#          (4) The job path name
#          (5) Envelop type - value should be fold, flat, or both; this
#              controls which output files can be generated; default
#              is both
#          (6) Indicator for 3.2oz category - if this is set to Y, then
#              a special 3.2oz category can be included; this is used
#              for the Postsale project; default is N
## Output:  Produces 2 files.
#         OUTPRMFD: This is the weight table for FOLDS
#         OUTPRMFL: This is the weight table for FLATS
#         OUTTXTFD: This is the weight txt file for FOLDS
#         OUTTXTFL: This is the weight txt file for FLATS
For example:
```

```
$help = "<Paper_Env_Wt_File> <Insert_Wt_File> <JobId> <Working_Dir> <Env_Type>
<3.2_Oz_Indicator>";
# ARGV[0] - the input paper and env info file
# ARGV[2] - the input insert info file
# ARGV[2] - the job name
# ARGV[3] - the job path name
# ARGV[4] - the env type
# ARGV[5] - 3.2oz indicator
if ( $#ARGV + 1 < 4 )
{
  print "usage: $0 $help\n$!";
  exit 12;
}
# STEP 1 -                                    #
#   Read in the input file that contains the weights and        #
#   thickness for the paper and envelopes (fold and flat)       #
    print "\tFOLD|Paper Wt|Paper Thickness|Env Weight|Env Thickness|Max Sheets|Env
Len|Env Height|\n";
}
Folding instructions
# Validate that we have only 1 entry each          #
# for the FOLDS and FLATS                          #
if ($fold_found != 1 || $flat_found != 1) {
    if ($fold_found != 1) {
      print "**ERROR** Expected 1 entry for FOLD in input file, found $fold_found.\n";
    }
    if ($flat_found != 1) {
      print "**ERROR** Expected 1 entry for FLAT in input file, found $flat_found.\n";
    }
    print "\tThe following fields are expected:\n";
```

```
    print "\tFOLD|Paper Wt|Paper Thickness|Env Weight|Env Thickness|Max Sheets|Env
Len|Env Height|\n";
    print "\tFLAT|Paper Wt|Paper Thickness|Env Weight|Env Thickness|Max Sheets|Env
Len|Env Height|\n";
    exit 9;
}
# STEP 2 -                                       #
#    Read in the input file that contains the weights and          #
#    thicknesses for the inserts                          #
# In one example, the number of inserts can be from 1 to 5.  In one example, the number of
inserts can be from 1 to 10.
In one example, the number of inserts can be from 1 to 15.
while(<INPUT2>){
  # parse out the fields - INSERT 1  #
  if ($cols2[0] =~ m/1/) {
    if (defined $cols2[1] && ($cols2[1] ne '' && $cols2[1] !~ /^ /)) {
      $ins1_name      = $cols2[1];
      $ins1_wt        = $cols2[2];
      $ins1_tk        = $cols2[3];
      $ins1_usage     = $cols2[4];
      $ins1_pull_ratio = $cols2[5];
      if (defined $cols2[6]) {$ins1_doc_cnt  = $cols2[6]};
    }
  }
# STEP 3 -                                       #
#    Create the SWeaver weight files. There can be a file for      #
#    FLATS and a file for FOLDS. These files are used in SWeaver    #
#    to initialize the variables for the paper, envelope, and       #
#    insert weights.                                     #
if ($envType =~ /both/i || $envType =~ /fold/i) {
```

```
  printf (OUTTXTFD "<!*-*-*-*-*-*-*-*-*-*-*-*-*-*-*-*-*-*-*-*-*-*-*-*-*-*-*-*>\n");
  printf (OUTTXTFD "<! Presort and manifest weights files for FOLDS                ->\n");
  printf (OUTTXTFD "<!*-*-*-*-*-*-*-*-*-*-*-*-*-*-*-*-*-*-*-*-*-*-*-*-*-*-*-*>\n");
  print (OUTTXTFD "    \%\%");
  printf (OUTTXTFD "mailing_env_wt = %03d    <! envel wt in 1000ths of an oz. >\n",
$fold_env_wt*1000);
  print (OUTTXTFD "    \%\%");
  printf (OUTTXTFD "paper_wt       = %03d    <! paper wt in 1000ths of an oz. >\n",
$fold_paper_wt*1000);
  print (OUTTXTFD "    \%\%");
  printf (OUTTXTFD "pocket_1_wt    = %03d    <! insert pg wt in 1000ths oz. >\n",
$ins1_wt*1000);
  print (OUTTXTFD "    \%\%");
  printf (OUTTXTFD "pocket_2_wt    = %03d    <! insert pg wt in 1000ths oz. >\n",
$ins2_wt*1000);
  print (OUTTXTFD "    \%\%");
  printf (OUTTXTFD "pocket_3_wt    = %03d    <! insert pg wt in 1000ths oz. >\n",
$ins3_wt*1000);
  print (OUTTXTFD "    \%\%");
}
if ($envType =~ /both/i || $envType =~ /flat/i) {
  printf (OUTTXTFL "<!*-*-*-*-*-*-*-*-*-*-*-*-*-*-*-*-*-*-*-*-*-*-*-*-*-*-*-*>\n");
  printf (OUTTXTFL "<! Presort and manifest weights files for FLATS                ->\n");
  printf (OUTTXTFL "<!*-*-*-*-*-*-*-*-*-*-*-*-*-*-*-*-*-*-*-*-*-*-*-*-*-*-*-*>\n");
  print (OUTTXTFL "    \%\%");
  printf (OUTTXTFL "mailing_env_wt = %03d    <! envel wt in 1000ths of an oz. >\n",
$flat_env_wt*1000);
  print (OUTTXTFL "    \%\%");
  printf (OUTTXTFL "paper_wt       = %03d    <! paper wt in 1000ths of an oz. >\n",
$flat_paper_wt*1000);
```

```
print (OUTTXTFL "    \%\%");
printf (OUTTXTFL "pocket_1_wt   = %03d   <! insert pg wt in 1000ths oz. >\n",
$ins1_wt*1000);
print (OUTTXTFL "    \%\%");
printf (OUTTXTFL "pocket_2_wt   = %03d   <! insert pg wt in 1000ths oz. >\n",
$ins2_wt*1000);
print (OUTTXTFL "    \%\%");
printf (OUTTXTFL "pocket_3_wt   = %03d   <! insert pg wt in 1000ths oz. >\n",
$ins3_wt*1000);
}
# STEP 4 -                                           #
#   Calculate the average weights and thicknesses.              #
#   First, get the average for each insert based on its pull ratio.   #
#   Second, get the average for the envelop and inserts by summing up  #
#   the envelop and the average of each insert.                 #
# Calc insert weight averages     #
my $ins1_wt_avg = $ins1_wt * $ins1_pull_ratio;
my $ins2_wt_avg = $ins2_wt * $ins2_pull_ratio;
my $ins3_wt_avg = $ins3_wt * $ins3_pull_ratio;
# Calc insert thickness averages   #
my $ins1_tk_avg = $ins1_tk * $ins1_pull_ratio;
my $ins2_tk_avg = $ins2_tk * $ins2_pull_ratio;
my $ins3_tk_avg = $ins3_tk * $ins3_pull_ratio;
# Calc env/insert weight and      #
# thickness averages           #
my $fold_ins_env_avg_wt = $fold_env_wt + $ins1_wt_avg + $ins2_wt_avg +
      $ins3_wt_avg;
my $fold_ins_env_avg_tk = $fold_env_tk + $ins1_tk_avg + $ins2_tk_avg +
      $ins3_tk_avg;
# STEP 5 -                                           #
```

```
#   Calculate the average weights and thicknesses based on the    #
#   number of sheets. This is used to determine the ounce         #
#   categories used by mailstream plus.                    #
# Initialize variables          #
my (%AvgWeight, %AvgThickness, %WtCategory);
my ($Oz01_fold_cnt, ....$Oz35_fold_cnt) = (0, 0, 0, 0, 0);
my ($Oz01_flat_cnt, ....$Oz04_flat_cnt) = (0, 0, 0, 0);
my ($Oz01_flat_beg, ....$Oz04_flat_beg) = (0, 0, 0, 0);
my ($Oz05_flat_beg, ....$Oz08_flat_beg) = (0, 0, 0, 0);
my ($Oz01_flat_end, ....$Oz04_flat_end) = (0, 0, 0, 0);
my ($Oz05_flat_end, .... $Oz08_flat_end) = (0, 0, 0, 0);
# Calc values through max number  #
# of sheets                 #
for (my $i = 1; $i <= $flat_max_sheets; $i++) {
  # Calc for FOLDS              #
  if ($i <= $fold_max_sheets) {
    $AvgWeight{$i} = ($fold_paper_wt * $i) + $fold_ins_env_avg_wt;
    $AvgThickness{$i} = ($fold_paper_tk * $i) + $fold_ins_env_avg_tk;
    # FOLDS - 1 Ounce   #
    if ($AvgWeight{$i} < 1.0) {
      $WtCategory{$i} = "01";
      $Oz01_fold_cnt++;
      if ($Oz01_fold_cnt == 1) {
        $Oz01_fold_beg = $i;
      }
      $Oz01_fold_end = $i;
    }
        }
  # Calc for FLATS for each ounce from 1 to 13 ounces#
  else {
```

```
    $AvgWeight{$i} = ($flat_paper_wt * $i) + $flat_ins_env_avg_wt;
    $AvgThickness{$i} = ($flat_paper_tk * $i) + $flat_ins_env_avg_tk;
    # FLATS - 1 Ounce   #
    if ($AvgWeight{$i} < 1.0) {
      $WtCategory{$i} = "01";
      $Oz01_flat_cnt++;
      if ($Oz01_flat_cnt == 1) { $Oz01_flat_beg = $i; }
      $Oz01_flat_end = $i;
    } ....
# STEP 6 -                                    #
#   Output the information that we have gathered. This is for    #
#   reference only so that we can see all the values that have    #
#   been calculated. This can aide in debugging.            #
my $wttab_file = $pathName . "/" . $jobName . "_wght_table.txt";
open(WTTABLE, '>', $wttab_file);
print  WTTABLE "          ***********************************************\n";
printf WTTABLE "          WEIGHT AND THICKNESS TABLE FOR JOB %s
\n",$jobName;
print  WTTABLE "          ***********************************************\n\n";
print  WTTABLE "| Material   | Weight   | Pull   | Weighted  | Thickness | Pull   | Thickness
|\n";
print  WTTABLE "|            |          | Ratio  | Average   |           | Ratio  | Average   |\n";
printf WTTABLE "| Fold Paper | %6.4f    | 1.000  | %6.4f     | %6.4f     | 1.000  | %6.4f     |\n",
       $fold_paper_wt, $fold_paper_wt, $fold_paper_tk, $fold_paper_tk;
printf WTTABLE "| Flat Paper | %6.4f    | 1.000  | %6.4f     | %6.4f     | 1.000  | %6.4f     |\n",
       $flat_paper_wt, $flat_paper_wt, $flat_paper_tk, $flat_paper_tk;
printf WTTABLE "| Fold Env   | %6.4f    | 1.000  | %6.4f     | %6.4f     | 1.000  | %6.4f     |\n",
       $fold_env_wt, $fold_env_wt, $fold_env_tk, $fold_env_tk;
printf WTTABLE "| Flat Env   | %6.4f    | 1.000  | %6.4f     | %6.4f     | 1.000  | %6.4f     |\n",
       $flat_env_wt, $flat_env_wt, $flat_env_tk, $flat_env_tk;
```

```
printf WTTABLE "| Insert 1  | %6.4f   | 1.000   | %6.4f   | %6.4f   | 1.000   | %6.4f   |\n",
      $ins1_wt, $ins1_pull_ratio, $ins1_wt_avg, $ins1_tk, $ins1_pull_ratio, $ins1_tk_avg;
printf WTTABLE "| Insert 2  | %6.4f   | 1.000   | %6.4f   | %6.4f   | 1.000   | %6.4f   |\n",
      $ins2_wt, $ins2_pull_ratio, $ins2_wt_avg, $ins2_tk, $ins2_pull_ratio, $ins2_tk_avg;
printf WTTABLE "| Insert 3  | %6.4f   | 1.000   | %6.4f   | %6.4f   | 1.000   | %6.4f   |\n",
      Sins3_wt, $ins3_pull_ratio, $ins3_wt_avg, $ins3_tk, $ins3_pull_ratio, Sins3_tk_avg;
printf WTTABLE "FOLDS  Insert/Env Weight = %6.4f   Insert/Env Thickness = %6.4f\n",
      Sfold_ins_env_avg_wt, $fold_ins_env_avg_tk;
printf WTTABLE "FLATS  Insert/Env Weight = %6.4f   Insert/Env Thickness = %6.4f\n",
      $flat_ins_env_avg_wt, $flat_ins_env_avg_tk;
# STEP 7 -                                   #
#  Determine the thickness to be used for the P ATTR entry that     #
#  is used by Mailstream Plus.                         #
#  For each ounce category:                            #
#    if the table has 1 entry, then use it.            #
#    if the table has 2-4 entries, then use avg of the last 2 values. #
#    if the table has 5+ entries, then use 2nd to the last one.     #
# FOLDS - 1 Ounce   #
my $Oz01_fold_tk = 0;
if ($Oz01_fold_cnt == 1) {
  $Oz01_fold_tk = $AvgThickness{$Oz01_fold_beg};
}
if ($Oz01_fold_cnt >= 2 && $Oz01_fold_cnt <= 4) {
  $Oz01_fold_tk = ($AvgThickness{$Oz01_fold_end} + $AvgThickness{$Oz01_fold_end-
1})/2;
}
if ($Oz01_fold_cnt >= 5) {
  $Oz01_fold_tk = $AvgThickness{$Oz01_fold_end-1};
}
  # FOLDS - 3.2 Ounce  #
```

```
  # (used in Postsale) #
  if ($Oz32_fold_cnt == 1) {
    $Oz32_fold_tk = $AvgThickness{$Oz32_fold_beg};
  }
  if ($Oz32_fold_cnt >= 2 && $Oz32_fold_cnt <= 4) {
    $Oz32_fold_tk = ($AvgThickness{$Oz32_fold_end} + $AvgThickness{$Oz32_fold_end-
1})/2;
  }
  if ($Oz32_fold_cnt >= 5) {
    $Oz32_fold_tk = $AvgThickness{$Oz32_fold_end-1};
  }
  if ($Oz32_fold_tk == 0) {
    $Oz32_fold_tk = $Oz03_fold_tk + .012;
  }
}
# FLATS - 1 Ounce    #
my $Oz01_flat_tk = 0;
if ($Oz01_flat_cnt == 1) {
  $Oz01_flat_tk = $AvgThickness{$Oz01_flat_beg};
}
if ($Oz01_flat_cnt >= 2 && $Oz01_flat_cnt <= 4) {
  $Oz01_flat_tk = ($AvgThickness{$Oz01_flat_end} + $AvgThickness{$Oz01_flat_end-1})/2;
}
if ($Oz01_flat_cnt >= 5) {
  $Oz01_flat_tk = $AvgThickness{$Oz01_flat_end-1};
}
if ($Oz01_flat_tk == 0) {
  $Oz01_flat_tk = $Oz01_fold_tk;
}
# STEP 8 -                                   #
```

```
#   Output the P ATTR values calculated above.                #
# FOLDS        #
if ($envType =~ /both/i || $envType =~ /fold/i) {
  printf OUTPRMFD "P ATTR 021 2 01     06.25 %05.2f %05.2f %05.2f        R N  Y
Y\n",
      $Oz01_fold_tk*100,$fold_env_len,$fold_env_ht;
  printf OUTPRMFD "P ATTR      02      12.50 %05.2f %05.2f %05.2f        R N  Y    \n",
      $Oz02_fold_tk*100,$fold_env_len,$fold_env_ht;
  printf OUTPRMFD "P ATTR      03      18.75 %05.2f %05.2f %05.2f        R N  Y    \n",
      $Oz03_fold_tk*100,$fold_env_len,$fold_env_ht;
  if ($oz32_ind =~ /Y/i) {
    printf OUTPRMFD "P ATTR      32      20.00 %05.2f %05.2f %05.2f        R N  Y
\n",
        $Oz32_fold_tk*100,$fold_env_len,$fold_env_ht;
  }
  printf OUTPRMFD "P ATTR      35      21.87 %05.2f %05.2f %05.2f        R N  Y    \n",
      $Oz35_fold_tk*100,$fold_env_len,$fold_env_ht;
}
# FLATS        #
if ($envType =~ /both/i || $envType =~ /flat/i) {
  printf OUTPRMFL "P ATTR 021 2 01     06.25 %05.2f %05.2f %05.2f        R N  Y
Y\n",
      $Oz01_flat_tk*100,$flat_env_len,$flat_env_ht;
  printf OUTPRMFL "P ATTR      02      12.50 %05.2f %05.2f %05.2f        R N  Y    \n",
      $Oz02_flat_tk*100,$flat_env_len,$flat_env_ht;
  printf OUTPRMFL "P ATTR      03      18.75 %05.2f %05.2f %05.2f        R N  Y    \n",
      $Oz03_flat_tk*100,$flat_env_len,$flat_env_ht;
  }
```

Exemplary Exception Processing Workflows Based on FIGS. 62A-62H

Data Receiving and Processing

In some embodiments, data files received via secure Connect Enterprise file transfer into the inventive computer system (e.g., from a mainframe computer). In some embodiments, address line, trade date, account number, and ticker number parsed out. In some embodiments, X added to 5th position to create street ticker to equal a street CUSIP. In some embodiments. Ticker/CUSIP bumped up against MSDI (Master Security Description Index) for validation. In one embodiment. MSDI is a database of CUSIPs with descriptions obtained from brokers and/or Mutual Fund companies. In some embodiments, Invalid CUSIP matched against mainframe and historical information about investors (e.g., personal information, account information, etc.) and/or transactional history. In some embodiments, address files are verified against NCOA (National Change of Address dataset of approximately 160 million permanent change-of-address (COA) records, which is updated weekly). In some embodiments, the instant invention utilizes CASS certification (Coding Accuracy Support System (CASS) used by USPS to evaluate the accuracy of software that corrects and matches street addresses), which is updated quarterly. In some embodiments, during the data processing, the instant invention can suppress duplicate trades and/or combine mailing process for trades of same investor(s)/household(s).

Job File Creation

In some embodiments, an exemplary inventive Info Print Workflow (shown in FIGS. 62A-62H) creates .IDF file (Intelligent Data Files based on IntellaSert@ software) which drives tracking process of a piece (e.g., document, mailing, etc). IntellaSert@ is a software suite from Böwe Bell & Howell that converts existing mail piece data into an IntellaSerts's Data File ("IDF") format, and/or converts completed mail piece data into a format for higher level auditing and/or accounting systems. In some embodiments, a Transformer system utilizing IntellaSert® software extracts specific data fields during the print file creation and uses this data to generate 2-D matrix barcodes. In some embodiments, the 2-D matrix barcode contains data unique to each printed page. In some embodiments, camera(s) mounted on our inserters (assembling machines) scan each barcode during the insertion process. In some embodiments, the inventive computer system of the instant invention converts this information back into a digital record and matches this record with a corresponding IDF generated during the creation of the original print file. In some embodiments, when insertion of all documents in a file is complete, the updated data is automatically reconciled with the original IDF print file data. In some embodiments, this reconciliation allows to resolve any mail piece integrity issues before approving mailings for delivery to the USPS. In some embodiments, the generated tracking information allow to research and/or verify the correct processing of specific mail pieces historically.

Tracking System Data

In some embodiments, an exemplary Info Print workflow and the piece tracking technology are involved in the data tracking in according to the instant invention.

Prospectus View Updated

In some embodiments, updates are pulled from the inventive computer system (e.g., mainframe) after each pick. For example, pick-ups occur each business day at approximately 4:00 AM, 12:00 PM, 3:00 PM; and prospectus view is updated 8:30 AM, 1:00 PM and 4:00 PM.

In some embodiments, the Prospectus View update process is distinct from a notification file process.

Printing—Flow Steps of an Exemplary Process 1

Step 1: Does a document meet criteria for High Speed solution?

Step 2: If yes, place a printing job in a print queue.

In some embodiments, the DDS Print system (computer system(s) and printing/assembling device(s) that handle the printing/binding of buckslips, and/or investor material) is involved in step 2.

Step 3: Bucslips and sum prospectuses printed inline.

In some embodiments, each bucslip includes mailing address, partial account number, CUSIP and/or trade information. In some embodiments, the DDS Print system is involved in step 3.

Step 4: Jobs released to production. In some embodiments, the DDS Print system is involved in step 4.

Step 5: Reporting updated.

Step 6: Job Info updated.

Step 7: Notification file updated.

Step 8: Automatic Inserting.

Step 9: Bucslips printed (in some embodiments, Bucslip includes mailing address, partial account number, CUSIP and trade information). In some embodiments, the DDS Print system is involved in step 9.

Step 10: Order sheet printed. In some embodiments, the DDS Print system is involved in step 10.

Printing—Flow Steps of an Exemplary Process 2

Step 1: Print output to Inserters (automatic assembling mechanism). In some embodiments, the Material Handler system is involved in step 1 and receives data from the Print Output system and the Job Tickets handling system.

Step 2: Print output loaded into address hopper. In some embodiments, the print output can include: a bucslip, a confirm, and summary prospectus(es). In some embodiments, the Insert systems/devices (assembling mechanisms) are involved in step 2, receiving data from the Print Output system, and outputting inserted mail pieces.

Step 3: Envelopes loaded into envelope hopper. In some embodiments, the Insert systems/devices (assembling mechanisms) are involved in step 3, receiving envelopes, and outputting inserted mail pieces.

Step 4: Addresses and materials inserted. In some embodiments, bucslip includes mailing address, partial account number, CUSIP, and trade information. In some embodiments, the Insert systems/devices (assembling mechanisms) are involved in step 4, receiving envelopes and print outputs, and outputting inserted mail pieces. In some embodiments, the Insert systems/devices (assembling mechanisms) identify exception cases (exceptions) such as, but not limited to:

- diverted mail piece (e.g., incorrect address),
- poor quality mail piece,
- mixed weights,
- damaged mail piece,
- short physical inventory (e.g., no printed summary prospectuses—unfulfilled bucslips scanned to be included in reprint print file),
- file printing is incorrect/corrupt or printing does not meet quality standards, and
- Postal service/Expeditor/Pre-sorter returns mail piece.

Step 5: Periodic and/or ad hoc quality inspections performed. In some embodiments, the Insert systems/devices (assembling mechanisms) are involved in step 5, Step 6: Determining if there is/are exception(s). In some embodiments, exemplary exceptions can be at least one of the following:

damaged envelope:

mutilated or page counts fail systematic reconciliation process, diverted by machine;

missing envelope:

envelope deemed missing:

if physically identified, envelope goes back through scanning process for system reconciliation, or if envelope not identified, envelope sequence is flagged as a reprint;

mismatch.

In some embodiments, exemplary rules to automatically deal with exceptions can have a predetermined time guidelines such as, but not limited to:

same day exceptions:

If corrected before 2:30 PM, include in same day mail,

If corrected after 2:30 PM, include in a next day mail and update a notification file with a new mail date Pre-Sort exceptions:

if job is mailed, sent information to a Presorter to matched with returned "bad" mail when a PreSort truck comes back within 1-2 days.

Step 7: Finished mail pieces placed in container. In some embodiments, completed mail pieces are automatically packaged into appropriate USPS supplied receptacles based on USPS requirements, such as:

Mail bucket,

Mail tray, and

Mail sack.

In some embodiments, the Insert systems/devices (assembling mechanisms) are involved in step 7, receiving completed mail pieces and outputting USPS packaged mail.

Step 8: Exceptions scanned into system. In some embodiments, barcodes on bucslips are scanned into system to be reprinted and uploaded to mainframe to be included in next reprint print queue. In some embodiments, the Quality Control system is involved in step 8

Step 9: Reprint list submitted. In some embodiments, the Quality Control system systematically uploads a reprint list that includes, but not limited to, address sequence identification information to be included in a new file to enable reprocessing.

Step 10: Affected pieces logged and segregated. In some embodiments, the Insert systems/devices (assembling mechanisms) are involved in step 10.

Step 11: Exceptions reconciled in tracking system. In some embodiments, the Quality Control system identifies exceptions in tracking system as "Reprint Necessary." and Step 12: Enabling tracking system at inserting machine. In some embodiments, the Insert systems/devices (assembling mechanisms) are involved in step 12.

Table 1.6 identifies exemplary inputs/outputs for exceptions processing in accordance with some embodiments of the instant invention.

TABLE 1.6

| Input/Output Value |
|---|
| mailpieces |
| Buckslips |
| Completed mail piece(s) |
| Components to be inserted |
| Delivered mailpieces |
| Envelopes |
| inserted mailpieces |
| Job Tickets |
| Order ticket |
| Print Output |
| Print output |
| Summary prospectus |
| USPS packaged mail |

Table 1.7 identifies exemplary computer systems in accordance with some embodiments of the instant invention.

TABLE 1.7

| Value |
|---|
| Mainframe |
| Info Print Workflow |
| Piece tracking technology |
| Postsale Web |
| Prospectus Plus Mainframe |
| Prospectus View |

Table 1.8 identifies exemplary exceptions in accordance with some embodiments of the instant invention.

TABLE 1.8

| Value |
|---|
| "0" inventory |
| Bad mail addresses |
| Damaged envelope |
| Damaged mailpieee |
| Diverted mailpiece |
| File Corrupt (POD) |
| Mismatch |
| Mixed weights |
| Poor quality |
| Poor quality mailpiece |
| Short inventory |

In some embodiments, the inventive computer methods and the computer systems/machines of the instant invention can be utilized for printing/mailing documents that are related to the following industries, but are not limited to:

Credit Unions/Banking,

Employee Benefits—Health Care, Retirement,

Employer/Employee Contribution & Pension Plans (e.g., 401 (k)),

Insurance, and

Utilities.

In some embodiments, the instant invention provides for a computer-implemented method that includes at least the following steps of: periodically receiving, by at least one specifically programmed computer system, investment transactional data identifying investment transactions of a plurality of investors, where the investment transactional data is received during a first time period and where the investment transactional data, for each investor of the plurality of the inventors, includes: i) at least one investment identifier of at least one investment that is, directly or indirectly, owned or managed by such investor, and ii) at least one investment transaction identifier of each investment transaction of such investor that involves the at least one investment; where the plurality of investor comprises at least a thousand investors; automatically determining, by the at least one specifically programmed computer system, based, at least in part, on the investment transactional data, at least one first document, at least one second document, or both, to be mailed to each investor of the plurality of investors, where the at least one first document, the at least one second document, or both, are associated with the at least one investment of such investor; automatically generating, by the at least one specifically programmed computer system, a delivery data for each mailing to be mailed to each investor of the plurality of investors, where the delivery data includes: bucslip data or trade confirmation data, where the bucslip data includes: a mailing address of such investor and a listing of the at least one first document, the at least one second document, or both, to be mailed to such investor, and where the trade confirmation data includes: at least one trade confirmation for at least one investment transaction of such investor, and at least one of the following: a) the listing of the at least one first document, the at least one second document, or both, to be mailed to such investor, b) at least one communication targeted to such investor, ii) assembling data that identifies assembling instructions for assembling each mailing to be mailed to each investor of the plurality of investors, where the assembling instructions comprise a plurality of instructions selected from the group consisting of: a first instruction identifying a quantity of documents to be included in such mailing, a second instruction identifying a quantity of pages of documents to be included in such mailing, a third instruction identifying a type of each document to be included in such mailing, a fourth instruction identifying, for each document to be included in such mailing, that such document is to be packed in a folded condition or an unfolded condition, a fifth instruction identifying a finishing to be applied to each document to be included in such mailing, a sixth instruction identifying a type of a mailing envelope to be used for such mailing, a seventh instruction classifying such mailing by weight based, at least in part, on postal weight categories, an eight instruction identifying a postage data based, at least in part, on the classifying such mailing in accordance with the seventh instruction, and a ninth instruction identifying a predetermined number of the investment transactions to which such mailing corresponds, based, at least in part, on: a first size and a first thickness of the at least one first document, and a second size and a second thickness of the at least one second document; iii) unique production control bar code data, generated based, at least in part, on the assembling data and the at least one investment transaction identifier; and printing at least one unique production control bar code based, at least in part, on the unique production control bar code data, where the unique production control bar code is configured to be used for: i) assembling each mailing envelope, and ii) tracking such mailing envelope before such mailing envelope is deposited with a postal service.

In some embodiments, the above exemplary method further includes: automatically determining, by the at least one specifically programmed computer system, a printing allocation among a plurality of printers to print documents for mailings to the plurality of investors based, at least in part, on the delivery data.

In some embodiments, the bucslip data further comprises the at least one communication targeted to such investor.

In some embodiments, the above exemplary method further includes: periodically obtaining, by the at least one specifically programmed computer system, the at least one first document, the at least one second document, or both, from at least one electronic depository; automatically converting, by the at least one specifically programmed computer system, the at least one first document, the at least one second document, or both, into at least one print-ready formatted file; periodically receiving, by the at least one specifically programmed computer system, change data, identifying changes in the at least one first document, the at least one second document, or both; automatically updating, by the at least one specifically programmed computer system, the at least one first document, the at least one second document, or both, based, at least in part, on the change data; and automatically updating, by the at least one specifically programmed computer system, the at least one print-ready formatted file based, at least in part, on the change data.

In some embodiments, the above exemplary method further includes: automatically assembling, in a machine automated mode, based at least in part on reading the at least one unique production control bar code, each mailing envelope, by: i) selecting, by the at least one specifically programmed computer system, a plurality of printed materials from a plurality of feeders of at least one assembling mechanism, where the plurality of printed materials are selected from the group consisting of: 1) the at least one first document, 2) the at least one second document, 3) at least one first bucslip document, printed based, at least in part, on the bucslip data, 4) at least one first trade confirmation document, printed based, at least in part, on the trade confirmation data, and ii) packaging the plurality of printed materials into such mailing envelope.

In some embodiments, the above exemplary method further includes: utilizing, by the at least one specifically programmed computer system, at least one camera to read an image of the at least one unique production control bar code.

In some embodiments, the above exemplary method further includes: automatically generating, by the at least one specifically programmed computer system, based on at least in part on the delivery data, at least one tracking log, at least one manifest document for a postal service, or both; and automatically tracking, by the at least one specifically programmed computer system, the mailings to the plurality of investors, based at least in part on the at least one unique production control bar code and at least one of the following: the at least one tracking log and the at least one manifest document.

In some embodiments, the above exemplary tracking the mailings includes: utilizing, by the at least one specifically programmed computer system, at least one camera to read an image of the at least one unique production control bar code, and automatically entering, by the at least one specifically programmed computer system, tracking data into the at least one tracking log.

In some embodiments, the above exemplary method further includes: applying a postage, by the at least one specifically programmed computer system, to such mailing envelope, based at least in part on the at least one unique production control bar code; or associating a postage, by the at least one specifically programmed computer system, to such mailing envelope, based at least in part on the at least one unique production control bar code.

In some embodiments, the above exemplary investment transactional data of each investor further includes account identifying data for at least one investment account of such investor with at least one financial institution.

In some embodiments, the above exemplary automatically assembling each mailing envelope further includes: automatically inserting at least one third document received from a financial institution associated with the investment transactional data of such investor.

In some embodiments, the above exemplary at least one first document, the at least one second document, or both, are: i) financial compliance documents and ii) represent branded documents or documents obtained from Edgar.

In some embodiments, the above exemplary determining includes: automatically confirming a first printed inventory of the at least one first document, a second printed inventory of the at least one second document, or both; and automatically suppressing a duplicate delivery, to each investor, of the at least one first document, the at least one second document, or both.

In some embodiments, the above exemplary at least one communication targeted to such investor includes at least one of the following: i) information related to the at least one investment that is, directly or indirectly, owned or managed by such investor, and ii) information related to at least one investment account of such investor.

In some embodiments, the above exemplary assembling of the mailings to the plurality of investors occurs before a second time period, and where a difference between the first time period and the second time period is twenty-four hours or less.

In some embodiments, the instant invention provides for a specially programmed computer system that includes at least the following components: at least one specialized computer machine that includes: a non-transient memory having at least one region for storing particular computer executable program code; and at least one processor for executing the particular program code stored in the memory, where the particular program code is configured so that the at least one specialize computer machine is configured to at least perform the following operations: periodically receiving, by at least one specifically programmed computer system, investment transactional data identifying investment transactions of a plurality of investors, where the investment transactional data is received during a first time period and where the investment transactional data, for each investor of the plurality of the inventors, includes: i) at least one investment identifier of at least one investment that is, directly or indirectly, owned or managed by such investor, and ii) at least one investment transaction identifier of each investment transaction of such investor that involves the at least one investment; where the plurality of investor comprises at least a thousand investors; automatically determining, by the at least one specifically programmed computer system, based, at least in part, on the investment transactional data, at least one first document, at least one second document, or both, to be mailed to each investor of the plurality of investors, where the at least one first document, the at least one second document, or both, are associated with the at least one investment of such investor; automatically generating, by the at least one specifically programmed computer system, a delivery data for each mailing to be mailed to each investor of the plurality of investors, where the delivery data includes: bucslip data or trade confirmation data, where the bucslip data includes: a mailing address of such investor and a listing of the at least one first document, the at least one second document, or both, to be mailed to such investor, and where the trade confirmation data includes: at least one trade confirmation for at least one investment transaction of such investor, and at least one of the following: a) the listing of the at least one first document, the at least one second document, or both, to be mailed to such investor, b) at least one communication targeted to such investor, ii) assembling data that identifies assembling instructions for assembling each mailing to be mailed to each investor of the plurality of investors, where the assembling instructions comprise a plurality of instructions selected from the group consisting of: a first instruction identifying a quantity of documents to be included in such mailing, a second instruction identifying a quantity of pages of documents to be included in such mailing, a third instruction identifying a type of each document to be included in such mailing, a fourth instruction identifying, for each document to be included in such mailing, that such document is to be packed in a folded condition or an unfolded condition, a fifth instruction identifying a finishing to be applied to each document to be included in such mailing, a sixth instruction identifying a type of a mailing envelope to be used for such mailing, a seventh instruction classifying such mailing by weight based, at least in part, on postal weight categories, an eight instruction identifying a postage data based, at least in part, on the classifying such mailing in accordance with the seventh instruction, and a ninth instruction identifying a predetermined number of the investment transactions to which such mailing corresponds, based, at least in part, on: a first size and a first thickness of the at least one first document, and a second size and a second thickness of the at least one second document; iii) unique production control bar code data, generated based, at least in part, on the assembling data and the at least one investment transaction identifier; and printing at least one unique production control bar code based, at least in part, on the unique production control bar code data, where the unique production control bar code is configured to be used for: i) assembling each mailing envelope, and ii) tracking such mailing envelope before such mailing envelope is deposited with a postal service.

As detailed herein, in some embodiments, the inventive computer methods and the computer systems/machines of the instant invention utilize various computer machines. However, not all of these computer machines may be required to practice the invention, and variations in the arrangement and type of the components may be made without departing from the spirit or scope of the invention. In some embodiment, the computer systems/machines of the instant invention host a large number of members and concurrent transactions. In other embodiments, the computer systems/machines of the instant invention are based on scalable computer and network architectures that incorporate varies strategies for assessing the data, caching, searching, and database connection pooling.

In one example, the exemplary scalable architecture is an architecture that is capable of operating multiple servers. In some embodiments, the computing system/machines in accordance with the instant invention may include, but not limiting to, one or more programmed computers, systems employing distributed networking, or other type of system that might be used to transmit and process electronic data. In some embodiments, client devices (e.g., computers, mobile device, etc.) of AOS's users include virtually any computing device capable of receiving and sending a message over a network to and from another computing device, such as servers, each other, and the like.

In some embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in embodiments, client devices are any device that is capable of connecting using a wired or wireless communication medium such as a PDA, POCKET PC, wearable computer, and any other device that is equipped to communicate over a wired and/or wireless communication medium.

In some embodiments, the client devices are further configured to receive a message from the another computing device employing another mechanism, including, but not limited to email. Short Message Service (SMS), Multimedia Message Service (MMS), instant messaging (IM), internet relay chat (IRC), mIRC, Jabber, and the like.

In some embodiments, the utilized networks can be configured to couple one computing device to another computing device to enable them to communicate. In some embodiments, the exemplary networks are enabled to employ any form of computer readable media for communicating information from one electronic device to another. Also, in some embodiments, the networks can include a wireless interface, and/or a wired interface, such as the Internet, in addition to local area networks (LANs), wide area networks (WANs), direct connections, such as through a universal serial bus (USB) port, other forms of computer-readable media, or any combination thereof. In some embodiments, on an interconnected set of LANs, including those based on differing architectures and protocols, a router acts as a link between LANs, enabling messages to be sent from one to another. Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Furthermore, in embodiments, remote computers and other related electronic devices could be remotely connected to either LANs or WANs via a modem and temporary telephone link. In essence, in some embodiments, the exemplary network can includes any communication method by which information may travel between client devices and servers.

In some embodiments, each of the client devices (e.g., computers, mobile device, smart routers, etc.) comprises a computer-readable medium, such as a random access memory (RAM) coupled to at least one processor. In some embodiments, the processor executes computer-executable program instructions stored in non-transient memory. Such processors comprise a microprocessor, an ASIC, and state machines. Such processors comprise, or are be in communication with, media, for example computer-readable media, which stores instructions that, when executed by the processor, cause the processor to perform the steps described herein.

Some embodiments of computer-readable media include, but are not limited to, an electronic, optical, magnetic, or other storage or transmission device capable of providing a processor with computer-readable instructions. In some embodiments, other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions.

Also, various other forms of computer-readable media transmit or carry instructions to a computer, including a router, private or public network, or other transmission device or channel, both wired and wireless. In some embodiments, the instructions comprise code from any computer-programming language, including, for example, C, C++, C#. Visual Basic, Java, Python, Perl, and JavaScript.

In some embodiments, the client devices also include a number of external or internal devices such as a mouse, a CD-ROM, DVD, a keyboard, a display, or other input or output devices. In some embodiments, examples of client devices are personal computers, digital assistants, personal digital assistants, cellular phones, mobile phones, smart phones, pagers, digital tablets, laptop computers, Internet appliances, and other processor-based devices. In general, a client device is any type of processor-based platform that is connected to a network and that interacts with one or more application programs of the instant invention. Client devices and AOS application can operate on any operating system capable of supporting a browser or browser-enabled application, such as Microsoft™, Windows™, or Linux. In some embodiments, the client devices include, for example, personal computers executing a browser application program such as Microsoft Corporation's Internet Explorer™, Apple Computer, Inc.'s Safari™, Mozilla Firefox, and Opera.

Of note, the embodiments described herein may, of course, be implemented using any appropriate computer system hardware and/or computer system software. In this regard, those of ordinary skill in the art are well versed in the type of computer hardware that may be used (e.g., a mainframe, a mini-computer, a personal computer ("PC"), a network (e.g., an intranet and/or the internet)), the type of computer programming techniques that may be used (e.g., object oriented programming), and the type of computer programming languages that may be used (e.g., C++, Basic, AJAX, Javascript). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:

1. A computer-implemented method, comprising:

periodically receiving, by at least one specifically programed computer system, fulfillment data for a plurality of recipients, wherein the fulfillment data, for each recipient of the plurality of the recipients, comprises:

i) at least one fulfillment identifier of at least one record associated with such recipient, and ii) at least one effective date associated with the at least one record;

wherein the plurality of recipients comprises at least a thousand recipients;

automatically determining, by the at least one specifically programed computer system, based, at least in part, on the fulfillment data, at least one first document, at least one second document, or both, to be mailed to each investor of the plurality of recipients, wherein the at least one first document, the at least one second document, or both, are documents related to the at least one record;

automatically generating, by the at least one specifically programed computer system, a delivery data for each mailing envelope to be mailed to each recipient of the plurality of recipients, wherein the delivery data comprises:

i) bucslip data, wherein the bucslip data are data generated for printing a personalized recipient bucslip which is a personalized paper insert that comprises:

1) a mailing address of such recipient and 2) a listing of the at least one first document, the at least one second document, or both, to be mailed to such recipient, and ii) assembling data that identifies assembling instructions for assembling each mailing envelope to be mailed to each recipient of the plurality of recipients, wherein the assembling instructions comprise:

1) an instruction identifying a type of each mailing envelope 2) an instruction identifying a predetermined number of enclosures to which each mailing envelope corresponds, based, at least in part, on:

a) a first paper size for printing the at least one first document, b) a first thickness of a first printed copy of the at least one first document, c) a second paper size for printing the at least one second document, and d) a second thickness of a second printed copy of the at least one second document, and 3) an instruction identifying a finishing to be applied to the at least one first document, the at least one second document, or both, based, at least in part, on:

a) a first printing indication identifying how to print the at least one first document, b) the first thickness of the first printed copy of the at least one first document, c) a first finishing indication identifying a first finishing type to be applied to printed copies of the at least one first document, d) a second printing indication identifying how to print the at least one second document, e) the second thickness of the second printed copy of the at least one second document, and f) a second finishing indication identifying a second finishing type to be applied to printed copies of the at least one second document, wherein the first finishing type is distinct from the second finishing type;

iii) unique production control bar code data, generated based, at least in part, on the assembling data and the at least one fulfillment identifier;

printing, by the at least one specifically programed computer system, at least one unique production control bar code on each personalized recipient bucslip based on the unique production control bar code data, wherein the unique production control bar code is configured to be used for:

i) assembling each mailing envelope, and ii) tracking each mailing envelope before each mailing envelope is deposited with a postal service; and automatically assembling, in a machine automated mode, based on the at least one unique production control bar code data, each mailing envelope, by:

i) selecting, in the machine automated mode, a plurality of printed documents from a plurality of feeders of at least one assembling mechanism, wherein the printed documents comprise:

1) personalized recipient bucslips which are printed from the bucslip data, and 2) printed copies selected from the group consisting of:

a) the printed copies of the at least one first document and b) the printed copies of the at least one second document, and ii) packaging, in the machine automated mode, the plurality of printed documents into each mailing envelope;

wherein the automatically assembling is configured to assemble the plurality of printed documents into each mailing envelope when the plurality of printed documents differ among each other in at least one of the following characteristic:

1) a paper size, 2) a print indication, 3) a finishing, and 4) a thickness of a printed document.

2. The computer-implemented method of claim 1, wherein the method further comprises:

automatically generating, by the at least one specifically programed computer system, based on at least in part on the delivery data, at least one tracking log, at least one manifest document for a postal service, or both; and automatically tracking, by the at least one specifically programed computer system, each mailing envelope, based at least in part on the at least one unique production control bar code and at least one of the following:

i) the at least one tracking log, and ii) the at least one manifest document.

3. The computer-implemented method of claim 2, wherein the automatically tracking each mailing envelope comprises:

utilizing, by the at least one specifically programed computer system, at least one camera to read an image of the at least one unique production control bar code; and automatically entering, by the at least one specifically programed computer system, tracking data into the at least one tracking log.

4. The computer-implemented method of claim 1, wherein each recipient of the plurality of the recipients is one of: an individual and a legal entity.

5. The computer-implemented method of claim 1, wherein the method further comprises:

automatically determining, by the at least one specifically programed computer system, a printing allocation among a plurality of printers to print the printed documents for mailings to the plurality of recipients based, at least in part, on the delivery data.

6. The computer-implemented method of claim 1, wherein the bucslip data further comprises the at least one communication targeted to such recipient.

7. The computer-implemented method of claim 1, wherein the method further comprises:

periodically obtaining, by the at least one specifically programed computer system, the at least one first document, the at least one second document, or both, from at least one electronic depository;

automatically converting, by the at least one specifically programed computer system, the at least one first document, the at least one second document, or both, into at least one print- ready formatted file;

periodically receiving, by the at least one specifically programed computer system, change data, identifying changes in the at least one first document, the at least one second document, or both;

automatically updating, by the at least one specifically programed computer system, the at least one first document, the at least one second document, or both, based, at least in part, on the change data; and automatically updating, by the at least one specifically programed computer system, the at least one print-ready formatted file based, at least in part, on the change data.

8. The computer-implemented method of claim 1, wherein the assembling instructions further comprise at least one of:

1) an instruction identifying a quantity of documents to be included in each mailing envelope,
2) an instruction identifying a quantity of pages of documents to be included in each mailing envelope,
3) an instruction classifying each mailing envelope by weight based, at least in part, on postal weight categories, and
4) an instruction identifying a postage data based, at least in part, on the instruction classifying each mailing envelope by the postal weight categories; and wherein the first finishing type and the second finishing type are selected from the group consisting of:
1) fold and stapled, and
2) flat and stapled.

9. The computer-implemented method of claim 1,
wherein the at least one first document, the at least one second document, or both, are related to one of:
i) at least one activity involving a credit union,
ii) at least banking activity,
iii) at least activity involving employee benefits,
iv) at least activity involving an employer contribution plan,
v) at least activity involving an employer sponsored healthcare plan,
vi) at least activity involving an employer sponsored retirement plan,
vii) at least activity involving an insurance plan, and
viii) at least activity involving a utility;
ix) or any combination thereof.

10. The computer-implemented method of claim 1, wherein the automatically determining comprises:
automatically confirming a first printed inventory of the at least one first document, a second printed inventory of the at least one second document, or both.

11. The computer-implemented method of claim 1, wherein the automatically determining comprises:
automatically suppressing a duplicate delivery of the at least one first document, the at least one second document, or both, to a recipient.

12. A computer system, comprising:
A) at least one specialized computer machine, comprising:
1) a non-transient memory having at least one region for storing particular computer executable program code; and
2) at least one processor for executing the particular program code stored in the memory;

wherein the particular program code is configured so that, upon execution of the particular program code, the at least one specialize computer machine at least performs the following operations:

periodically receiving fulfillment data for a plurality of recipients, wherein the fulfillment data, for each recipient of the plurality of the recipients, comprises:
i) at least one fulfillment identifier of at least one record associated with such recipient , and
ii) at least one effective date associated with the at least one record;

wherein the plurality of recipients comprises at least a thousand recipients;

automatically determining, based, at least in part, on the fulfillment data, at least one first document, at least one second document, or both, to be mailed to each investor of the plurality of recipients, wherein the at least one first document, the at least one second document, or both, are documents related to the at least one record;

automatically generating a delivery data for each mailing envelope to be mailed to each recipient of the plurality of recipients, wherein the delivery data comprises:
ii) bucslip data,
wherein the bucslip data are data generated for printing a personalized recipient bucslip which is a personalized paper insert that comprises:
1) a mailing address of such recipient and
2) a listing of the at least one first document, the at least one second document, or both, to be mailed to such recipient, and
ii) assembling data that identifies assembling instructions for assembling each mailing envelope to be mailed to each recipient of the plurality of recipients, wherein the assembling instructions comprise:
1) an instruction identifying a type of each mailing envelope-
2) an instruction identifying a predetermined number of enclosures to which each mailing envelope corresponds, based, at least in part, on:
a) a first paper size for printing the at least one first document,
b) a first thickness of a first printed copy of the at least one first document,
c) a second paper size for printing the at least one second document, and
d) a second thickness of a second printed copy of the at least one second document, and
3) an instruction identifying a finishing to be applied to the at least one first document, the at least one second document, or both, based, at least in part, on:
a) a first printing indication identifying how to print the at least one first document,
b) the first thickness of the first printed copy of the at least one first document,
c) a first finishing indication identifying a first finishing type to be applied to printed copies of the at least one first document,
d) a second printing indication identifying how to print the at least one second document,
e) the second thickness of the second printed copy of the at least one second document, and
f) a second finishing indication identifying a second finishing type to be applied to printed copies of the at least one second document, wherein the first finishing type is distinct from the second finishing type;
iii) unique production control bar code data, generated based, at least in part, on the assembling data and the at least one fulfillment identifier;

printing at least one unique production control bar code on each personalized recipient bucslip based on the unique production control bar code data, wherein the unique production control bar code is configured to be used for:
i) assembling each mailing envelope, and
ii) tracking each mailing envelope before each mailing envelope is deposited with a postal service; and B) at least one assembling machine, wherein the at least one assembling machine is specifically programed to perform at least the following operations:

automatically assembling, in a machine automated mode, based on the at least one unique production control bar code data, each mailing envelope, by:

i) selecting, in the machine automated mode, a plurality of printed documents from a plurality of feeders of at least one assembling mechanism, wherein the printed documents comprise:

1) personalized recipient bucslips which are printed from the bucslip data, and 2) printed copies selected from the group consisting of:

a) the printed copies of the at least one first document and b) the printed copies of the at least one second document, and ii) packaging, in the machine automated mode, the plurality of printed documents into each mailing envelope;

wherein the at least one assembling machine is specifically configured to assemble the plurality of printed documents into each mailing envelope when the plurality of printed documents differ among each other in at least one of the following characteristic:

1) a paper size, 2) a print indication, 3) a finishing, and 4) a thickness of a printed document.

13. The computer system of claim 12, wherein the particular program code is further configured so that, upon execution of the particular program code, the at least one specialize computer machine further performs the following operations:

automatically generating, based on at least in part on the delivery data, at least one tracking log, at least one manifest document for a postal service, or both; and automatically tracking each mailing envelope, based at least in part on the at least one unique production control bar code and at least one of the following:

i) the at least one tracking log, and ii) the at least one manifest document.

14. The computer system of claim 13, wherein the automatically tracking each mailing envelope comprises:

utilizing at least one camera to read an image of the at least one unique production control bar code; and automatically entering tracking data into the at least one tracking log.

15. The computer system of claim 12, wherein each recipient of the plurality of the recipients is one of: an individual and a legal entity.

automatically entering tracking data into the at least one tracking log.

16. The computer system of claim 12, wherein the particular program code is further configured so that, upon execution of the particular program code, the at least one specialize computer machine further performs the following operations:

automatically determining a printing allocation among a plurality of printers to print the printed documents for mailings to the plurality of recipients based, at least in part, on the delivery data.

17. The computer system of claim 12, wherein the bucslip data further comprises the at least one communication targeted to such recipient.

18. The computer system of claim 12, wherein the particular program code is further configured so that, upon execution of the particular program code, the at least one specialize computer machine further performs the following operations:

periodically obtaining the at least one first document, the at least one second document, or both, from at least one electronic depository;

automatically converting the at least one first document, the at least one second document, or both, into at least one print-ready formatted file;

periodically receiving change data, identifying changes in the at least one first document, the at least one second document, or both;

automatically updating the at least one first document, the at least one second document, or both, based, at least in part, on the change data; and automatically updating the at least one print-ready formatted file based, at least in part, on the change data.

19. The computer system of claim 12, wherein the assembling instructions further comprise at least one of:

1) an instruction identifying a quantity of documents to be included in each mailing envelope, 2) an instruction identifying a quantity of pages of documents to be included in each mailing envelope, 3) an instruction classifying each mailing envelope by weight based, at least in part, on postal weight categories, and 4) an instruction identifying a postage data based, at least in part, on the instruction classifying each mailing envelope by the postal weight categories; and wherein the first finishing type and the second finishing type are selected from the group consisting of:

1) fold and stapled, and 2) flat and stapled.

20. The computer system of claim 12, wherein the at least one first document, the at least one second document, or both, are related to one of:

i) at least one activity involving a credit union, ii) at least banking activity, iii) at least activity involving employee benefits, iv) at least activity involving an employer contribution plan, v) at least activity involving an employer sponsored healthcare plan, vi) at least activity involving an employer sponsored retirement plan, vii) at least activity involving an insurance plan, and viii) at least activity involving a utility;

ix) or any combination thereof.

21. The computer system of claim 12, wherein the automatically determining comprises:

automatically confirming a first printed inventory of the at least one first document, a second printed inventory of the at least one second document, or both.

22. The computer system of claim 12, wherein the automatically determining comprises:

automatically suppressing a duplicate delivery of the at least one first document, the at least one second document, or both, to a recipient.

* * * * *